(12) United States Patent
Teglia et al.

(10) Patent No.: US 11,299,625 B2
(45) Date of Patent: Apr. 12, 2022

(54) LAYERED COLLAGEN MATERIALS AND METHODS OF MAKING THE SAME

(71) Applicant: Modern Meadow, Inc., Nutley, NJ (US)

(72) Inventors: Lorenzo Teglia, Hoboken, NJ (US); Varna Lakshmi Sharma, Jersey City, NJ (US); Dale Lee Handlin, Jr., Charlotte, NC (US); Irina Kleiman, Staten Island, NY (US); Hemanthram Varadaraju, Jersey City, NJ (US)

(73) Assignee: Modern Meadow, Inc., Nutley, NJ (US)

( * ) Notice: Subject to any disclaimer, the term of this patent is extended or adjusted under 35 U.S.C. 154(b) by 0 days.

(21) Appl. No.: 16/744,997

(22) Filed: Jan. 16, 2020

(65) Prior Publication Data

US 2020/0231805 A1 Jul. 23, 2020

Related U.S. Application Data

(60) Provisional application No. 62/793,512, filed on Jan. 17, 2019.

(51) Int. Cl.
*B32B 7/02* (2019.01)
*C08L 75/06* (2006.01)
(Continued)

(52) U.S. Cl.
CPC ............... *C08L 75/06* (2013.01); *B32B 5/02* (2013.01); *B32B 5/18* (2013.01); *B32B 7/12* (2013.01);
(Continued)

(58) Field of Classification Search
CPC .......... C08L 75/00; C08L 75/04; C08L 75/06; C08L 75/08; C08L 75/10; C08L 75/12;
(Continued)

(56) References Cited

U.S. PATENT DOCUMENTS 2,059,856 A 11/1936 Eastman et al.
2,673,171 A 3/1954 Leon et al.
(Continued)

FOREIGN PATENT DOCUMENTS

CA 2306346 A1 1/1999
CN 1305546 A 7/2001
(Continued)

OTHER PUBLICATIONS

Machine Translation of JP H06-17378 (Year: 1994).*
(Continued)

*Primary Examiner* — Zachary M Davis
(74) *Attorney, Agent, or Firm* — Sterne, Kessler, Goldstein & Fox P.L.L.C

(57) ABSTRACT

The present disclosure provides layered collagen materials comprising one or more collagen/polymer matrix layers. The collagen/polymer matrix layer(s) are formed of a collagen blended with one or more polymers. The collagen blended within the polymer(s) can be dissolved within the polymer(s). The one or more collagen/polymer matrix layers can be attached to a substrate layer, for example a fabric layer.

26 Claims, 5 Drawing Sheets

Specification includes a Sequence Listing.

(51) Int. Cl.
*B32B 5/02* (2006.01)
*B32B 9/02* (2006.01)
*B32B 7/12* (2006.01)
*B32B 5/18* (2006.01)

(52) U.S. Cl.
CPC .......... *B32B 9/02* (2013.01); *B32B 2307/412* (2013.01); *B32B 2307/72* (2013.01); *C08L 2201/10* (2013.01)

(58) Field of Classification Search
CPC . C08L 75/14; C08L 75/16; B32B 5/02; B32B 5/18; B32B 5/22; B32B 5/28; B32B 5/32; B32B 9/02; B32B 9/025; B32B 27/04; B32B 27/20; B32B 2260/02; B32B 2260/021; B32B 2260/023; B32B 2260/046; B32B 2262/08; B32B 2305/07
See application file for complete search history.

(56) References Cited

U.S. PATENT DOCUMENTS

| | | |
|---|---|---|
| 2,934,446 A | 4/1960 | Highberger et al. |
| 3,073,714 A | 1/1963 | Shu-Tung et al. |
| 3,122,599 A | 2/1964 | Shu-Tung et al. |
| 3,136,682 A | 6/1964 | Shu-Tung et al. |
| 3,483,016 A | 12/1969 | McCool et al. |
| 3,497,363 A | 2/1970 | Fox, Jr. et al. |
| 3,512,993 A | 5/1970 | Conley et al. |
| 3,537,871 A | 11/1970 | Kaneko et al. |
| 3,562,820 A | 2/1971 | Braun et al. |
| 3,656,881 A | 4/1972 | Hemwall |
| 3,684,732 A | 8/1972 | Grabauskas et al. |
| 3,728,207 A | 4/1973 | Heling et al. |
| 3,811,832 A | 5/1974 | Briggs |
| 3,873,478 A | 3/1975 | Comte et al. |
| 3,921,313 A | 11/1975 | Mahide et al. |
| 3,956,560 A | 5/1976 | Smith et al. |
| 3,979,532 A | 9/1976 | Muck et al. |
| 4,089,333 A | 5/1978 | Utsuo et al. |
| 4,215,051 A | 7/1980 | Palmer et al. |
| 4,247,279 A | 1/1981 | Masters |
| 4,291,992 A | 9/1981 | Barr et al. |
| 4,294,241 A | 10/1981 | Miyata |
| 4,404,033 A | 9/1983 | Steffan |
| 4,407,956 A | 10/1983 | Howell |
| 4,455,206 A | 6/1984 | Funabashi et al. |
| 4,464,428 A | 8/1984 | Ebert et al. |
| 4,465,472 A | 8/1984 | Urbaniak |
| 4,525,169 A * | 6/1985 | Higuchi .............. D06N 3/0004 428/151 |
| 4,536,475 A | 8/1985 | Anderson |
| 4,564,597 A | 1/1986 | Lerner et al. |
| 4,585,139 A | 4/1986 | Bronson et al. |
| 4,640,529 A | 2/1987 | Katz |
| 4,646,106 A | 2/1987 | Howkins |
| 4,665,492 A | 5/1987 | Masters |
| 4,673,304 A | 6/1987 | Liu et al. |
| 4,684,611 A | 8/1987 | Schilperoort et al. |
| 4,736,866 A | 4/1988 | Leder et al. |
| 4,772,141 A | 9/1988 | Sanders et al. |
| 4,842,575 A | 6/1989 | Hoffman et al. |
| 4,889,438 A | 12/1989 | Forsyth et al. |
| 4,896,980 A | 1/1990 | Sanders et al. |
| 4,921,365 A | 5/1990 | Sanders et al. |
| 4,931,546 A | 6/1990 | Tardy et al. |
| 4,945,050 A | 7/1990 | Sanford et al. |
| 4,948,280 A | 8/1990 | Sanders et al. |
| 4,969,758 A | 11/1990 | Sanders et al. |
| 4,970,168 A | 11/1990 | Tumer |
| 4,980,112 A | 12/1990 | Masters |
| 4,980,403 A | 12/1990 | Bateman et al. |
| 5,016,121 A | 5/1991 | Peddle et al. |
| 5,039,297 A | 8/1991 | Masters |
| 5,040,911 A | 8/1991 | Sanders et al. |
| 5,108,424 A | 4/1992 | Hoffman et al. |
| 5,134,178 A | 7/1992 | Nishibori |
| 5,134,569 A | 7/1992 | Masters |
| 5,153,067 A | 10/1992 | Yoshida et al. |
| 5,157,111 A | 10/1992 | Pachence |
| 5,171,273 A | 12/1992 | Silver et al. |
| 5,185,253 A | 2/1993 | Tumer |
| 5,201,745 A | 4/1993 | Tayot et al. |
| 5,204,055 A | 4/1993 | Sachs et al. |
| 5,216,606 A | 6/1993 | Lentz et al. |
| 5,229,112 A | 7/1993 | Obukowicz et al. |
| 5,304,730 A | 4/1994 | Lawson et al. |
| 5,349,124 A | 9/1994 | Fischhoff et al. |
| 5,362,865 A | 11/1994 | Austin |
| 5,378,619 A | 1/1995 | Rogers |
| 5,424,412 A | 6/1995 | Brown et al. |
| 5,487,992 A | 1/1996 | Capecchi et al. |
| 5,490,962 A | 2/1996 | Cima et al. |
| 5,492,937 A | 2/1996 | Bogentoft et al. |
| 5,495,071 A | 2/1996 | Fischhoff et al. |
| 5,503,999 A | 4/1996 | Jilka et al. |
| 5,510,253 A | 4/1996 | Mitsky et al. |
| 5,546,313 A | 8/1996 | Masters |
| 5,589,612 A | 12/1996 | Jilka et al. |
| 5,593,859 A | 1/1997 | Prockop et al. |
| 5,593,874 A | 1/1997 | Brown et al. |
| 5,599,695 A | 2/1997 | Pease et al. |
| 5,602,321 A | 2/1997 | John |
| 5,605,662 A | 2/1997 | Heller et al. |
| 5,614,396 A | 3/1997 | Bradley et al. |
| 5,627,061 A | 5/1997 | Barry et al. |
| 5,631,152 A | 5/1997 | Fry et al. |
| 5,633,435 A | 5/1997 | Barry et al. |
| 5,658,802 A | 8/1997 | Hayes et al. |
| 5,659,122 A | 8/1997 | Austin |
| 5,689,052 A | 11/1997 | Brown et al. |
| 5,697,324 A | 12/1997 | Van Der Lely |
| 5,702,717 A | 12/1997 | Cha et al. |
| 5,716,837 A | 2/1998 | Barry et al. |
| 5,739,832 A | 4/1998 | Heinzl et al. |
| 5,763,241 A | 6/1998 | Fischhoff et al. |
| 5,763,245 A | 6/1998 | Greenplate et al. |
| 5,792,933 A | 8/1998 | Ma |
| 5,797,898 A | 8/1998 | Santini, Jr. et al. |
| 5,798,779 A | 8/1998 | Nakayasu et al. |
| 5,804,425 A | 9/1998 | Barry et al. |
| 5,824,838 A | 10/1998 | Melmed et al. |
| 5,831,070 A | 11/1998 | Pease et al. |
| 5,859,347 A | 1/1999 | Brown et al. |
| 5,866,121 A | 2/1999 | Coffino et al. |
| 5,869,720 A | 2/1999 | John |
| 5,929,208 A | 7/1999 | Heller et al. |
| 5,932,056 A | 8/1999 | Mark et al. |
| 5,932,439 A | 8/1999 | Bogosian |
| 5,945,319 A | 8/1999 | Keogh |
| 5,959,091 A | 9/1999 | Watrud et al. |
| 5,959,179 A | 9/1999 | Hinchee et al. |
| 5,981,841 A | 11/1999 | Santino et al. |
| 6,087,102 A | 7/2000 | Chenchik et al. |
| 6,103,528 A | 8/2000 | An et al. |
| 6,109,717 A | 8/2000 | Kane et al. |
| 6,123,861 A | 9/2000 | Santini, Jr. et al. |
| 6,132,468 A | 10/2000 | Mansmann |
| 6,139,831 A | 10/2000 | Shivashankar et al. |
| 6,171,797 B1 | 1/2001 | Perbost |
| 6,197,575 B1 | 3/2001 | Griffith et al. |
| 6,239,273 B1 | 5/2001 | Pease et al. |
| 6,261,493 B1 | 7/2001 | Gaylo et al. |
| 6,277,600 B1 | 8/2001 | Tomita et al. |
| 6,336,480 B2 | 1/2002 | Gaylo et al. |
| 6,365,650 B1 | 4/2002 | Chen et al. |
| 6,368,361 B1 | 4/2002 | Yayabe et al. |
| 6,383,549 B1 | 5/2002 | Agostinelli |
| 6,387,707 B1 | 5/2002 | Seul et al. |
| 6,394,585 B1 | 5/2002 | Ross |
| 6,402,403 B1 | 6/2002 | Speakman |
| 6,419,883 B1 | 7/2002 | Blanchard |
| 6,428,978 B1 | 8/2002 | Olsen et al. |
| 6,451,346 B1 | 9/2002 | Shah et al. |

(56) References Cited

U.S. PATENT DOCUMENTS

| | | |
|---|---|---|
| 6,454,811 B1 | 9/2002 | Sherwood et al. |
| 6,455,311 B1 | 9/2002 | Vacanti |
| 6,495,102 B1 | 12/2002 | Suslick et al. |
| 6,497,510 B1 | 12/2002 | Delametter et al. |
| 6,511,958 B1 | 1/2003 | Atkinson et al. |
| 6,514,518 B2 | 2/2003 | Monkhouse et al. |
| 6,517,648 B1 | 2/2003 | Bouchette et al. |
| 6,527,378 B2 | 3/2003 | Rausch et al. |
| 6,536,873 B1 | 3/2003 | Lee et al. |
| 6,536,895 B2 | 3/2003 | Kashiwagi et al. |
| 6,538,089 B1 | 3/2003 | Samra et al. |
| 6,543,872 B2 | 4/2003 | Ohtsuka et al. |
| 6,547,994 B1 | 4/2003 | Monkhouse et al. |
| 6,548,263 B1 | 4/2003 | Kapur et al. |
| 6,550,904 B2 | 4/2003 | Koitabashi et al. |
| 6,561,626 B1 | 5/2003 | Min et al. |
| 6,561,642 B2 | 5/2003 | Gonzalez |
| 6,565,176 B2 | 5/2003 | Anderson et al. |
| 6,596,304 B1 | 7/2003 | Bayon et al. |
| 6,708,531 B1 | 3/2004 | Thanikaivelan et al. |
| 6,733,859 B2 | 5/2004 | Yoneda et al. |
| 6,762,336 B1 | 7/2004 | MacPhee et al. |
| 6,800,384 B2 | 10/2004 | Suzuki et al. |
| 6,835,390 B1 | 12/2004 | Vein |
| 6,942,830 B2 | 9/2005 | Muelhaupt et al. |
| 6,979,670 B1 | 12/2005 | Lyngstadaas et al. |
| 7,004,978 B2 | 2/2006 | Kando et al. |
| 7,051,654 B2 | 5/2006 | Boland et al. |
| 7,056,845 B2 | 6/2006 | Waeber et al. |
| 7,166,464 B2 | 1/2007 | McAllister et al. |
| 7,270,829 B2 | 9/2007 | Van Eelen |
| 7,625,198 B2 | 12/2009 | Lipson et al. |
| 7,812,075 B2 | 10/2010 | Hong |
| 7,882,717 B2 | 2/2011 | Widdemer |
| 8,076,137 B2 | 12/2011 | McAllister et al. |
| 8,076,385 B2 | 12/2011 | Ohama |
| 8,153,176 B2 | 4/2012 | Etayo Garralda et al. |
| 8,188,230 B2 | 5/2012 | Van Heerde et al. |
| 8,328,878 B2 | 12/2012 | Zhang |
| 8,343,522 B2 | 1/2013 | Pohl et al. |
| 8,491,668 B2 | 7/2013 | Hinestroza et al. |
| 8,628,837 B2 | 1/2014 | Kusuura |
| 8,679,197 B2 | 3/2014 | Hinestroza et al. |
| 8,703,216 B2 | 4/2014 | Forgacs et al. |
| 8,741,415 B2 | 6/2014 | Kusuura |
| 8,785,195 B2 | 7/2014 | Takeuchi et al. |
| 8,916,263 B2 | 12/2014 | Kusuura |
| 9,023,619 B2 | 5/2015 | De Boer |
| 9,103,066 B2 | 8/2015 | Kusuura |
| 9,156,950 B2 | 10/2015 | Garralda et al. |
| 9,163,205 B2 | 10/2015 | Sivik et al. |
| 9,163,338 B2 | 10/2015 | Schauer et al. |
| 9,181,404 B2 | 11/2015 | Neresini et al. |
| 9,259,455 B2 | 2/2016 | Song et al. |
| 9,332,779 B2 | 5/2016 | Marga |
| 9,428,817 B2 | 8/2016 | Greene |
| 9,439,813 B2 | 9/2016 | Terada |
| 9,518,106 B2 | 12/2016 | Saeidi et al. |
| 9,539,363 B2 | 1/2017 | Shimp |
| 9,708,757 B2 | 7/2017 | Viladot Petit et al. |
| 9,733,393 B2 | 8/2017 | Liu et al. |
| 9,752,122 B2 | 9/2017 | Marga et al. |
| 9,821,089 B2 | 11/2017 | Haj-Ali et al. |
| 10,124,543 B1 | 11/2018 | Tymon et al. |
| 10,131,096 B1 | 11/2018 | Tymon et al. |
| 10,138,595 B1 | 11/2018 | Tymon |
| 10,259,191 B2 | 4/2019 | Wijesena et al. |
| 10,273,549 B2 | 4/2019 | Helgason et al. |
| 10,294,611 B2 | 5/2019 | Eryilmaz et al. |
| 10,301,440 B2 | 5/2019 | Purcell et al. |
| 10,370,504 B2 | 8/2019 | Purcell et al. |
| 10,370,505 B2 | 8/2019 | Purcell et al. |
| 10,519,285 B2 | 12/2019 | Purcell et al. |
| 2002/0031500 A1 | 3/2002 | MacLaughlin et al. |
| 2002/0059049 A1 | 5/2002 | Bradbury et al. |
| 2002/0064808 A1 | 5/2002 | Mutz et al. |
| 2002/0064809 A1 | 5/2002 | Mutz et al. |
| 2002/0084290 A1 | 7/2002 | Materna |
| 2002/0089561 A1 | 7/2002 | Weitzel et al. |
| 2002/0090720 A1 | 7/2002 | Mutz et al. |
| 2002/0106412 A1 | 8/2002 | Rowe et al. |
| 2002/0142391 A1 | 10/2002 | Kivirikko et al. |
| 2002/0160109 A1 | 10/2002 | Yeo et al. |
| 2002/0164319 A1 | 11/2002 | Khaw et al. |
| 2002/0173586 A1 | 11/2002 | Jeong et al. |
| 2002/0182633 A1 | 12/2002 | Chen et al. |
| 2002/0188349 A1 | 12/2002 | McAllister et al. |
| 2003/0012805 A1 | 1/2003 | Chen et al. |
| 2003/0027332 A1 | 2/2003 | Lafrance et al. |
| 2003/0031500 A1 | 2/2003 | Bouveresse |
| 2003/0032203 A1 | 2/2003 | Sabatini et al. |
| 2003/0059537 A1 | 3/2003 | Chilkoti et al. |
| 2003/0100824 A1 | 5/2003 | Warren et al. |
| 2003/0113433 A1 | 6/2003 | Tempesta |
| 2003/0118560 A1 | 6/2003 | Kelly et al. |
| 2003/0129699 A1 | 7/2003 | Perret et al. |
| 2003/0134120 A1 | 7/2003 | Kim et al. |
| 2003/0153078 A1 | 8/2003 | Libera et al. |
| 2003/0175410 A1 | 9/2003 | Campbell et al. |
| 2003/0190438 A1 | 10/2003 | Suzuki et al. |
| 2003/0207638 A1 | 11/2003 | Bowlin et al. |
| 2004/0005663 A1 | 1/2004 | Bell et al. |
| 2004/0018226 A1 | 1/2004 | Wnek et al. |
| 2004/0018592 A1 | 1/2004 | Bell et al. |
| 2004/0037813 A1 | 2/2004 | Simpson et al. |
| 2004/0039727 A1 | 2/2004 | Dessloch et al. |
| 2004/0046277 A1 | 3/2004 | Burger et al. |
| 2004/0116032 A1 | 6/2004 | Bowlin et al. |
| 2004/0219133 A1 | 11/2004 | Lyles |
| 2004/0237208 A1 | 12/2004 | Day |
| 2005/0084719 A1 | 4/2005 | Yoshimoto et al. |
| 2005/0118326 A1 | 6/2005 | Anfinsen et al. |
| 2005/0129730 A1 | 6/2005 | Pang et al. |
| 2005/0163912 A1 | 7/2005 | White |
| 2005/0202268 A1 | 9/2005 | Kotter et al. |
| 2005/0261427 A1 | 11/2005 | Saito |
| 2005/0276791 A1 | 12/2005 | Hansford et al. |
| 2006/0121006 A1 | 6/2006 | Chancellor et al. |
| 2006/0141479 A1 | 6/2006 | Song et al. |
| 2006/0270037 A1 | 11/2006 | Kato et al. |
| 2007/0088341 A1 | 4/2007 | Skiba et al. |
| 2007/0142916 A1 | 6/2007 | Olson et al. |
| 2007/0184742 A1 | 8/2007 | Coulson et al. |
| 2007/0231787 A1 | 10/2007 | Voelker |
| 2007/0238167 A1 | 10/2007 | Perez et al. |
| 2007/0292702 A1 | 12/2007 | Saumweber |
| 2008/0070304 A1 | 3/2008 | Forgacs et al. |
| 2008/0103267 A1 | 5/2008 | Chino et al. |
| 2008/0171994 A1 | 7/2008 | Williams et al. |
| 2008/0242822 A1* | 10/2008 | West .............. C08G 18/6446 527/204 |
| 2009/0005867 A1 | 1/2009 | Lefranc et al. |
| 2009/0041907 A1 | 2/2009 | Etayo et al. |
| 2009/0069893 A1 | 3/2009 | Paukshto et al. |
| 2009/0142307 A1 | 6/2009 | Athanasiou et al. |
| 2009/0162896 A1 | 6/2009 | Scheibel |
| 2009/0208466 A1 | 8/2009 | Yoo et al. |
| 2009/0209823 A1 | 8/2009 | Yamane |
| 2009/0248145 A1 | 10/2009 | Chan et al. |
| 2010/0016872 A1 | 1/2010 | Bayon et al. |
| 2010/0041134 A1 | 2/2010 | Forgacs et al. |
| 2010/0087854 A1 | 4/2010 | Stopek et al. |
| 2010/0189712 A1 | 7/2010 | L'Heureux et al. |
| 2010/0256314 A1 | 10/2010 | Marsden et al. |
| 2010/0325811 A1 | 12/2010 | Kashiwagura et al. |
| 2011/0151231 A1 | 6/2011 | Chomarat et al. |
| 2011/0151563 A1 | 6/2011 | Paukshto et al. |
| 2011/0165301 A1 | 7/2011 | Blumenthal |
| 2011/0212179 A1 | 9/2011 | Liu |
| 2011/0212501 A1 | 9/2011 | Yoo |
| 2011/0250308 A1 | 10/2011 | Jun et al. |
| 2011/0288274 A1 | 11/2011 | Russell et al. |
| 2012/0010119 A1 | 1/2012 | Cunningham |
| 2012/0023777 A1 | 2/2012 | Greene |

(56) References Cited

U.S. PATENT DOCUMENTS

| | | | |
|---|---|---|---|
| 2012/0040119 A1 | 2/2012 | Gagnieu et al. | |
| 2012/0053689 A1 | 3/2012 | Martin et al. | |
| 2012/0116053 A1 | 5/2012 | Mirochnitchenko et al. | |
| 2012/0116568 A1 | 5/2012 | Murphy et al. | |
| 2012/0164200 A1 | 6/2012 | Qin et al. | |
| 2012/0190473 A1 | 7/2012 | Swist | |
| 2012/0230950 A1 | 9/2012 | Niklason et al. | |
| 2012/0273993 A1 | 11/2012 | Shoseyov et al. | |
| 2012/0276203 A1 | 11/2012 | Selim et al. | |
| 2012/0316646 A1 | 12/2012 | Gretzer et al. | |
| 2013/0029008 A1 | 1/2013 | Forgacs et al. | |
| 2013/0131781 A1 | 5/2013 | Greenhalgh et al. | |
| 2013/0142763 A1 | 6/2013 | Carlson et al. | |
| 2013/0215598 A1 | 8/2013 | Guzan et al. | |
| 2013/0255003 A1 | 10/2013 | Forgacs et al. | |
| 2013/0256064 A1 | 10/2013 | Bongaerts et al. | |
| 2013/0287896 A1 | 10/2013 | Harel et al. | |
| 2014/0005663 A1 | 1/2014 | Heard et al. | |
| 2014/0017284 A1 | 1/2014 | Yang et al. | |
| 2014/0021703 A1 | 1/2014 | Scharf et al. | |
| 2014/0093618 A1 | 4/2014 | Forgacs et al. | |
| 2014/0193477 A1 | 7/2014 | Chaikof et al. | |
| 2014/0205729 A1 | 7/2014 | Didzbalis et al. | |
| 2014/0215850 A1* | 8/2014 | Redl | A43B 23/0235 36/47 |
| 2014/0264079 A1 | 9/2014 | Tarahomi et al. | |
| 2015/0013299 A1 | 1/2015 | Haj-Ali et al. | |
| 2015/0079238 A1 | 3/2015 | Marga et al. | |
| 2015/0216216 A1 | 8/2015 | Marga | |
| 2015/0306276 A1 | 10/2015 | Shimp | |
| 2016/0097109 A1 | 4/2016 | Forgacs et al. | |
| 2016/0097154 A1 | 4/2016 | Dumbrique et al. | |
| 2016/0106674 A1 | 4/2016 | Scalesciani | |
| 2016/0227831 A1 | 8/2016 | Marga | |
| 2016/0250831 A1 | 9/2016 | Gladish et al. | |
| 2016/0280960 A1 | 9/2016 | Leimer et al. | |
| 2016/0348078 A1 | 12/2016 | Forgacs et al. | |
| 2016/0376737 A1 | 12/2016 | Marga et al. | |
| 2017/0152301 A1 | 6/2017 | Koob et al. | |
| 2017/0233536 A1 | 8/2017 | Purcell et al. | |
| 2017/0233537 A1 | 8/2017 | Purcell et al. | |
| 2017/0233836 A1 | 8/2017 | Jakab et al. | |
| 2017/0233943 A1* | 8/2017 | Purcell | B32B 5/26 442/60 |
| 2017/0233944 A1 | 8/2017 | Purcell et al. | |
| 2017/0233945 A1 | 8/2017 | Purcell et al. | |
| 2017/0298565 A1 | 10/2017 | Eryilmaz et al. | |
| 2018/0084792 A1 | 3/2018 | Garcia et al. | |
| 2018/0105659 A1 | 4/2018 | Hu et al. | |
| 2018/0119318 A1 | 5/2018 | Morales | |
| 2018/0230644 A1 | 8/2018 | Purcell et al. | |
| 2018/0237592 A1 | 8/2018 | Celia | |
| 2018/0282937 A1 | 10/2018 | Bainbridge et al. | |
| 2018/0371665 A1 | 12/2018 | Lin et al. | |
| 2019/0024303 A1 | 1/2019 | Lee et al. | |
| 2019/0032275 A1 | 1/2019 | Zhou et al. | |
| 2019/0127907 A1 | 5/2019 | Eryilmaz et al. | |
| 2019/0136060 A1 | 5/2019 | Helgason et al. | |
| 2019/0144957 A1 | 5/2019 | Purcell et al. | |
| 2019/0203000 A1 | 7/2019 | Purcell et al. | |
| 2019/0226141 A1 | 7/2019 | Aydin et al. | |
| 2020/0199695 A1 | 6/2020 | Forgacs et al. | |
| 2020/0207932 A1 | 7/2020 | Purcell et al. | |
| 2020/0231805 A1 | 7/2020 | Teglia et al. | |
| 2020/0370215 A1 | 11/2020 | Marga et al. | |
| 2021/0023764 A1 | 1/2021 | Babin et al. | |
| 2021/0300994 A1 | 9/2021 | Schachtschneider et al. | |

FOREIGN PATENT DOCUMENTS

| | | |
|---|---|---|
| CN | 101946852 A | 1/2011 |
| CN | 102105075 A | 6/2011 |
| CN | 102906318 A | 1/2013 |
| CN | 203021702 U | 6/2013 |
| CN | 203021703 U | 6/2013 |
| CN | 203021840 U | 6/2013 |
| CN | 203021842 U | 6/2013 |
| CN | 203021843 U | 6/2013 |
| CN | 103231577 A | 8/2013 |
| CN | 103233321 A | 8/2013 |
| CN | 103233322 A | 8/2013 |
| CN | 103233324 A | 8/2013 |
| CN | 103233325 A | 8/2013 |
| CN | 103233326 A | 8/2013 |
| CN | 103255504 A | 8/2013 |
| CN | 103255506 A | 8/2013 |
| CN | 103255508 A | 8/2013 |
| CN | 103255509 A | 8/2013 |
| CN | 103255579 A | 8/2013 |
| CN | 103255581 A | 8/2013 |
| CN | 103255586 A | 8/2013 |
| CN | 103256796 A | 8/2013 |
| CN | 103266425 A | 8/2013 |
| CN | 103276531 A | 9/2013 |
| CN | 203174344 U | 9/2013 |
| CN | 203174410 U | 9/2013 |
| CN | 203174411 U | 9/2013 |
| CN | 203174412 U | 9/2013 |
| CN | 203174413 U | 9/2013 |
| CN | 203174414 U | 9/2013 |
| CN | 203174415 U | 9/2013 |
| CN | 203174416 U | 9/2013 |
| CN | 203174417 U | 9/2013 |
| CN | 203174418 U | 9/2013 |
| CN | 203174419 U | 9/2013 |
| CN | 203291935 U | 11/2013 |
| CN | 203295678 U | 11/2013 |
| CN | 203295679 U | 11/2013 |
| CN | 203295689 U | 11/2013 |
| CN | 203295690 U | 11/2013 |
| CN | 203295794 U | 11/2013 |
| CN | 203295796 U | 11/2013 |
| CN | 203298579 U | 11/2013 |
| CN | 203307577 U | 11/2013 |
| CN | 102995165 B | 1/2015 |
| CN | 103252276 B | 1/2015 |
| CN | 204112009 U | 1/2015 |
| CN | 204112011 U | 1/2015 |
| CN | 103014924 B | 2/2015 |
| CN | 103231576 B | 4/2015 |
| CN | 103255653 B | 4/2015 |
| CN | 104603293 A | 5/2015 |
| CN | 104695205 A | 6/2015 |
| CN | 105102711 A | 11/2015 |
| CN | 205347859 U | 6/2016 |
| CN | 205361168 U | 7/2016 |
| CN | 106987931 A | 7/2017 |
| CN | 207193461 U | 4/2018 |
| CN | 108660607 A | 10/2018 |
| CN | 208419533 U | 1/2019 |
| EP | 0067553 A2 | 12/1982 |
| EP | 0078040 A2 | 5/1983 |
| EP | 0089029 A2 | 9/1983 |
| EP | 0421450 A2 | 4/1991 |
| EP | 0426641 A2 | 5/1991 |
| EP | 0470399 A2 | 2/1992 |
| EP | 0531273 A2 | 3/1993 |
| EP | 0578627 A1 | 1/1994 |
| EP | 0388854 B1 | 11/1994 |
| EP | 0709462 A2 | 5/1996 |
| EP | 1589091 A1 | 10/2005 |
| EP | 1589098 A1 | 10/2005 |
| EP | 1232182 B1 | 10/2007 |
| EP | 2003239 A1 | 12/2008 |
| EP | 2090584 A1 | 8/2009 |
| EP | 2319337 A1 | 5/2011 |
| EP | 2148887 B1 | 4/2014 |
| EP | 2721941 A1 | 4/2014 |
| EP | 3205668 A1 | 8/2017 |
| FR | 2188610 A5 | 1/1974 |
| GB | 723214 A | 2/1955 |
| GB | 723215 A | 2/1955 |
| GB | 992585 A | 5/1965 |

(56) References Cited

FOREIGN PATENT DOCUMENTS

| | | |
|---|---|---|
| GB | 1024769 A | 4/1966 |
| GB | 1367490 A | 9/1974 |
| JP | S58146345 A | 8/1983 |
| JP | S60203264 A | 10/1985 |
| JP | H04146273 A | 5/1992 |
| JP | H05184661 A | 7/1993 |
| JP | H05279966 A | 10/1993 |
| JP | 6017378 A | 1/1994 |
| JP | H06158546 A | 6/1994 |
| JP | H06198800 A | 7/1994 |
| JP | H0770600 A | 3/1995 |
| JP | 9047502 A | 2/1997 |
| KR | 100716015 B1 | 5/2007 |
| WO | WO-8303224 A1 | 9/1983 |
| WO | WO-9119806 A1 | 12/1991 |
| WO | WO-9412563 A1 | 6/1994 |
| WO | WO-9717459 A1 | 5/1997 |
| WO | WO-9730582 A1 | 8/1997 |
| WO | WO-9748814 A2 | 12/1997 |
| WO | WO-9808962 A1 | 3/1998 |
| WO | WO-9831812 A1 | 7/1998 |
| WO | WO-9845457 A1 | 10/1998 |
| WO | WO-9858069 A1 | 12/1998 |
| WO | WO-9907206 A1 | 2/1999 |
| WO | WO-9916890 A2 | 4/1999 |
| WO | WO-9931222 A1 | 6/1999 |
| WO | WO-9931223 A1 | 6/1999 |
| WO | WO-9931248 A1 | 6/1999 |
| WO | WO-9940210 A1 | 8/1999 |
| WO | WO-0160922 A1 | 8/2001 |
| WO | WO-0168811 A2 | 9/2001 |
| WO | WO-2005081970 A2 | 9/2005 |
| WO | WO-2007124023 A2 | 11/2007 |
| WO | WO-2009066635 A1 | 5/2009 |
| WO | WO-2009070720 A1 | 6/2009 |
| WO | WO-2009149181 A2 | 12/2009 |
| WO | WO-2010008905 A2 | 1/2010 |
| WO | WO-2010021738 A2 | 2/2010 |
| WO | WO-2010048281 A1 | 4/2010 |
| WO | WO-2010091251 A2 | 8/2010 |
| WO | WO-2011051983 A1 | 5/2011 |
| WO | WO-2012054195 A2 | 4/2012 |
| WO | WO-2012108907 A1 | 8/2012 |
| WO | WO-2013039118 A1 | 3/2013 |
| WO | WO-2013149083 A1 | 10/2013 |
| WO | WO-2014039938 A1 | 3/2014 |
| WO | WO-2014195426 A1 | 12/2014 |
| WO | WO-2014201406 A1 | 12/2014 |
| WO | WO-2016073453 A1 | 5/2016 |
| WO | WO-2017053433 A1 | 3/2017 |
| WO | WO-2017131196 A1 | 8/2017 |
| WO | WO-2017142892 A1 | 8/2017 |
| WO | WO-2018058874 A1 | 4/2018 |
| WO | WO-2018110819 A1 | 6/2018 |
| WO | WO-2018137041 A1 | 8/2018 |
| WO | WO-2018164020 A1 | 9/2018 |
| WO | WO-2018164234 A1 | 9/2018 |
| WO | WO-2018185246 A1 | 10/2018 |
| WO | WO-2018211994 A1 | 11/2018 |
| WO | WO-2019007442 A2 | 1/2019 |
| WO | WO-2019017987 A1 | 1/2019 |
| WO | WO-2019065735 A1 | 4/2019 |
| WO | WO-2019110325 A1 | 6/2019 |
| WO | WO-2019110960 A1 | 6/2019 |
| WO | WO-2019117724 A1 | 6/2019 |
| WO | WO-2019149914 A1 | 8/2019 |
| WO | WO-2019158341 A1 | 8/2019 |

OTHER PUBLICATIONS

Translation of JP H06-017378 (Year: 1994).*
Hum, H and Boccaccini., "Collagen as Coating Material for 45S5 Bioactive Glass-Based Scaffolds for Bone Tissue Engineering," International Journal of Molecular Sciences, 19(6):1807, Switzerland : MDPI (Jun. 2018).
UniProt Submission C03A1_HUMAN. Collagen alpha-1(III) chain (Dec. 5, 2018) [Retrieved from the Internet Apr. 13, 2020:(https://www.uniprot.org/uniprot/P02461.txt?version=212) ].
International Search Report and Written Opinion for International Application No. PCT/US2020/013828, dated Jun. 9, 2020.
Abedin, M.Z., et al., "Isolation and Native Characterization of Cysteine-rich Collagens From Bovine Placental Tissues and Uterus and Their Relationship to Types Iv and V Collagens," Bioscience Reports, 2(7):493-502, Portland Press on behalf of the Biochemical Society, England, (Jul. 1982).
Aldhous, Print me a heart and a set of arteries, New Scientist, Apr. 15, 2006, retrieved from the internet on Jun. 3, 2015. Retrieved from the Internet: (http://organprint.missouri.edu/www/news/NewScientistApril2006.pdf).
Apte, S.S., et al., "Cloning of the Human and Mouse Type X Collagen Genes and Mapping of the Mouse Type X Collagen Gene to Chromosome 10," European Journal of Biochemistry, 206(1):217-224, Blackwell Science Ltd. on behalf of the Federation of European Biochemical Societies, England, (May 1992).
Arding, Vegetarian cheese, Culture the word on cheese, 2 pgs, Dec. 3, 2013, retrieved from the internet on Oct. 31, 2014. Retrieved from the Internet: (URL: https://culturecheesemag.com/ask-the-monger/vegetarian-cheese).
Ayad, S., et al., "Bovine Cartilage Types VI and IX Collagens," Biochemical Journal, 262(3):753-761, Published by Portland Press on behalf of the Biochemical Society, England, (Sep. 1989).
Bailey, A.J., et al., "Irradiation-Induced Crosslinking of Collagen," Radiation Research, 22(4):606-621, Kluge Carden Jennnings Pub. Co, United States, (Aug. 1964).
Barnard, N.D., et al., "The Medical Costs Attributable to Meat Consumption," Preventive Medicine, 24(6):646-655, Academic Press, Inc (Nov. 1995).
Benjaminson, M.A., et al., "In Vitro Edible Muscle Protein Production System (MPPS): Stage 1, Fish," Acta Astronautica, 51(12):879-889, Pergamon Press, England(Dec. 2002).
Bentz, H., et al., "Isolation and Partial Characterization of a New Human Collagen With an Extended Triple-helical Structural Domain," Proceedings of the National Academy of Sciences of the United States of America, 80(11):3168-3172, National Academy of Sciences, United States, (Jun. 1983).
Berger, P.H., et al. , "Expression in Transgenic Plants of a Viral Gene Product That Mediates Insect Transmission of Potyviruses," Proceedings of the National Academy of Sciences of the United States of America, 86(21):8402-8406, National Academy of Sciences, United States, (Nov. 1989).
Bevan, M, "The Structure and Transcription Start Site of a Major Potato Tuber Protein Gene," Nucleic Acids Research, 14(11):4625-4638, Information Retrieval ltd, England, (Jun. 1986).
Bhat, Z.F and Bhat, H., "Animal-free Meat Biofabrication," American Journal of Food Technology, 6(6):441-459, (Jun. 2011).
Bhat, Z.F and Bhat, H., "Tissue Engineered Meat—Future Meat," Journal of Stored Products and Postharvest Research, 2(1):1-10, (Jan. 2011).
Bian, W. and Bursac, N.,, "Engineered Skeletal Muscle Tissue Networks With Controllable Architecture," Biomaterials, 30(7):1401-1412, IPC Science and Technology Press, Netherlands, (Mar. 2009).
Bitter, G.A, "Heterologous Gene Expression in Yeast," Methods in Enzymology 152:673-684, Academic Press, United States (1987).
Boonen, K.J and Post, M.J., "The Muscle Stem Cell Niche: Regulation of Satellite Cells During Regeneration," Tissue Engineering Part B, 14(4):419-431, Mary Ann Liebert, Inc, United States (Dec. 2008).
Boonen K.J.M., et al., "Essential Environmental Cues From the Satellite Cell Niche: Optimizing Proliferation and Differentiation," American Journal of Physiology—Cell Physiology, 296(6):C1338-C1345, (Jun. 2009).
Bray E.A, "Expression of the β-subunit of β-conglycinin in Seeds of Transgenic Plants," Planta, 172(3):364-370, Springer-Verlag [etc.], Germany, (Nov. 1987).

(56) References Cited

OTHER PUBLICATIONS

Brisson, N., et al., "Plant Virus Vectors: Cauliflower Mosaic Virus," Methods for Plant Molecular Biology, 437-446, New York, Academic Press, (1988).

Broglie, R., et al., "Light-regulated Expression of a Pea Ribulose-1,5-bisphosphate Carboxylase Small Subunit Gene in Transformed Plant Cells," Science 224(4651):838-843, Nature Publishing Group, England (May 1984).

Burgeson, R.E and Nimni, M.E, "Collagen Types: Molecular Structure and Tissue Distribution," Clinical Orthopaedics and Related Research, 282:250-272, Wolters Kluwer, United States, (Sep. 1992).

Byers, P.H, "Preparation of Type III Procollagen and Collagen From Rat Skin," Biochemistry, 13(25):5243-5248, American Chemical Society, United States, (Dec. 1974).

Casas A.M., et al., "Transgenic Sorghum Plants via Micro Projectile Bombardment," Proceedings of the National Academy of Sciences of the United States of America, 90(23):11212-11216, National Academy of Sciences, United States, (Dec. 1993).

Christensen A.H., et al., "Maize Polyubiquitin Genes: Structure, Thermal Perturbation of Expression and Transcript Splicing, and Promoter Activity Following Transfer to Protoplasts by Electroporation," Plant Molecular Biology, 18(4):675-689, (Feb. 1992).

Christou, P., et al., "The Development of a Variety-independent Gene-transfer Method for Rice," Trends in Biotechnology, 10:239-246, Elsevier Inc., (Jul. 1992).

Chua, J., "Grow Your Own Microbial 'Leather' in Your Kitchen (DIY Tutorial)", Ecouterre, Feb. 23, 2015, [online], [Retrieved on Sep. 1, 2017], Retrieved from the Internet (URL: www.ecouterre.com/grow-your-own-microbial-leatherin your-kitchen-diy-tutorial).

Cornejo, M.J., et al., "Activity of a Maize Ubiquitin Promoter in Transgenic Rice," Plant Molecular Biology, 23(3):567-581, Kluwer Academic, Netherlands, (Nov. 1993).

Coruzzi, G., et al., "Tissue-specific and Light-regulated Expression of a Pea Nuclear Gene Encoding the Small Subunit of Ribulose-1, 5-Bisphosphate Carboxylase," European Molecular Biology Organization 3(8):1671-1679, PMC, United States National Library of Medicine National Institutes of Health, United States (Aug. 1984).

Database WPI, Week 199427, Thomson Scientific, London, GB, 1994-AN 1994-222702.

Datar, I and Betti, M., "Possibilities for an in Vitro Meat Production System," Innovative Food Science and Emerging Technologies, 11(1):13-22, Elsevier Ltd(Jan. 2010).

De-Deyne, P.G., "Formation of Sarcomeres in Developing Myotubes: Role of Mechanical Stretch and Contractile Activation," American Journal of Physiology-Cell Physiology, 279(6):C1801-C1811, (Dec. 2000).

Dennis, R.G and Kosnik, P.E 2nd., "Excitability and Isometric Contractile Properties of Mammalian Skeletal Muscle Constructs Engineered in Vitro," In Vitro Cellular & Developmental Biology, 36(5):327-335, Springer, Germany (May 2000).

Dennis, R.G., et al., "Excitability and Contractility of Skeletal Muscle Engineered From Primary Cultures and Cell Lines," American Journal of Physiology—Cell Physiology, 280(2):C288-C295, American Physiological Society, United States (Feb. 2001).

Duance, V.C., et al., "Isolation and Characterization of the Precursor of Type M Collagen," Biochemical Journal, 221(3):885-889, Published by Portland Press on behalf of the Biochemical Society, England, (Aug. 1984).

Edelman, E.R., "Vascular Tissue Engineering: Designer Arteries," Circulation Research 85(12):1115-1117, Lippincott Williams & Wilkins, United States (Dec. 1999).

Edelman, P.D., et al., "Commentary: in Vitro-cultured Meat Production," Tissue Engineering, 11(5-6):659-662, Mary Ann Liebert, Inc, United States (May-Jun. 2005).

Elstow, S.F. and Weiss, J.B, "Extraction, Isolation and Characterization of Neutral Salt Soluble Type V Collagen From Fetal Calf Skin," Collagen and Related Research, 3(3):181-193, Gustav Fischer Verlag, Germany, (May 1983).

Engler, A. J., et al., "Myotubes Differentiate Optimally on Substrates With Tissue-like Stiffness: Pathological Implications for Soft or Stiff Microenvironments," Journal of Cell Biology, 166(6):877-887, Rockefeller University Press, United States (Sep. 2004).

Extended European Search Report dated Jul. 18, 2017 for EP Patent Application No. 17156365.3.

Extended European Search Report dated Apr. 18, 2019 in EP Patent Application No. 18205321.5, 7 pages.

Filler, Definition of Filler by Merriam-Webstaer, Retrieved from the Internet [Aug. 19, 2018], Retrieved from the Internet (URL: http://www.merriam-webster.com/dictionary/filler).

Fonseca, S., et al., "Slow Fiber Cluster Pattern in Pig Longissimus Thoracic Muscle: Implications for Myogenesis," Journal of Animal Science, 81(4):973-983, American Society of Animal Science, United States (Apr. 2003).

Fromm, M.E., et al., "Inheritance and Expression of Chimeric Genes in the Progeny of Transgenic Maize Plants," Bio/technology (Nature Publishing Company), 8(9):833-839, Nature Publishing Company, [c1983]-1996, United States, (Sep. 1990).

Future Trends in the World Leather Products Industry and Trade, United Nation Industrial Development Organization, Vienna, 2010.

Gawlitta, D., et al., "The Influence of Serum-free Culture Conditions on Skeletal Muscle Differentiation in a Tissue-engineered Model," Tissue Engineering Part A, 14(1):161-171, (Jan. 2008).

Gordon, et al., "Discovery of a New Collagen, Type XX, Present in Chick Cornea," Investigative Ophthalmology & Visual Science, 39(4):S1128, (Mar. 1998), (Abstract only).

Gordon, et al., "Type XX Collagen, A New Member of the Fibril-Associated (FACIT) Family of Collagens," The FASEB Journal, 13(5):A1119, (Mar. 1999).

Gurley, W.B., et al., "Upstream Sequences Required for Efficient Expression of a Soybean Heat Shock Gene," Molecular and Cellular Biology 6(2):559-565, American Society for Microbiology, United States (Feb. 1986).

Harris, J.R., et al., "In Vitro Fibrillogenesis of Collagen Type I in Varying Ionic and Ph Conditions," Micron, 49:60-68, Pergamon Press, c1993, England, (Jun. 2013).

Hinchee, M.A.W., et al., "Production of Transgenic Soybean Plants Using Agrobacterium-mediated DNA Transfer," Bio/Technology, 6:915-922, (Aug. 1988).

Hopkins, P.D and Dacey, A., Vegetarian meat: could technology save animals and satisfy meat eaters?, Journal of Agricultural and Environmental Ethics, 21(6):579-596, Springer, 2008, retrieved from the internet on Jun. 2, 2015 (http://foodethics.univie.ac.at/fileadmin/user.sub.--upload/inst.sub.--et- hik.sub.--wiss.sub.--dialog/Hopkins.sub.--P..sub.--2008.sub.--Veg.sub.--Me- at.sub.--and.sub.--In.sub.--Meat.pdf).

Housley, T., et al., "Collagen Crosslinking: Isolation of Hydroxyaldoihistidine, a Naturally-occurring Crosslink," Biochemical and Biophysical Research Communications, 67(2):824-830, (Dec. 1975).

Huebner, K., et al., "Chromosomal Assignment of a Gene Encoding a New Collagen Type (Col 15a1) to 9q21-7 Q22," Genomics, 14(2):220-224, Academic Press, [c1987, United States, (Oct. 1992).

Inoguchi, K, "The mRNA for Alpha 1(Xix) Collagen Chain, a New Member of Facits, Contains a Long Unusual 3' Untranslated Region and Displays Many Unique Splicing Variants.," Journal of Biochemistry, 117(1):137-146, Oxford University Press, England, (Jan. 1995).

Inouye, S., et al., "Up-Promoter Mutations in the Ipp Gene of *Escherichia coli*," Nucleic Acids Research 13(9):3101-3110, Oxford University Press, England (1985).

International Search Report and Written Opinion for International Application No. PCT/US2016/052891, dated Dec. 15, 2016.

International Search Report and Written Opinion for International Application No. PCT/US2017/17867, dated May 19, 2017.

International Search Report and Written Opinion for International Application No. PCT/US2017/17872, dated Apr. 25, 2017.

International Search Report and Written Opinion for International Application No. PCT/US2017/17878, dated Apr. 25, 2017.

International Search Report and Written Opinion for International Application No. PCT/US2017/17889, dated May 5, 2017.

Isolate, Definition of. Merriam-Webster, Retrieved on [Dec. 22, 2017], Retrieved from the Internet (URL: http://merriam-webster.com/dictionary/isolate).

(56) References Cited

OTHER PUBLICATIONS

Jakab, K., et al., "Engineering Biological Structures of Prescribed Shape Using Self-assembling Multicellular Systems," Proceedings of the National Academy of Sciences of the United States of America 101(9):2864-2869, National Academy of Sciences, United States (Mar. 2004).

Jakab, K., et al., "Tissue Engineering by Self-assembly and Bio-printing of Living Cells," Biofabrication 2(2):022001, IOP Publishing, England (Jun. 2010).

Jenkins, C.L., et al., "Effect of 3-hydroxyproline Residues on Collagen Stability," Journal of the American Chemical Society, 125(21):6422-6427, American Chemical Society, United States, (May 2003).

Jones, B.M.M., et al., "Collagen Fibril Orientation in Ovine and Bovine Leather Affects Strength: A Small Angle X-ray Scattering (SAXS) Study," Journal of Agricultural and Food Chemistry, 59(18):9972-9979, American Chemical Society, United States, (Sep. 2011).

Juvonen, M., et al., "Patterns of Expression of the Six Alternatively Spliced Exons Affecting the Structures of the COL 1 and NC2 Domains of the a1 (XIII) Collagen Chain in Human Tissues and Cell Lines," The Journal of Biological Chemistry, 267 (34):24700-24707, (Dec. 1992).

Kapoor, R, "Type VIII Collagen From Bovine Descemet's Membrane: Structural Characterization of a Triple-helical Domain," Biochemistry, 25(13):3930-3937, American Chemical Society, United States, (Jul. 1986).

Katsumata, M., "Promotion of Intramuscular Fat Accumulation in Porcine Muscle by Nutritional Regulation," Animal Science Journal, 82(1):17-25, Wiley, Australia (Feb. 2011).

Kay, R., et al., "Duplication of Camv 35S Promoter Sequences Creates a Strong Enhancer for Plant Genes," Science, 236(4806):1299-1302, American Association for the Advancement of Science, United States, (Jun. 1987).

Kielty, C.M., et al., "Isolation and Ultrastructural Analysis of Microfibrillar Structures From Foetal Bovine Elastic Tissues," Journal of cell science, 99(4):797-807, Company of Biologists, England, (Aug. 1991).

Kielty, C.M., et al., "The Collagen Family: Structure, Assembly and Organization in the Extracellular Matrix," Connective Tissue and Its Heritable Disorders: Molecular, Genetic, and Medical Aspects, 159-221, (2002).

Kivirikko, S., et al., "Primary Structure of the Alpha 1 Chain of Human Type Xv Collagen and Exon-intron Organization in the 3' Region of the Corresponding Gene," The Journal of biological chemistry, 269(7):4773-4779, American Society for Biochemistry and Molecular Biology, (Feb. 1994).

Klemm, D., et al., "Cellulose: Fascinating Biopolymer and Sustainable Raw Material," Angewandte Chemie International Edition, 44(22):3358-3393, (May 2005).

Kosnik, P.E., et al.,"Tissue Engineering Skeletal Muscle," Functional Tissue Engineering, 377-392, Springer-Verlag, United States, (2003).

Langelaan M.L.P., et al., "Meet the New Meat: Tissue Engineered Skeletal Muscle," Trends in Food Science & Technology, 21(2):59-66, Elsevier, (Feb. 2010).

Langer, R. and Vacanti, J.P., "Tissue Engineering; Science," Science, 260(5110):920-926, American Association for the Advancement of Science, (May 1993).

Lanza., et al., "Principles of Tissue Engineering; 3rd. Ed.; Chapter 12 Principles of Tissue Culture and Bioreactor Design (III. Principles of Bioreactor Design)," Academic Press, 165-166, (Aug. 2007).

Lee, N., et al., "Efficient Transformation and Regeneration of Rice Small Cell Groups," Proceedings of the National Academy of Sciences of the United States of America, 88(15):6389-6393, National Academy of Sciences, United States, (Aug. 1991).

Lee, W., et al., "Multi-layered Culture of Human Skin Fibroblasts and Keratinocytes Through Three-dimensional Freeform Fabrication," Biomaterials 30(8):1587-1595, Elsevier Science, Netherlands (Mar. 2009).

Levenberg, S., et al., "Engineering Vascularized Skeletal Muscle Tissue," Nature Biotechnology, 23(7):879-884, Nature America Publishing, United States (Jul. 2005).

Li, K., et al., "Cloning of Type XVII Collagen," The Journal of biological chemistry, 268(12):8825-8834, American Society for Biochemistry and Molecular Biology, United States, (Apr. 1993).

Li, M., et al., "Electrospun Protein Fibers as Matrices for Tissue Engineering," Biomaterials, 26(30):5999-6008, IPC Science and Technology Press, Netherlands, (Oct. 2005).

Logan, J., et al., "Adenovirus Tripartite Leader Sequence Enhances Translation of mRNAs Late After Infection," Proceedings of the National Academy of Sciences USA 81(12):3655-3659, National Academy of Sciences, United States (Jun. 1984).

Lucklow, V.A., et al., "High Level Expression of Nonfused Foreign Genes With Autographa Californica Nuclear Polyhedrosis Virus Expression Vectors," Virology 170(1):31-39 (May 1989).

Lunstrum, G.P., et al., "Identification and Partial Purification of a Large, Variant Form of Type XII Collagen," The Journal of biological chemistry, 267(28):20087-20092, American Society for Biochemistry and Molecular Biology, United States, (Oct. 1992).

Lunstrum, G.P., et al., "Large Complex Globular Domains of Type Vii Procollagen Contribute to the Structure of Anchoring Fibrils," The Journal of biological chemistry, 261(19):9042-9048, American Society for Biochemistry and Molecular Biology, United States, (Jul. 1986).

Mackett, M., et al., "General Method for Production and Selection of Infectious Vaccinia Virus Recombinants Expressing Foreign Genes," Journal of Virology 49(3):857-864, American Society for Microbiology, United States (Mar. 1984).

Mackett, M., et al., "Vaccinia Virus: A Selectable Eukaryotic Cloning and Expression Vector," Proceedings of the National Academy of Sciences USA 79(23):7415-7419, National Academy of Sciences, United States (Dec. 1982).

Marga. F., et al., "Developmental Biology and Tissue Engineering," Birth Defects Research Part C: Embryo Today 81(4):320-328, Wiley Periodicals, Inc, United States (Dec. 2007).

Marga. F., et al., "Toward Engineering Functional Organ Modules by Additive Manufacturing," Biofabrication 4(2):022001, IOP Publishing, England (Jun. 2012).

Matsuda, N., et al., "Tissue Engineering Based on Cell Sheet Technology," Advanced Materials, 19(20):3089-3099, John Wiley & Sons, (Oct. 2007).

McElroy, D., et al., "Isolation of an Efficient Actin Promoter for Use in Rice Transformation," The Plant cell, 2(2):163-171, American Society of Plant Physiologists, c1989, United States, (Feb. 1990).

McGrath, J.A., et al., "Mutations in the 180-kd Bullous Pemphigoid Antigen (Bpag2), a Hemidesmosomal Transmembrane Collagen (col. 17a1), in Generalized Atrophic Benign Epidermolysis Bullosa," Nature genetics, 11(1):83-86, Nature Pub. Co., c1992, United States, (Sep. 1995).

Mead, P.S., et al., "Food-related Illness and Death in the United States," Emerging infectious diseases, 5(5):607-625, National Center for Infectious Diseases, Centers for Disease Control and Prevention (CDC), United States, (Sep. 1999).

Mechanic, G. and Tanzer, M.L, "Biochemistry of Collagen Crosslinking Isolation of a New Crosslink, Hydroxylysinohydroxynorleucine, and Its Reduced Precursor, Dihydroxynorleucine, From Bovine Tendon," Biochemical and biophysical research communications, 41(6):1597-1604, Elsevier, United States, (Dec. 1970).

Mechanic, G., et al., "The Nature of Crosslinking in Collagens From Mineralized Tissues," Biochemical and biophysical research communications, 45(3):644-653, Elsevier, United States, (Nov. 1971).

Medberry, S.L., et al., "The Commelina Yellow Mottle Virus Promoter is a Strong Promoter in Vascular and Reproductive Tissues," The Plant cell, 4(2):185-192, American Society of Plant Physiologists, c1989, United States, (Feb. 1992).

Meyer, M., et al., "Collagen Fibres by Theromoplastic and Wet Spinning," Materials Science and Engineering C, 30(8):1266-1271, ResearchGate , (Oct. 2010).

(56) References Cited

OTHER PUBLICATIONS

Miller, E.J. and Rhodes, R.K, "[2] Preparation and Characterization of the Different Types of Collagen," Methods in enzymology, 82(A):33-64, Academic Press, United States, (1982).
Mironov., et al., "Biofabrication: a 21st century manufacturing paradigm" Biofabrication 1 (2009) pp. 1-16.
Mironov, V., et al., "Bioprinting Living Structures," Journal of Materials Chemistry 17(20):2054-2060 (May 2007).
Munarin, F., et al., "Pectin-based Injectable Biomaterials for Bone Tissue Engineering," Biomacromolecules, 12(3):568-577, American Chemical Society, United States, (Mar. 2011), (Abstract Only).
Muragaki. Y., et al., "The Human Alpha 1(Xv) Collagen Chain Contains a Large Amino-terminal Non-triple Helical Domain With a Tandem Repeat Structure and Homology to Alpha 1(Xviii) Collagen," The Journal of biological chemistry, 269(6):4042-4046, American Society for Biochemistry and Molecular Biology, United States, (Feb. 1994).
Myers, J.C., et al., "Identification of a Previously Unknown Human Collagen Chain, Alpha 1(Xv), Characterized by Extensive Interruptions in the Triple-helical Region," Proceedings of the National Academy of Sciences of the United States of America, 89(21):10144-10148, National Academy of Sciences, United States, (Nov. 1992).
Myers, J.C., et al., "The Triple-helical Region of Human Type Xix Collagen Consists of Multiple Collagenous Subdomains and Exhibits Limited Sequence Homology to Alpha 1(XVI)," The Journal of biological chemistry, 269(28):18549-18557, American Society for Biochemistry and Molecular Biology, United States, (Jul. 1994).
Native collagen, bovine dermis, Retrieved on Oct. 13, 2018], Retrieved from the Internet (https://www.cosmobio.com/products/kou_iac50_50.html).
Niklason, L.E., et al., "Advances in Tissue Engineering of Blood Vessels and Other Tissues," Transplant Immunology 5(4):303-306, Elsevier, Netherlands (Dec. 1997 ).
Norotte, C., et al., "Scaffold-free Vascular Tissue Engineering Using Bioprinting," Biomaterials 30(30):5910-5917, Elsevier Science, Netherlands (Oct. 2009).
Oh, S.P., et al., "Cloning of Cdna and Genomic Dna Encoding Human Type XVIII Collagen and Localization of the Alpha 1(XVIII) Collagen Gene to Mouse Chromosome 10 and Human Chromosome 21," Genomics, 19(3):494-499, Academic Press, [c1987, United States, (Feb. 1994).
Oh, S.P., et al., "Isolation and Sequencing of cDNAs for Proteins With Multiple Domains of Gly-xaa-yaa Repeats Identify a Distinct Family of Collagenous Proteins," Proceedings of the National Academy of Sciences of the United States of America, 91(10):4229-4233, National Academy of Sciences, United States, (May 1994).
Olkkonen, V.M., et al., "Expression of Exogenous Proteins in Mammalian Cells With the Semliki Forest Virus Vector," Methods in cell biology, 43(A):43-53, Academic Press, United States, (1994).
Pan, T.C., et al., "Cloning and Chromosomal Location of Human Alpha 1(XVI) Collagen," Proceedings of the National Academy of Sciences of the United States of America, 89(14):6565-6569, National Academy of Sciences, United States, (Jul. 1992).
Panicali, D., et al., "Construction of Poxviruses as Cloning Vectors: Insertion of the Thymidine Kinase Gene from Herpes Simplex Virus into the DNA of Infectious Vaccinia Virus," Proceedings of the National Academy of Sciences USA 79(16):4927-4931, The National Academy of Sciences of the United States (Aug. 1982).
Park, H., et al.,, "Effects of Electrical Stimulation in C2C12 Muscle Constructs," Journal of tissue engineering and regenerative medicine, 2(5):279-287, John Wiley & Sons, England, (Jul. 2008).
Paszkowski, J., et al., "Direct Gene Transfer to Plants," The EMBO journal, 3(12):2717-2722, Wiley Blackwell, England, (Dec. 1984).
Pedersen, K., et al., "Cloning and Sequence Analysis Reveal Structural Variation Among Related Zein Genes in Maize," Cell, 29(3):1015-1026, Cell Press, United States, (Jul. 1982).
Perera, G., et al., "Hydrophobic Thiolation of Pectin With 4-aminothiophenol: Synthesis and in Vitro Characterization," American Association of Pharmaceutical Scientists, 11(1):174-180, American Association of Pharmaceutical Scientists, United States, (Mar. 2010).

Perez-Pomares, J.M., et al., "Tissue Fusion and Cell Sorting in Embryonic Development and Disease: Biomedical Implications," Bioessays 28(8):809-821, Wiley, United States (Aug. 2006).
Pette D., et al., "What Does Chronic Electrical Stimulation Teach Us About Muscle Plasticity?," Muscle & Nerve, 22(6):666-677, John Wiley & Sons, United States (Jun. 1999).
Prockop, D.J. and Kivirikko, K.I, "Collagens: Molecular Biology, Diseases, and Potentials for Therapy," Annual review of biochemistry, 64:403-434, Annual Reviews, United States, (1995).
Purify, Definition of. Merriam-Webster, Retrieved on [Dec. 22, 2017], Retrieved from the Internet (http://merriam-webster.com/dictionary/purify).
Rehn, M. and Pihlajaniemi, T, "Alpha 1(XVIII), a Collagen Chain With Frequent Interruptions in the Collagenous Sequence, a Distinct Tissue Distribution, and Homology With Type XV Collagen," Proceedings of the National Academy of Sciences of the United States of America, 91(10):4234-4238, National Academy of Sciences, United States, (May 1994).
Rehn, M., et al., "Primary Structure of the Alpha 1 Chain of Mouse Type Xviii Collagen, Partial Structure of the Corresponding Gene, and Comparison of the Alpha 1 (Xviii) Chain With Its Homologue, the Alpha 1(Xv) Collagen Chain," The Journal of biological chemistry, 269(19):13929-13935, American Society for Biochemistry and Molecular Biology, United States, (May 1994).
Riggs, C.D. and Bates, G.W, "Stable Transformation of Tobacco by Electroporation: Evidence for Plasmid Concatenation," Proceedings of the National Academy of Sciences of the United States of America, 83(15):5602-5606, National Academy of Sciences, United States, (Aug. 1986).
Rober, M.B.T., et al., "One of Two Different ADP-glucose Pyrophosphorylase Genes From Potato Responds Strongly to Elevated Levels of Sucrose," Molecular & general genetics, 224(1):136-146, New York Springer-Verlag [1967, Germany, (Oct. 1990).
Rogers, J.C., "Two Barley Alpha-amylase Gene Families Are Regulated Differently in Aleurone Cells," The Journal of biological chemistry, 260(6):3731-3738, American Society for Biochemistry and Molecular Biology, United States, (Mar. 1985).
Rogers, S.G., et al., "Improved Vectors for Plant Transformation: Expression Cassette Vectors and New Selectable Markers," Methods in Enzymology, 153:253-277, Elsevier Inc, (1987).
Ruther, U. and Muller-Hill, B., "Easy Identification of cDNA Clones," The EMBO Journal 2(10):1791-1794, IRL Press Ltd, England (1983).
Sanger, M., et al., "Characteristics of a Strong Promoter From Figwort Mosaic Virus: Comparison With the Analogous 35s Promoter From Cauliflower Mosaic Virus and the Regulated Mannopine Synthase Promoter," Plant molecular biology, 14(3):433-443, Martinus Nijhoff/Dr. W. Junk, 1981, Netherlands, (Mar. 1990).
Savadogo, P., et al.,, "Effects of Grazing Intensity and Prescribed Fire on Soil Physical and Hydrological Properties and Pasture Yield in the Savanna Woodlands of Burkina Faso," Agriculture, Ecosystems & Environment, 118(1-4):80-92, Elsevier B.V., (Jan. 2007).
Schardl, C.L., et al., "Design and Construction of a Versatile System for the Expression of Foreign Genes in Plants," Gene, 61(1):1-11, Elsevier/North-Holland, 1976, Netherlands, (1987).
Schmitt, F.O., et al., "Electron Microscope Investigations of the Structure of Collagen," Journal of Cellular Physiology, 20(1):11-33, (Aug. 1942).
Sekine, H., et al., "Myocardial Tissue Reconstruction: the Cell Sheet Engineering Approach," Inflammation and Regeneration, 27 (3):171-176, (May 2007).
Shayegan, M. and Forde, N.F.,, "Microrheological Characterization of Collagen Systems: From Molecular Solutions to Fibrillar Gels," PloS one, 8(8):1-12, Public Library of Science, United States, (Aug. 2013).
Shepherd, J.H., et al., "Effect of Fiber Crosslinking on Collagen-fiber Reinforced Collagen-chondroitin-6-sulfate Materials for Regenerating Load-bearing Soft Tissues," Journal of biomedical materials research. Part A, 101(1):176-184, John Wiley & Sons, United States, (Jan. 2013).
Shoshan, S. and Finkelstein, S., "Studies on Collagen Crosslinking in Vivo," Biochimica et biophysica acta, 154(1):261-263, Elsevier Pub. Co., Netherlands, (Jan. 1968).

(56) References Cited

OTHER PUBLICATIONS

Siegel, R.C., "Biosynthesis of Collagen Crosslinks: Increased Activity of Purified Lysyl Oxidase With Reconstituted Collagen Fibrils," Proceedings of the National Academy of Sciences of the United States of America, 71(12):4826-4830, National Academy of Sciences, United States, (Dec. 1974).

Silva, T.H., et al., "Marine Origin Collagens and Its Potential Applications," Marine drugs, 12(12):5881-5901, MDPI, [2003], Switzerland, (Dec. 2014).

Sizeland, K.H., et el., "Collagen Orientation and Leather Strength for Selected Mammals," Journal of agricultural and food chemistry, 61(4):887-892, American Chemical Society, United States, (Jan. 2013).

Smith, C.M., et al., "Three-dimensional Bioassembly Tool for Generating Viable Tissue-engineered Constructs," Tissue Engineering 10(9-10):1566-1576, Mary Ann Liebert, Inc, United States (Sep.-Oct. 2004).

Smith, G.E., et al., "Molecular Engineering of the Autographa Californica Nuclear Polyhedrosis Virus Genome: Deletion Mutations Within the Polyhedrin Gene," Journal of virology, 46(2):584-593, American Society For Microbiology, United States, (May 1983).

Sommer, F., et al., "Ascorbic Acid Modulates Proliferation and Extracellular Matrix Accumulation of Hyalocytes," Tissue engineering, 13(6):1281-1289, Mary Ann Liebert, Inc., United States, (Jun. 2007) abstract only.

Takamatsu, N., et al., "Expression of Bacterial Chloramphenicol Acetyltransferase Gene in Tobacco Plants Mediated by TMV-RNA," European Molecular Biology Organization Journal 6(2):307-311, IRL Press Limited, Oxford, England, (Feb. 1987).

Teja, A.S and Koh, P.Y, "Synthesis, Properties, and Applications of Magnetic Iron Oxide Nanoparticles," Progress in Crystal Growth and Characterization of Materials, 55(1-2):22-45, (Mar.-Jun. 2009).

Thelen, M.H., et al., "Electrical Stimulation of C2C12 Myotubes Induces Contractions and Represses Thyroid Hormone-Dependent Transcription of the Fast-type Sarcoplasmic-reticulum Ca2+-ATPase Gene," The Biochemical journal, 321(Pt 3):845-848, Published by Portland Press on behalf of the Biochemical Society, England, (Feb. 1997).

Thibault, J.F., and Rinaudo, M., "Chain Association of Pectic Molecules During Calcium-induced Gelation," Biopolymers, 25(3):455-468, John Wiley & Sons, (Mar. 1986).

Tuomisto H.L. et al., "Environmental Impacts of Cultured Meat Production," Environmental Science & Technology, 45(14):6117-6123, American Chemical Society, (Jun. 2011).

Van Heeke, G., et al., "Expression of Human Asparagine Synthetase in *Escherichia Coli*," The Journal of Biological Chemistry 264(10):5503-5509, American Society for Biochemistry and Molecular Biology, United States (Apr. 1989).

Wan, Y and Lemaux, P.G., "Generation of Large Numbers of Independently Transformed Fertile Barley Plants," Plant physiology, 104(1):37-48, American Society of Plant Biologists, United States, (Jan. 1994).

Watt, S.L., et al., "Characterization of Collagen Types Xii and XIV From Fetal Bovine Cartilage," The Journal of biological chemistry, 267(28):20093-20099, American Society for Biochemistry and Molecular Biology, United States, (Oct. 1992).

Wells, H.C., et al., "Collagen Fibril Diameter and Leather Strength," Journal of agricultural and food chemistry, 61(47):11524-11531, American Chemical Society, United States, (Nov. 2013).

Wu, J.J., et al., "Type VI Collagen of the Intervertebral Disc," The Biochemical journal, 248(2):373-381, Published by Portland Press on behalf of the Biochemical Society, England, (Dec. 1987).

Wu, S., et al., "Quantitative Analysis on Collagen Morphology in Aging Skin Based on Multiphoton Microscopy," Journal of biomedical optics, 16(4):40502, SPIE—the International Society for Optical Engineering in cooperation with International Biomedical Optics Society, c1996, (Apr. 2011).

Wu, Y., et al., "Fiber Formation by Dehydration-induced Aggregation of Albumin," Journal of Applied Polymer Science, 129(6):3591-3600, Wiley Periodicals, (Sep. 2013).

Yamaguchi, N., et al., "Molecular Cloning and Partial Characterization of a Novel Collagen Chain, Alpha 1(XVI), Consisting of Repetitive Collagenous Domains and Cysteine-containing Noncollagenous Segments," Journal of biochemistry, 112(6):856-863, Oxford University Press, England, (Dec. 1992).

Yang, J. et al., "Cell Sheet Engineering: Recreating Tissues Without Biodegradable Scaffolds," Biomaterials, 26(33):6415-6422, Elsevier Science, Netherlands, (Nov. 2005).

Yin, Y. and Beachy, R.N, "The Regulatory Regions of the Rice Tungro Bacilliform Virus Promoter and Interacting Nuclear Factors in Rice (*Oryza sativa* L.)," The Plant journal : for cell and molecular biology, 7(6):969-980, Blackwell Scientific Publishers and BIOS Scientific Publishers in association with the Society for Experimental Biology, c1991, England, (Jun. 1995).

Yoshioka et al., "Synteny between the Loci for a Novel FACIT-like Collagen Locus (D6S228E) and a1 (IX) Collagen (COL9A1) on 6q12-q14 in Humans," Genomics, 13(3):884-886, Academic Press, United States (Jul. 1992).

Chang, L.C.,et al., "Comparative Study of Physical Properties of Water-Blown Rigid Polyurethane Foams Extended With Commercial Soy Flour ," Journal of Applied Polymer Science 80:10-19, John Wiley & Sons, Inc (2001).

Czlonka, S., et al., "Rigid Polyurethane Foams Reinforced With Industrial Potato Protein.," Polymer Testing 68 (2018), 52 pages.

Halim, A,S., et al., "Biologic and Synthetic Skin Substitutes: An Overview," Indian Journal of Plastic Surgery 43(Suppl): S23-S28, Thieme, Germany (Sep. 2010).

Huafeng, T., et al., "Improved Flexibility and Water Resistance of Soy Protein Thermoplastics Containing Waterborne Polyurethane," Industrial Crops and Products 32(1):13-20, Elsevier B.V, (Jul. 2010).

Lin, Y., et al., "Physical, Mechanical, and Thermal Properties of Water-Blown Rigid Polyurethane Foam Containing Soy Protein Isolate," Cereal Chemistry 73(2):189-196, American Association of Cereal Chemists, Inc. (1996).

Lin, Y., et al., "Water-Blown Flexible Polyurethane Foam Extended with Biomass Materials," Journal of Applied Polymer Science 65(4):695-703, John Wiley & Sons, Inc (Jul. 1997).

Liu, D., et al., "Structure and Properties of Blend Films Prepared from Castor Oil-Based Polyurethane/Soy Protein Derivative ," Industrial & Engineering Chemistry Research47(23):9330-9336, American Chemical Society,(2008).

Liu, H., et al., "Soy-Oil-Based Waterborne Polyurethane Improved Wet Strength of Soy Protein Adhesives on Wood," International Journal of Adhesion and Adhesives, 73:66-74, Elsevier Ltd, (Sep. 2016).

Madbouly, S.A and Lendlein, A., "Degradable Polyurethane/Soy Protein Shape—Memory Polymer Blends Prepared Via Environmentally-Friendly Aqueous Dispersions," Macromolecular Materials and Engineering 297(12):1213-1224,Wiley-VCH Verlag GmbH & Co. KGaA, Weinheim (Nov. 2012).

Park, S.K and Hettiarachchy, N.S., "Physical and Mechanical Properties of Soy Protein-Based Plastic Foams," Journal of the American Oil Chemists' Society 76(10):1201-1205, AOCS Press (1999).

Suganya, S., et al., "Naturally Derived Biofunctional Nanofibrous Scaffold For Skin Tissue Regeneration," International Journal of Biological Macromolecules 68:135-143, Elsevier, Netherlands (Jul. 2014).

Tian, H., et al., "Polyether Polyol-Based Rigid Polyurethane Foams Reinforced With Soy Protein Fillers," Journal of Vinyl & Additive Technology 24(S1): E105-E111, Society of Plastics Engineers (2017).

Tong, X., et al., "Development of blend films from soy meal protein and crude glycerol-based waterborne polyurethane," Industrial Crops and Products 67:11-17, Elsevier B.V (May 2015).

Wang, G and Zhou, A., "Soy Protein Based Biodegradable Flexible Polyurethane Foam," Advanced Materials Research, 152-153:1862-1865, Trans Tech Publications, Switzerland (2011).

(56) References Cited

OTHER PUBLICATIONS

Wang, N and Zhang, L., "Preparation and characterization of soy protein plastics plasticized with waterborne polyurethane," Polymer International 54(1):233-239, Society of Chemical Industry, (Jan. 2005).

Wang, N., et al., "Mechanical Properties and Biodegradability of Crosslinked Soy Protein Isolate/Waterborne Polyurethane Composites," Journal of Applied Polymer Science 95:465-473, Wiley Periodicals, Inc (2005).

Wang, Y., et al., "Preparation of Soy-Based Adhesive Enhanced by Waterborne Polyurethane: Optimization by Response Surface Methodology," Advances in Materials Science and Engineering, 2018:8, Article ID 9253670 Hindawi (2018).

Wang, Y., et al., "Properties of Soy-Based Wood Adhesives Enhanced by Waterborne Polyurethane Modification," Journal of Biobased Materials and Bioenergy 11:330-335, American Scientific Publishers (2017).

Xie, D.Y., et al., "Roles of Soft Segment Length in Structure and Property of Soy Protein Isolate/Waterborne Polyurethane Blend Films," Journal of Industrial and Engineering Chemistry Research 55(5):1229-1235, American Chemical Society (Jan. 2016).

Xu, Y., et al., "Improve the Performance of Soy Protein-Based Adhesives by a Polyurethane Elastomer," polymers 10(9):1016, MDPI, Switzerland (Sep. 2018).

Xu, N., et al.,"Modification of PA/PU superfine non-oven fiber for breath" property using collagen and vegetable tannis, J. Industrial Textiles 4 (10): 1593-1615, SAGE publications, United States (2019).

Zhang, M., et al., "Development of Soy Protein Isolate/waterborne Polyurethane Blend Films With Improved Properties," Colloids and Surfaces B: Biointerfaces 100:16-21, Elsevier B.V, Netherlands (Dec. 2012).

Zhang, S., et al., "Water-Blown Castor Oil-Based Polyurethane Foams with Soy Protein as a Reactive Reinforcing Filler," Journal of Polymers and the Environment 26:15-22, Springer (2016).

Chen, Y., et al., "Structure and Properties of Composites Compression-Molded from Polyurethane Prepolymer and Various Soy Products", Industrial & Engineering Chemistry Research, 42(26):6786-6794, American Chemical Society (Dec. 2003).

Li, M., et al., "Soy Protein-Modified Waterborne Polyurethane Biocomposites With Improved Functionality", RSC advances, 6(16):12837-12849, Royal Society of Chemistry (2016).

Zhao, S., et al., "Preparation and Demonstration of Poly(Dopamine)-Triggered Attapulgite-Anchored Polyurethane as a High-performance Rod-Like Elastomer to Reinforce Soy Protein-Isolated Composites", Applied Surface Science, 442:537-546, ScienceDirect, Elsevier (Jun. 2018).

Mandal, B, and Majumdar, S.G.,"Nutritional Evaluation of Proteins from three Non-Traditional Seeds with or without Amino Acids Supplementation in Albino Rats," Proceedings of the Indian National Science Academy B50 No. 1:48-56, Nutritional Evaluation of Non-traditional Seed Proteins, Biochemistry Department, Burdwan Medical College, Burdwan (1984).

Rahman, M.M and Netravali, A.N., "Green Resin from Forestry Waste Residue "Karanja (*Pongamia pinnata*) Seed Cake" for Biobased Composite Structures," ACS Sustainable Chemistry & Engineering 2(10):2318-2328, American Chemical Society (Oct. 2014).

Ren, X., et al., "Engineering Zonal Cartilage Through Bioprinting Collagen Type II Hydrogel Constructs With Biomimetic Chondrocyte Density Gradient, "Bmc Musculoskeletal Disorders 17: 301, BioMed Central, England (2016).

Wu, B., et al., "The New Development of Modified Collagen Protein Spinning," Leather Science and Engineering 17(4):27-31, China Academic Journal Electronic Publishing House (Aug. 2007).

Benya, P.D and Padilla, S.R, "Isolation and Characterization of Type VIII Collagen Synthesized by Cultured Rabbit Corneal Endothelial Cells," The Journal of Biological Chemistry, 261(9):4160-4169, American Society for Biochemistry and Molecular Biology, United States, (Mar. 1986).

Dublet, B., et al., "The Structure of Avian Type XII Collagen," Journal of Biological Chemistry, 264(22):13150-13156, American Society for Biochemistry and Molecular Biology, United States, (Aug. 1989).

Foucher, A.E., et al., "Purification and Characterization of Native Type XIV Collagen," The Journal of Biological Chemistry, 267(22):15759-15764, American Society for Biochemistry and Molecular Biology, United States, (Aug. 1992).

Co-Pending U.S. Appl. No. 16/898,225, filed Jun. 10, 2020, inventor Marga, et al. (Unpublished).

Co-Pending U.S. Appl. No. 16/801,032, filed Feb. 25, 2020, inventor Forgacs, et al. (Unpublished).

Co-Pending U.S. Appl. No. 16/724,689, filed Dec. 23, 2019, inventor Lee, et al. (Unpublished).

Co-Pending U.S. Appl. No. 16/673,603, filed Nov. 4, 2019, inventor Purcell, et al. (Unpublished).

Koide, T., "Application of Collagen-like Triple-helical Peptides to Biochemical Studies Elucidating the Collagen Structure and Functions," Seikagaku. The Journal of Japanese Biochemical Society 82(6):474-483, Nippon Seikagakkai, Japan (Jun. 2010).

Langrock, T., et al., "Analysis of Hydroxyproline Isomers and Hydroxylysine by Reversed-Phase HPLC and Mass Spectrometry," Journal of Chromatography B 847(2):282-288, Elsevier, Netherlands (Mar. 2007).

Li, Z., et al., "Mechanical Behaviour of Natural Cow Leather in Tension," Acta Mechanica Solida Sinica 22(1):37-44, AMSS Press, China (2009).

Guide to Tensile Strength: Monroe, Accessed at URL : https://monroeengineering.com/info-general-guide-tensile-strength.php, Accessed on Jul. 21, 2021.

ISO 3376:2020 [IULTCS/IUP 6], "Leather—Physical and Mechanical Tests—Determination of Tensile Strength and Percentage Elongation," Technical Committee : IULTCS International Union of Leather Technologists and Chemists Societies, 4th Edition, 6 pages (May 2020).

Jus, S., et al., "Tyrosinase-Catalysed Coating of Wool Fibres With Different Protein-Based Biomaterials," Journal of Biomaterials Science 20(2):253-269, Taylor and Francis, England (2009).

Rajan, R., et al., "Design and in Vitro Evaluation of Chlorpheniramine Maleate From Different Eudragit Based Matrix Patches: Effect of Platicizer and Chemical Enhancers," ARS Pharmaceutica 50(4):177-194 (2010).

Schoff, C.K., "Crosslinking and Crosslink Density," Coatings Clinic (Sep. 1, 2010).

Wang, N., et al., "Properties of Crosslinked Casein/Waterborne Polyurethane Composites," Journal of Applied Polymer Science 91:332-338, John Wiley & Sons, United States (2004).

Yeelack, W and Meesane, J., "Preparation and Characterization of Coated Silk Fibroin Films with Mimicked Re-self Assembly Type I Collagen," The 2013 Biomedical Engineering International Conference, National Research University, Russia (2013).

Yunhui, X.U., et al., "Study of Cotton Fiber Coated by Collagen," Journal of Textile Research 28(5) (May 2007).

Co-Pending U.S. Appl. No. 17/438,582, filed Sep. 13, 2021, Handlin; D.L., et al., (Unpublished).

Co-Pending U.S. Appl. No. 17/246,044, filed Apr. 30, 2021, Broadbent, et al., (Unpublished).

Chen, X., et al., "Effect of the Application of Dehydrothermal Treatment on the Structure and the Mechanical Properties of Collagen Film," Materials 13(377):1-15, MDPI, Switzerland (2020).

Covington,A.D., "Modern Tanning Chemistry," Chemical Society Reviews, 26: 111-126, Royal Society of Chemistry, United Kingdom (1997).

Salvatore, L. et al., "Potential of Electrospun Poly(3-hydroxybutyrate)/Collagen Blends for Tissue Engineering Applications," Hindawi Journal of Healthcare Engineering, vol. 2018, Article ID 6573947, published Apr. 19, 2018.

\* cited by examiner

SEQUENCE LISTING

<160> NUMBER OF SEQ ID NOS: 1

<210> SEQ ID NO 1
<211> LENGTH: 1248
<212> TYPE: PRT
<213> ORGANISM: Artificial Sequence
<220> FEATURE:
<223> OTHER INFORMATION: Col3 alpha chain

<400> SEQUENCE: 1

```
Met Phe Ser Pro Ile Leu Ser Leu Glu Ile Ile Leu Ala Leu Ala Thr
 1               5                  10                  15

Leu Gln Ser Val Phe Ala Gln Gln Glu Ala Val Asp Gly Gly Cys Ser
                20                  25                  30

His Leu Gly Gln Ser Tyr Ala Asp Arg Asp Val Trp Lys Pro Glu Pro
            35                  40                  45

Cys Gln Ile Cys Val Cys Asp Ser Gly Ser Val Leu Cys Asp Asp Ile
        50                  55                  60

Ile Cys Asp Asp Gln Glu Leu Asp Cys Pro Asn Pro Glu Ile Pro Phe
65                  70                  75                  80

Gly Glu Cys Cys Ala Val Cys Pro Gln Pro Pro Thr Ala Pro Thr Arg
                85                  90                  95

Pro Pro Asn Gly Gln Gly Pro Gln Gly Pro Lys Gly Asp Pro Gly Pro
            100                 105                 110

Pro Gly Ile Pro Gly Arg Asn Gly Asp Pro Gly Pro Pro Gly Ser Pro
        115                 120                 125

Gly Ser Pro Gly Ser Pro Gly Pro Pro Gly Ile Cys Glu Ser Cys Pro
    130                 135                 140

Thr Gly Gly Gln Asn Tyr Ser Pro Gln Tyr Glu Ala Tyr Asp Val Lys
145                 150                 155                 160

Ser Gly Val Ala Gly Gly Gly Ile Ala Gly Tyr Pro Gly Pro Ala Gly
                165                 170                 175

Pro Pro Gly Pro Pro Gly Pro Pro Gly Thr Ser Gly His Pro Gly Ala
            180                 185                 190

Pro Gly Ala Pro Gly Tyr Gln Gly Pro Pro Gly Glu Pro Gly Gln Ala
        195                 200                 205

Gly Pro Ala Gly Pro Pro Gly Pro Pro Gly Ala Ile Gly Pro Ser Gly
    210                 215                 220

Pro Ala Gly Lys Asp Gly Glu Ser Gly Arg Pro Gly Arg Pro Gly Glu
225                 230                 235                 240

Arg Gly Phe Pro Gly Pro Pro Gly Met Lys Gly Pro Ala Gly Met Pro
                245                 250                 255

Gly Phe Pro Gly Met Lys Gly His Arg Gly Phe Asp Gly Arg Asn Gly
            260                 265                 270

Glu Lys Gly Glu Thr Gly Ala Pro Gly Leu Lys Gly Glu Asn Gly Val
        275                 280                 285

Pro Gly Glu Asn Gly Ala Pro Gly Pro Met Gly Pro Arg Gly Ala Pro
    290                 295                 300

Gly Glu Arg Gly Arg Pro Gly Leu Pro Gly Ala Ala Gly Ala Arg Gly
305                 310                 315                 320
```

Asn Asp Gly Ala Arg Gly Ser Asp Gly Gln Pro Gly Pro Pro Gly Pro
            325                 330                 335

Pro Gly Thr Ala Gly Phe Pro Gly Ser Pro Gly Ala Lys Gly Glu Val
            340                 345                 350

Gly Pro Ala Gly Ser Pro Gly Ser Ser Gly Ala Pro Gly Gln Arg Gly
            355                 360                 365

Glu Pro Gly Pro Gln Gly His Ala Gly Ala Pro Gly Pro Pro Gly Pro
            370                 375                 380

Pro Gly Ser Asn Gly Ser Pro Gly Gly Lys Gly Glu Met Gly Pro Ala
385                 390                 395                 400

Gly Ile Pro Gly Ala Pro Gly Leu Ile Gly Ala Arg Gly Pro Pro Gly
            405                 410                 415

Pro Pro Gly Thr Asn Gly Val Pro Gly Gln Arg Gly Ala Ala Gly Glu
            420                 425                 430

Pro Gly Lys Asn Gly Ala Lys Gly Asp Pro Gly Pro Arg Gly Glu Arg
            435                 440                 445

Gly Glu Ala Gly Ser Pro Gly Ile Ala Gly Pro Lys Gly Glu Asp Gly
            450                 455                 460

Lys Asp Gly Ser Pro Gly Glu Pro Gly Ala Asn Gly Leu Pro Gly Ala
465                 470                 475                 480

Ala Gly Glu Arg Gly Val Pro Gly Phe Arg Gly Pro Ala Gly Ala Asn
            485                 490                 495

Gly Leu Pro Gly Glu Lys Gly Pro Pro Gly Asp Arg Gly Gly Pro Gly
            500                 505                 510

Pro Ala Gly Pro Arg Gly Val Ala Gly Glu Pro Gly Arg Asp Gly Leu
            515                 520                 525

Pro Gly Gly Pro Gly Leu Arg Gly Ile Pro Gly Ser Pro Gly Gly Pro
            530                 535                 540

Gly Ser Asp Gly Lys Pro Gly Pro Pro Gly Ser Gln Gly Glu Thr Gly
545                 550                 555                 560

Arg Pro Gly Pro Pro Gly Ser Pro Gly Pro Arg Gly Gln Pro Gly Val
            565                 570                 575

Met Gly Phe Pro Gly Pro Lys Gly Asn Asp Gly Ala Pro Gly Lys Asn
            580                 585                 590

Gly Glu Arg Gly Gly Pro Gly Gly Pro Gly Pro Gln Gly Pro Ala Gly
            595                 600                 605

Lys Asn Gly Glu Thr Gly Pro Gln Gly Pro Pro Gly Pro Thr Gly Pro
            610                 615                 620

Ser Gly Asp Lys Gly Asp Thr Gly Pro Pro Gly Pro Gln Gly Leu Gln
625                 630                 635                 640

Gly Leu Pro Gly Thr Ser Gly Pro Pro Gly Glu Asn Gly Lys Pro Gly
            645                 650                 655

Glu Pro Gly Pro Lys Gly Glu Ala Gly Ala Pro Gly Ile Pro Gly Gly
            660                 665                 670

Lys Gly Asp Ser Gly Ala Pro Gly Glu Arg Gly Pro Pro Gly Ala Gly
            675                 680                 685

Gly Pro Pro Gly Pro Arg Gly Gly Ala Gly Pro Pro Gly Pro Glu Gly
            690                 695                 700

Gly Lys Gly Ala Ala Gly Pro Pro Gly Pro Pro Gly Ser Ala Gly Thr
705                 710                 715                 720

Pro Gly Leu Gln Gly Met Pro Gly Glu Arg Gly Gly Pro Gly Gly Pro
            725                 730                 735

```
Gly Pro Lys Gly Asp Lys Gly Glu Pro Gly Ser Ser Gly Val Asp Gly
            740                 745                 750

Ala Pro Gly Lys Asp Gly Pro Arg Gly Pro Thr Gly Pro Ile Gly Pro
            755                 760             765

Pro Gly Pro Ala Gly Gln Pro Gly Asp Lys Gly Glu Ser Gly Ala Pro
            770             775                 780

Gly Val Pro Gly Ile Ala Gly Pro Arg Gly Gly Pro Gly Glu Arg Gly
785                 790                 795                 800

Glu Gln Gly Pro Pro Gly Pro Ala Gly Phe Pro Gly Ala Pro Gly Gln
                805                 810                 815

Asn Gly Glu Pro Gly Ala Lys Gly Glu Arg Gly Ala Pro Gly Glu Lys
            820                 825                 830

Gly Glu Gly Gly Pro Pro Gly Ala Ala Gly Pro Ala Gly Gly Ser Gly
            835                 840                 845

Pro Ala Gly Pro Pro Gly Pro Gln Gly Val Lys Gly Glu Arg Gly Ser
            850                 855                 860

Pro Gly Gly Pro Gly Ala Ala Gly Phe Pro Gly Gly Arg Gly Pro Pro
865                 870                 875                 880

Gly Pro Pro Gly Ser Asn Gly Asn Pro Gly Pro Pro Gly Ser Ser Gly
                885                 890                 895

Ala Pro Gly Lys Asp Gly Pro Pro Gly Pro Pro Gly Ser Asn Gly Ala
            900                 905                 910

Pro Gly Ser Pro Gly Ile Ser Gly Pro Lys Gly Asp Ser Gly Pro Pro
            915                 920                 925

Gly Glu Arg Gly Ala Pro Gly Pro Gln Gly Pro Pro Gly Ala Pro Gly
            930                 935                 940

Pro Leu Gly Ile Ala Gly Leu Thr Gly Ala Arg Gly Leu Ala Gly Pro
945                 950                 955                 960

Pro Gly Met Pro Gly Ala Arg Gly Ser Pro Gly Pro Gln Gly Ile Lys
                965                 970                 975

Gly Glu Asn Gly Lys Pro Gly Pro Ser Gly Gln Asn Gly Glu Arg Gly
            980                 985                 990

Pro Pro Gly Pro Gln Gly Leu Pro Gly Leu Ala Gly Thr Ala Gly Glu
            995                 1000                1005

Pro Gly Arg Asp Gly Asn Pro Gly Ser Asp Gly Leu Pro Gly Arg
            1010                1015                1020

Asp Gly Ala Pro Gly Ala Lys Gly Asp Arg Gly Glu Asn Gly Ser
            1025                1030                1035

Pro Gly Ala Pro Gly Ala Pro Gly His Pro Gly Pro Pro Gly Pro
            1040                1045                1050

Val Gly Pro Ala Gly Lys Ser Gly Asp Arg Gly Glu Thr Gly Pro
            1055                1060                1065

Ala Gly Pro Ser Gly Ala Pro Gly Pro Ala Gly Ser Arg Gly Pro
            1070                1075                1080

Pro Gly Pro Gln Gly Pro Arg Gly Asp Lys Gly Glu Thr Gly Glu
            1085                1090                1095

Arg Gly Ala Met Gly Ile Lys Gly His Arg Gly Phe Pro Gly Asn
            1100                1105                1110

Pro Gly Ala Pro Gly Ser Pro Gly Pro Ala Gly His Gln Gly Ala
            1115                1120                1125

Val Gly Ser Pro Gly Pro Ala Gly Pro Arg Gly Pro Val Gly Pro
            1130                1135                1140

Ser Gly Pro Pro Gly Lys Asp Gly Ala Ser Gly His Pro Gly Pro
```

-continued

```
              1145                1150                1155
Ile Gly Pro Pro Gly Pro Arg Gly Asn Arg Gly Glu Arg Gly Ser
        1160                1165                1170

Glu Gly Ser Pro Gly His Pro Gly Gln Pro Gly Pro Pro Gly Pro
        1175                1180                1185

Pro Gly Ala Pro Gly Pro Cys Cys Gly Ala Gly Gly Val Ala Ala
        1190                1195                1200

Ile Ala Gly Val Gly Ala Glu Lys Ala Gly Gly Phe Ala Pro Tyr
        1205                1210                1215

Tyr Gly Asp Gly Tyr Ile Pro Glu Ala Pro Arg Asp Gly Gln Ala
        1220                1225                1230

Tyr Val Arg Lys Asp Gly Glu Trp Val Leu Leu Ser Thr Phe Leu
        1235                1240                1245
```

LAYERED COLLAGEN MATERIALS AND METHODS OF MAKING THE SAME

REFERENCE TO SEQUENCE LISTING SUBMITTED ELECTRONICALLY

The content of the electronically submitted sequence listing (Name 4431_0230001_SL_ST25.txt; Size: 11,054 bytes; and Date of Creation: Dec. 9, 2019) is incorporated herein by reference in its entirety.

FIELD

This disclosure relates to layered materials with one or more layers including collagen. The layered materials can have the look, feel, and aesthetic and/or mechanical properties similar to natural leather, and can be used to make goods and articles previously prepared from natural leather.

BACKGROUND

Leather is a versatile product used across many industries, including the furniture industry, where leather is regularly used as upholstery, the clothing industry, where leather is used to manufacture pants and jackets, the shoe industry, where leather is used to prepare casual and dress shoes, the luggage industry, the handbag and accessory industry, and in the automotive industry. The global trade value for leather is high, and there is a continuing and increasing demand for leather products. However, there are variety of costs, constraints, and social concerns associated with producing natural leather. Foremost, natural leathers are produced from animal skins, and as such, requires raising and slaughtering livestock. Raising livestock requires enormous amounts of feed, pastureland, water, and fossil fuels and contributes to air and waterway pollution, through, for example, greenhouse gases like methane. Leather production also raises social concerns related to the treatment of animals. In recent years, there has also been a fairly well documented decrease in the availability of traditional high quality hides. For at least these reasons, alternative means to meet the demand for leather are desirable.

BRIEF SUMMARY

The present disclosure provides layered composite materials comprising collagen suitable for use as a replacement for natural leather.

A first embodiment (1) of the present disclosure is directed to a layered collagen material including a substrate layer and a collagen/polymer matrix layer attached to a surface of the substrate layer.

In a second embodiment (2), the collagen/polymer matrix layer of the first embodiment (1) includes collagen dissolved within a polymeric matrix material.

In a third embodiment (3), the collagen/polymer matrix layer of the first embodiment (1) or the second embodiment (2) is transparent.

In a fourth embodiment (4), the collagen of any of embodiments (1)-(3) is natural collagen, recombinant collagen, or a combination thereof.

In a fifth embodiment (5), the layered collagen material of any of embodiments (1)-(4) further includes a second collagen/polymer matrix layer disposed between the collagen/polymer matrix layer and the substrate layer.

In a sixth embodiment (6), the layered collagen material of embodiment (5) includes the collagen/polymer matrix layer having a first density and the second collagen/polymer matrix layer having a second density, where the first density is greater than the second density.

In a seventh embodiment (7), the layered collagen material of the fifth embodiment (5) or the sixth embodiment (6) includes the collagen/polymer matrix layer having a first dry weight and the second collagen/polymer matrix layer having a second dry weight, where the first dry weight is less than the second dry weight.

In an eighth embodiment (8), the second collagen/polymer matrix layer of any of embodiments (5)-(7) includes a foam stabilizer.

In a ninth embodiment (9), the layered collagen material of any of embodiments (5)-(8) further includes a third collagen/polymer matrix layer disposed between the second collagen/polymer matrix layer and the substrate layer.

In a tenth embodiment (10), layered collagen material of the ninth embodiment (9) includes the collagen/polymer matrix layer having a first density, the second collagen/polymer matrix layer having a second density, and the third collagen/polymer matrix layer having a third density, where the first density is greater than the second density and the third density.

In an eleventh embodiment (11), the layered collagen material of the ninth embodiment (9) or the tenth embodiment (10) includes the collagen/polymer matrix layer having a first dry weight, the second collagen/polymer matrix layer having a second dry weight, and the third collagen/polymer matrix layer having a third dry weight, where the first dry weight is less than the second dry weight and the third dry weight.

In a twelfth embodiment (12), the third collagen/polymer matrix layer of any of embodiments (9)-(11) includes a foam stabilizer.

In a thirteenth embodiment (13), the collagen/polymer matrix layer of any of embodiments (1)-(12) includes a polyurethane, a polyacrylate, an acrylic acid copolymer, a polyacrylamide, a polyethylene oxide, a polyvinyl alcohol, or a combination thereof.

In a fourteenth embodiment (14), the collagen/polymer matrix layer of any of embodiments (1)-(13) includes a polyurethane.

In a fifteenth embodiment (15), the polyurethane of the fourteenth embodiment (14) is bio-polyurethane.

In a sixteenth embodiment (16), the polyurethane of the fourteenth embodiment (14) is a water-soluble polyurethane.

In a seventeenth embodiment (17), the collagen/polymer matrix layer of any of embodiments (1)-16) includes a fatliquor.

In an eighteenth embodiment (18), the collagen/polymer matrix layer of any of embodiments (1)-(17) includes a coloring agent.

In a nineteenth embodiment (19), the coloring agent of the eighteenth embodiment (18) is a dye.

In a twentieth embodiment (20), the collagen/polymer matrix layer according to any of embodiments (1)-(19) is tanned.

In a twenty-first embodiment (21), the substrate layer of any of embodiments (1)-(20) includes a textile layer.

In a twenty-second embodiment (22), the textile layer of the twenty-first embodiment (21) includes at least one of: a woven textile layer, non-woven textile layer, or a knit textile layer.

In a twenty-third embodiment (23), the layered collagen material of any of embodiments (1)-(22) further includes a basecoat layer disposed over a surface of the collagen/polymer matrix layer opposite the substrate layer.

In a twenty-fourth embodiment (24), the layered collagen material of the twenty-third embodiment (23) further includes a top-coat layer disposed over a surface of the basecoat layer opposite the collagen/polymer matrix layer.

A twenty-fifth embodiment (25) of the present disclosure is directed to a method of making a layered collagen material, the method including blending a polymer dispersed in a solvent with collagen to form a blended mixture in the solvent, disposing a layer of the blended mixture in the solvent over a surface of a sacrificial layer, removing the solvent from the blended mixture to form a collagen/polymer matrix layer, and attaching the collagen/polymer matrix layer to a substrate layer.

In a twenty-sixth embodiment (26), the solvent of the twenty-fifth embodiment (25) includes water.

In a twenty-seventh embodiment (27), the polymer dispersed in the solvent in the twenty-fifth embodiment (25) or the twenty-sixth embodiment (26) is a water-dispersible polyurethane.

In a twenty-eighth embodiment (28), the method of any of embodiments (25)-(27) further includes removing the sacrificial layer.

In a twenty-ninth embodiment (29), the method according to the twenty-eighth embodiment (28) includes removing the sacrificial layer before attaching the collagen/polymer matrix layer to a substrate layer.

In a thirtieth embodiment (30), the method of any of embodiments (25)-(29) further includes blending and foaming a mixture of collagen and a polymer dispersed in a solvent to form a foamed blended mixture in the solvent, disposing a layer of the foamed blended mixture in the solvent over a surface of the collagen/polymer matrix layer, and removing the solvent from the foamed blended mixture to form a foamed collagen/polymer matrix layer.

In a thirty-first embodiment (31), the foamed blended mixture of the thirtieth embodiment (30) includes a foam stabilizer.

In a thirty-second embodiment (32), the foamed blended mixture of the thirtieth embodiment (30) or thirty-first embodiment (31) has a liquid density in a range of about 300 grams per liter to about 900 grams per liter before the solvent is removed from the foamed blended mixture.

In a thirty-third embodiment (33), the blended mixture of any of embodiments (30)-(32) has a liquid density before the solvent is removed from the blended mixture that is greater than the liquid density of the foamed blended mixture before the solvent is removed from the foamed blended mixture.

In a thirty-fourth embodiment (34), the surface of the sacrificial layer of any of embodiments (25)-(33) includes a rough surface.

In a thirty-fifth embodiment (35), the collagen of any of embodiments (25)-(34) is natural collagen, recombinant collagen, or a combination thereof.

In a thirty-sixth embodiment (36), the substrate layer of any of embodiments (25)-(35) includes a textile layer.

In a thirty-seventh embodiment (37), attaching the collagen/polymer matrix layer to the substrate layer in any of embodiments (25)-(36) includes a heat pressing process.

In a thirty-eight embodiment (38), attaching the collagen/polymer matrix layer to the substrate layer in any of embodiments (25)-(36) includes a lamination process.

A thirty-ninth embodiment (39) of the present disclosure is directed to a method of making a layered collagen material, the method including blending a polymer dispersed in a solvent with collagen to form a blended mixture in the solvent, disposing a layer of the blended mixture in the solvent over a substrate layer, and removing the solvent from the blended mixture to form a collagen/polymer matrix layer.

In a fortieth embodiment (40), the solvent of the thirty-ninth embodiment (39) includes water.

In a forty-first embodiment (41), the polymer dispersed in the solvent in the thirty-ninth embodiment (39) or the fortieth embodiment (40) is a water-dispersible polyurethane.

In a forty-second embodiment (42), the method of any of embodiments (39)-(41) further includes disposing an adhesive layer over the substrate layer and the layer of the blended mixture in the solvent is disposed over the adhesive layer.

In a forty-third embodiment (43), the method of any of embodiments (39)-(42) further includes blending and foaming a mixture of collagen and a polymer dispersed in a solvent to form a foamed blended mixture in the solvent, disposing a layer of the foamed blended mixture in the solvent over a surface of the collagen/polymer matrix layer, and removing the solvent from the foamed blended mixture to form a foamed collagen/polymer matrix layer.

In a forty-fourth embodiment (44), the foamed blended mixture of the forty-third embodiment (43) includes a foam stabilizer.

In a forty-fifth embodiment (45), the foamed blended mixture of the forty-third embodiment (43) or the forty-fourth embodiment (44) has a liquid density in a range of about 300 grams per liter to about 900 grams per liter before the solvent is removed from the foamed blended mixture.

In a forty-sixth embodiment (46), the blended mixture according to any of embodiments (43)-(45) has a liquid density before the solvent is removed from the blended mixture that is greater than the liquid density of the foamed blended mixture before the solvent is removed from the foamed blended mixture.

In a forty-seventh embodiment (47), the collagen of any of embodiments (39)-(46) is natural collagen, recombinant collagen, or a combination thereof.

In a forty-eighth embodiment (48), the substrate layer of any of embodiments (39)-(47) includes a textile layer.

In a forty-ninth embodiment (49), the collagen of any of embodiments (1), (25), or 39) is at least about 60%, about 65%, about 70%, about 75%, about 80%, about 85%, about 90%, about 95%, about 99%, or 100% identical to the Col3 alpha chain sequence.

In a fiftieth embodiment (50), the collagen of any of embodiments (1), (25), or (39) is at least about 60%, about 65%, about 70%, about 75%, about 80%, about 85%, about 90%, about 95%, about 99% or 100% identical to SEQ ID NO: 1.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
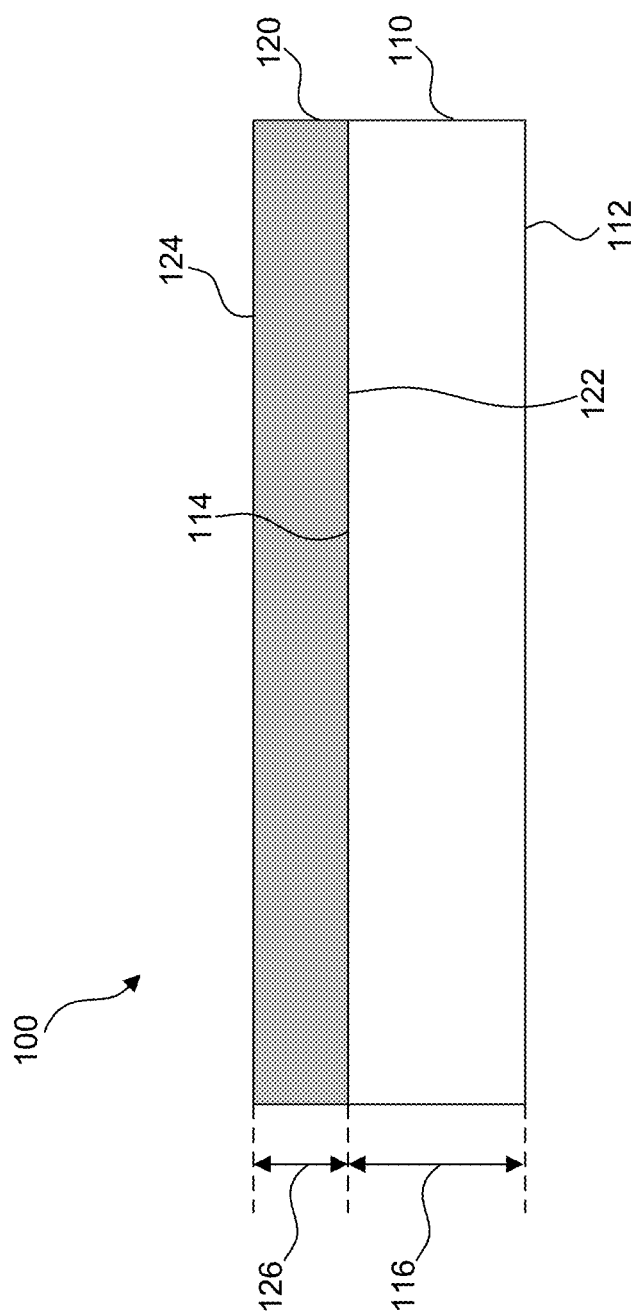
FIG. 1 illustrates a layered collagen material according to some embodiments.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present. The phrase "consisting essentially of limits the composition of a component to the specified materials and those that do not materially affect the basic and novel characteristic(s) of the component. The phrase" consisting of limits the composition of a component to the specified materials and excludes any material not specified.

Where a range of numerical values comprising upper and lower values is recited herein, unless otherwise stated in specific circumstances, the range is intended to include the endpoints thereof, and all integers and fractions within the range. It is not intended that the disclosure or claims be limited to the specific values recited when defining a range. Further, when an amount, concentration, or other value or parameter is given as a range, one or more ranges, or as list of upper values and lower values, this is to be understood as specifically disclosing all ranges formed from any pair of any upper range limit or value and any lower range limit or value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within ±10% of the value stated. For example, about 3 kPa can include any number between 2.7 kPa and 3.3 kPa.

As used herein the term "collagen/polymer matrix layer" means a layer of material comprising a collagen and polymer blend.

As used herein, a first layer described as "attached to" a second layer means that the layers are attached to each other either by direct contact and attachment between the two layers or via one or more intermediate adhesive layers. An intermediate adhesive layer can be any layer that serves to attach a first layer to a second layer.

As used herein, the phrase "disposed on" means that a first component (e.g., layer) is in direct contact with a second component. A first component "disposed on" a second component can be deposited, formed, placed, or otherwise applied directly onto the second component. In other words, if a first component is disposed on a second component, there are no components between the first component and the second component.

As used herein, the phrase "disposed over" means other components (e.g., layers or substrates) may or may not be present between a first component and a second component.

As used herein "collagen" refers to the family of at least 28 distinct naturally occurring collagen types including, but not limited to collagen types I, II, III, IV, V, VI, VII, VIII, IX, X, XI, XII, XIII, XIV, XV, XVI, XVII, XVIII, XIX, and XX. The term collagen as used herein also refers to collagen prepared using recombinant techniques. The term collagen includes collagen, collagen fragments, collagen-like proteins, triple helical collagen, alpha chains, monomers, gelatin, trimers and combinations thereof. Recombinant expression of collagen and collagen-like proteins is known in the art (see, e.g., Bell, EP 1232182B1, Bovine collagen and method for producing recombinant gelatin; Olsen, et al., U.S. Pat. No. 6,428,978 and VanHeerde, et al., U.S. Pat. No. 8,188,230, incorporated by reference herein in their entireties) Unless otherwise specified, collagen of any type, whether naturally occurring or prepared using recombinant techniques, can be used in any of the embodiments described herein. That said, in some embodiments, the composite materials described herein can be prepared using bovine Type I collagen. Collagens are characterized by a repeating triplet of amino acids, -(Gly-X-Y)n-, so that approximately one-third of the amino acid residues in collagen are glycine. X is often proline and Y is often hydroxyproline. Thus, the structure of collagen may consist of three intertwined peptide chains of differing lengths. Different animals may produce different amino acid compositions of the collagen, which may result in different properties (and differences in the resulting leather). Collagen triple helices (also called monomers or tropocollagen) may be produced from alpha-chains of about 1050 amino acids long, so that the triple helix takes the form of a rod of about approximately 300 nm long, with a diameter of approximately 1.5 nm. In the production of extracellular matrix by fibroblast skin cells, triple helix monomers may be synthesized and the monomers may self-assemble into a fibrous form. These triple helices may be held together by electrostatic interactions (including salt bridging), hydrogen bonding, Van der Waals interactions, dipole-dipole forces, polarization forces, hydrophobic interactions, and covalent bonding. Triple helices can be bound together in bundles called fibrils, and fibrils can further assemble to create fibers and fiber bundles. In some embodiments, fibrils can have a characteristic banded appearance due to the staggered overlap of collagen monomers. This banding can be called "D-banding." The bands are created by the clustering of basic and acidic amino acids, and the pattern is repeated four times in the triple helix (D-period). (See, e.g., Covington, A., *Tanning Chemistry: The Science of Leather* (2009)) The distance between bands can be approximately 67 nm for Type 1 collagen. These bands can be detected using diffraction Transmission Electron Microscope (TEM), which can be used to access the degree of fibrillation in collagen. Fibrils and fibers typically branch and interact with each other throughout a layer of skin. Variations of the organization or crosslinking of fibrils and fibers can provide strength to a material disclosed herein. In some embodiments, protein is formed, but the entire collagen structure is not triple helical. In certain embodiments, the collagen structure can be about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 9'7%, about 98%, about 99% or 100% triple helical.

In some embodiments, the collagen can be chemically modified to promote chemical and/or physical crosslinking between the collagen fibrils. Chemical crosslinking is possible due to reactive groups such as lysine, glutamic acid, and hydroxyl groups on the collagen molecule project from collagen's rod-like fibril structure. Crosslinking that involves these reactive groups prevents the collagen molecules from sliding past each other under stress, thereby increasing the mechanical strength of the collagen fibrils. Chemical crosslinking reactions can include, for example, reactions with the ε-amino group of lysine or reaction with carboxyl groups of the collagen molecule. In some embodiments, enzymes such as transglutaminase can also be used to generate crosslinks between glutamic acid and lysine to form a stable γ-glutamyl-lysine crosslink. Inducing crosslinking between functional groups of neighboring collagen molecules is known in the art.

In some embodiments, the collagen can be crosslinked or lubricated during fibrillation. In some embodiments, the collagen can be crosslinked or lubricated after fibrillation. For example, collagen fibrils can be treated with compounds containing chromium, at least one aldehyde group, or vegetable tannins prior to network formation, during network formation, or during network gel formation.

In some embodiments, up to about 20 wt % of a crosslinking agent, based on total weight of a collagen solution can be used to crosslink collagen during fibrillation. For example, about 1 wt %, about 2 wt %, about 3 wt %, about 4 wt %, about 5 wt %, about 6 wt %, about 7 wt %, about 8 wt %, about 9 wt %, about 10 wt %, about 15 wt %, or about 20 wt %, or an amount of crosslinking agent within a range having any two of these values as endpoints, inclusive of the endpoints, can be used. In some embodiments, the amount of crosslinking agent can be in a range of about 1 wt %, to about 20 wt %, about 2 wt %, to about 15 wt %, about 3 wt %, to about 10 wt %, about 4 wt %, to about 9 wt %, about 5 wt %, to about 8 wt %, or about 6 wt %, to about 7 wt %. In some embodiments, the crosslinking agent can include tanning agents used for conventional leather. In some embodiments, the crosslinking agent can be covalently bound to the collagen fibrils. In some embodiments, the crosslinking agent can be non-covalently associated with the collagen fibrils.

Regardless of the type of collagen, all can be formed and stabilized through a combination of physical and chemical interactions including electrostatic interactions (including salt bridging), hydrogen bonding, Van der Waals interactions, dipole-dipole forces, polarization forces, hydrophobic interactions, and covalent bonding often catalyzed by enzymatic reactions. For Type I collagen fibrils, fibers, and fiber bundles, its complex assembly is achieved in vivo during development and is critical in providing mechanical support to the tissue while allowing for cellular motility and nutrient transport.

Various distinct collagen types have been identified in vertebrates, including bovine, ovine, porcine, chicken, and human collagens. Generally, the collagen types are numbered by Roman numerals, and the chains found in each collagen type are identified by Arabic numerals. Detailed descriptions of structure and biological functions of the various different types of naturally occurring collagens are generally available in the art; see, e.g., Ayad et al. (1998) The Extracellular Matrix Facts Book, Academic Press, San Diego, Calif.; Burgeson, R E., and Nimmi (1992) "Collagen types: Molecular Structure and Tissue Distribution" in Clin. Orthop. 282:250-272; Kielty, C. M. et al. (1993) "The Collagen Family: Structure, Assembly And Organization In The Extracellular Matrix," Connective Tissue And Its Heritable Disorders, Molecular Genetics, And Medical Aspects, Royce, P. M. and B. Steinmann eds., Wiley-Liss, NY, pp. 103-147; and Prockop, D. J- and K. I. Kivirikko (1995) "Collagens: Molecular Biology, Diseases, and Potentials for Therapy," *Annu. Rev. Biochem.,* 64:403-434.)

Type I collagen is the major fibrillar collagen of bone and skin, comprising approximately 80-90% of an organism's total collagen. Type I collagen is the major structural macromolecule present in the extracellular matrix of multicellular organisms and comprises approximately 20% of total protein mass. Type I collagen is a heterotrimeric molecule comprising two α1(I) chains and one α2(I) chain, encoded by the COL1A1 and COL1A2 genes, respectively. Other collagen types are less abundant than type I collagen, and exhibit different distribution patterns. For example, type II collagen is the predominant collagen in cartilage and vitreous humor, while type III collagen is found at high levels in blood vessels and to a lesser extent in skin.

Type II collagen is a homotrimeric collagen comprising three identical α1(II) chains encoded by the COL2A1 gene. Purified type II collagen may be prepared from tissues by, methods known in the art, for example, by procedures described in Miller and Rhodes (1982) *Methods In Enzymology* 82:33-64.

Type III collagen is a major fibrillar collagen found in skin and vascular tissues. Type III collagen is a homotrimeric collagen comprising three identical α1(III) chains encoded by the COL3A1 gene. Methods for purifying type III collagen from tissues can be found in, for example, Byers et al. (1974) *Biochemistry* 13:5243-5248; and Miller and Rhodes, supra.

In certain embodiments, the collagen can be Col3 alpha. In some embodiments, the collagen can be encoded by a sequence that is about 60%, about 65%, about 70%, about 75%, about 80%, about 85%, about 90%, about 95%, or about 99% identical to a naturally occurring Col3 alpha chain sequence. In other embodiments, the collagen can be encoded by a sequence that is about 60%, about 65%, about 70%, about 75%, about 80%, about 85%, about 90%, about 95%, or about 99% identical to SEQ ID NO: 1. In particular embodiments, the collagen is encoded by SEQ ID NO: 1. Sequence identity or similarity can be determined using a similarity matrix such as BLOSUM45, BLOSUM62 or BLOSUM80 where BLOSUM45 can be used for closely related sequences, BLOSUM62 for midrange sequences, and BLOSUM80 for more distantly related sequences. Unless otherwise indicated a similarity score will be based on use of BLOSUM62. When BLASTP is used, the percent similarity is based on the BLASTP positives score and the percent sequence identity is based on the BLASTP identities score. BLASTP "Identities" shows the number and fraction of total residues in the high scoring sequence pairs which are identical; and BLASTP "Positives" shows the number and fraction of residues for which the alignment scores have positive values and which are similar to each other. Amino acid sequences having these degrees of identity or similarity or any intermediate degree of identity or similarity to the amino acid sequences disclosed herein are contemplated and encompassed by this disclosure. Typically, a representative BLASTP setting uses an Expect Threshold of 10, a Word Size of 3, BLOSUM 62 as a matrix, and Gap Penalty of 11 (Existence) and 1 (Extension) and a conditional compositional score matrix adjustment. Other common settings are known to those of ordinary skill in the art.

Type IV collagen is found in basement membranes in the form of sheets rather than fibrils. Most commonly, type IV collagen contains two α1(IV) chains and one α2(IV) chain. The particular chains comprising type IV collagen are tissue-specific. Type IV collagen may be purified using, for example, the procedures described in Furuto and Miller (1987) *Methods in Enzymology*, 144:41-61, Academic Press.

Type V collagen is a fibrillar collagen found in, primarily, bones, tendon, cornea, skin, and blood vessels. Type V collagen exists in both homotrimeric and heterotrimeric forms. One form of type V collagen is a heterotrimer of two α1(V) chains and one α2(V) chain. Another form of type V collagen is a heterotrimer of α1(V), α2(V), and α3(V) chains. A further form of type V collagen is a homotrimer of α1(V). Methods for isolating type V collagen from natural sources can be found, for example, in Elstow and Weiss (1983) *Collagen Rel. Res.* 3:181-193, and Abedin et al. (1982) *Biosci. Rep.* 2:493-502.

Type VI collagen has a small triple helical region and two large non-collagenous remainder portions. Type VI collagen is a heterotrimer comprising α1(VI), α2(VI), and α3(VI) chains. Type VI collagen is found in many connective tissues. Descriptions of how to purify type VI collagen from natural sources can be found, for example, in Wu et al. (1987) *Biochem. 1* 248:373-381, and Kielty et al. (1991) *J. Cell Sci.* 99:797-807.

Type VII collagen is a fibrillar collagen found in particular epithelial tissues. Type VII collagen is a homotrimeric molecule of three α1(VII) chains. Descriptions of how to purify type VII collagen from tissue can be found in, for example, Lunstrum et al. (1986) *J. Biol. Chem.* 261:9042-9048, and Bentz et al. (1983) *Proc. Natl. Acad. Sci. USA* 80:3168-3172. Type VIII collagen can be found in Descemet's membrane in the cornea. Type VIII collagen is a heterotrimer comprising two α1(VIII) chains and one α2(VIII) chain, although other chain compositions have been reported. Methods for the purification of type VIII collagen from nature can be found, for example, in Benya and Padilla (1986) *J. Biol. Chem.* 261:4160-4169, and Kapoor et al. (1986) *Biochemistry* 25:3930-3937.

Type IX collagen is a fibril-associated collagen found in cartilage and vitreous humor. Type IX collagen is a heterotrimeric molecule comprising α1(IX), α2(IX), and α3 (IX) chains. Type IX collagen has been classified as a FACIT (Fibril Associated Collagens with Interrupted Triple Helices) collagen, possessing several triple helical domains separated by non-triple helical domains. Procedures for purifying type IX collagen can be found, for example, in Duance, et al. (1984) *Biochem. 1* 221:885-889; Ayad et al. (1989) *Biochem. I* 262:753-761; and Grant et al. (1988) The Control of Tissue Damage, Glauert, A. M., ed., Elsevier Science Publishers, Amsterdam, pp. 3-28.

Type X collagen is a homotrimeric compound of α1(X) chains. Type X collagen has been isolated from, for example, hypertrophic cartilage found in growth plates. (See, e.g., Apte et al. (1992) *Eur J Biochem* 206 (1):217-24.)

Type XI collagen can be found in cartilaginous tissues associated with type II and type IX collagens, and in other locations in the body. Type XI collagen is a heterotrimeric molecule comprising α1(XI), α2(XI), and α3(XI) chains. Methods for purifying type XI collagen can be found, for example, in Grant et al., supra.

Type XII collagen is a FACIT collagen found primarily in association with type I collagen. Type XII collagen is a homotrimeric molecule comprising three α1(XII) chains. Methods for purifying type XII collagen and variants thereof can be found, for example, in Dublet et al. (1989) *J. Biol. Chem.* 264:13150-13156; Lunstrum et al. (1992) *J. Biol. Chem.* 267:20087-20092; and Watt et al. (1992) *J. Biol. Chem.* 267:20093-20099.

Type XIII is a non-fibrillar collagen found, for example, in skin, intestine, bone, cartilage, and striated muscle. A detailed description of type XIII collagen may be found, for example, in Juvonen et al. (1992) *J. Biol. Chem.* 267:24700-24707.

Type XIV is a FACIT collagen characterized as a homotrimeric molecule comprising α1(XIV) chains. Methods for isolating type XIV collagen can be found, for example, in Aubert-Foucher et al. (1992) *J. Biol. Chem.* 267:15759-15764, and Watt et al., supra.

Type XV collagen is homologous in structure to type XVIII collagen. Information about the structure and isolation of natural type XV collagen can be found, for example, in Myers et al. (1992) *Proc. Natl. Acad. Sci. USA* 89:10144-10148; Huebner et al. (1992) *Genomics* 14:220-224; Kivirikko et al. (1994) *J. Biol. Chem.* 269:4773-4779; and Muragaki, J. (1994) *Biol. Chem.* 264:4042-4046.

Type XVI collagen is a fibril-associated collagen, found, for example, in skin, lung fibroblast, and keratinocytes. Information on the structure of type XVI collagen and the gene encoding type XVI collagen can be found, for example, in Pan et al. (1992) *Proc. Natl. Acad. Sci. USA* 89:6565-6569; and Yamaguchi et al. (1992) *J. Biochem.* 112:856-863.

Type XVII collagen is a hemidesmosal transmembrane collagen, also known at the bullous pemphigoid antigen. Information on the structure of type XVII collagen and the gene encoding type XVII collagen can be found, for example, in Li et al. (1993) *J. Biol. Chem.* 268(12):8825-8834; and McGrath et al. (1995) *Nat. Genet.* 11(1):83-86.

Type XVIII collagen is similar in structure to type XV collagen and can be isolated from the liver. Descriptions of the structures and isolation of type XVIII collagen from natural sources can be found, for example, in Rehn and Pihlajaniemi (1994) *Proc. Natl. Acad. Sci USA* 91:4234-4238; Oh et al. (1994) *Proc. Natl. Acad. Sci USA* 91:4229-4233; Rehn et al. (1994) *J. Biol. Chem.* 269:13924-13935; and Oh et al. (1994) *Genomics* 19:494-499.

Type XIX collagen is believed to be another member of the FACIT collagen family, and has been found in mRNA isolated from rhabdomyosarcoma cells. Descriptions of the structures and isolation of type XIX collagen can be found, for example, in Inoguchi et al. (1995) *J. Biochem.* 117:137-146; Yoshioka et al. (1992) *Genomics* 13:884-886; and Myers et al., *J. Biol. Chem.* 289:18549-18557 (1994).

Type XX collagen is a newly found member of the FACIT collagenous family, and has been identified in chick cornea. (See, e.g., Gordon et al. (1999) *FASEB Journal* 13:A1119; and Gordon et al. (1998), IOVS 39:S1128.)

Any type of collagen, truncated collagen, unmodified or post-translationally modified, or amino acid sequence-modified collagen that can be fibrillated and crosslinked by the methods described herein can be used to produce a collagen-containing layer (e.g., collagen/polymer matrix layer) as described herein. The degree of fibrillation of the collagen molecules can be determined via x-ray diffraction. This characterization will provide d-spacing values which will correspond to different periodic structures present (e.g., 67 nm spacing vs. amorphous). In some embodiments, the collagen can be substantially homogenous collagen, such as only Type I or Type III collagen or can contain mixtures of two or more different kinds of collagens. In embodiments, the collagen is recombinant collagen.

For example, a collagen composition can homogenously contain a single type of collagen molecule, for example 100% bovine Type I collagen or 100% Type III bovine collagen, or can contain a mixture of different kinds of collagen molecules or collagen-like molecules, such as a mixture of bovine Type I and Type III molecules. The collagen mixtures can include amounts of each of the individual collagen components in the range of about 1% to about 99%, including subranges. For example, the amounts of each of the individual collagen components within the collagen mixtures can be about 1%, about 10%, about 20%, about 30%, about 40%, about 50%, about 60%, about 70%, about 80%, about 90%, or about 99%, or within a range having any two of these values as endpoints. For example, in some embodiments, a collagen mixture can contain about 30% Type I collagen and about 70% Type III collagen. Or, in some embodiments, a collagen mixture can contain about 33.3% of Type I collagen, about 33.3% of Type II collagen, and about 33.3% of Type III collagen, where the percentage of collagen is based on the total mass of collagen in the composition or on the molecular percentages of collagen molecules.

In some embodiments, the collagen can be plant-based collagen. For example, the collagen can be a plant-based collagen made by CollPlant.

In some embodiments, a collagen solution can be fibrillated into collagen fibrils. As used herein, collagen fibrils refer to nanofibers composed of tropocollagen or tropocollagen-like structures (which have a triple helical structure). In some embodiments, triple helical collagen can be fibrillated to form nanofibrils of collagen. To induce fibrillation, the collagen can be incubated to form the fibrils for a time period in the range of about 1 minute to about 24 hours, including subranges. For example, the collagen can be incubated for about 1 minute, about 5 minutes, about 10 minutes, about 20 minutes, about 30 minutes, about 40 minutes, about 50 minutes, about 1 hour, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, or about 24 hours, or within a range having any two of these values as endpoints, inclusive of the endpoints. In some embodiments, the collagen can be incubated for about 5 minutes to about 23 hours, about 10 minutes to about 22 hours, about 20 minutes to about 21 hours, about 30 minutes to about 20 hours, about 40 minutes to about 19 hours, about 50 minutes to about 18 hours, about 1 hour to about 17 hours, about 2 hours to about 16 hours, about 3 hours to about 15 hours, about 4 hours to about 14 hours, about 5 hours to about 13 hours, about 6 hours to about 12 hours, about 7 hours to about 11 hours, or about 8 hours to about 10 hours.

In some embodiments, the collagen fibrils can have an average diameter in the range of about 1 nm (nanometer) to about 1 µm (micron, micrometer), including subranges. For example, the average diameter of the collagen fibrils can be about 1 nm, about 2 nm, about 3 nm, about 4 nm, about 5 nm, about 10 nm, about 15 nm, about 20 nm, about 30 nm, about 40 nm, about 50 nm, about 60 nm, about 70 nm, about 80 nm, about 90 nm, about 100 nm, about 200 nm, about 300 nm, about 400 nm, about 500 nm, about 600 nm, about 700 nm, about 800 nm, about 900 nm, or about 1 µm, or within a range having any two of these values as endpoints, inclusive of the endpoints. In some embodiments, the average diameter can be in a range of about 2 nm to about 900 nm, about 3 nm to about 800 nm, about 4 nm to about 700 nm, about 5 nm to about 600 nm, about 10 nm to about 500 nm, about 20 nm to about 400 nm, about 30 nm to about 300 nm, about 40 nm to about 200 nm, about 50 nm to about 100 nm, about 60 nm to about 90 nm, or about 70 nm to about 80 nm.

In some embodiments, an average length of the collagen fibrils is in the range of about 100 nm to about 1 mm (millimeter), including subranges. For example, the average length of the collagen fibrils can be about 100 nm, about 200 nm, about 300 nm, about 400 nm, about 500 nm, about 600 nm, about 700 nm, about 800 nm, about 900 nm, about 1 µm, about 5 µm, about 10 µm, about 20 µm, about 30 µm, about 40 µm, about 50 µm, about 60 µm, about 70 µm, about 80 µm, about 90 µm, about 100 µm, about 200 µm, about 300 µm, about 400 µm, about 500 µm, about 600 µm, about 700 µm, about 800 µm, about 900 µm, or about 1 mm, or within a range having any two of these values as endpoints, inclusive of the endpoints. In some embodiments, the average length can be in a range of about 200 nm to about 900 µm, about 300 nm to about 800 µm, about 400 nm to about 700 µm, about 500 nm to about 600 µm, about 600 nm to about 500 µm, about 700 nm to about 400 µm, about 800 nm to about 300 µm, about 900 nm to about 200 µm, about 1 µm to about 100 µm, about 5 µm to about 90 µm, about 10 µm to about 80 µm, about 20 µm to about 70 µm, about 30 µm to about 60 µm, or about 40 µm to about 50 µm.

In some embodiments, the collagen fibrils can exhibit a unimodal, bimodal, trimodal, or multimodal distribution. For example, a collagen-containing layer can include two different fibril preparations, each having a different range of fibril diameters arranged around one of two different modes. Such collagen mixtures can be selected to impart additive, synergistic, or a balance of physical properties to the collagen-containing layer.

In some embodiments, the collagen fibrils form networks. For example, individual collagen fibrils can associate to exhibit a banded pattern. These banded fibrils can then associate into larger aggregates of fibrils. However, in some embodiments, the fibrillated collagen can lack a higher order structure. For example, the collagen fibrils can be unbundled and provide a strong and uniform non-anisotropic structure to layered collagen materials. In other embodiments, the collagen fibrils can be bundled or aligned into higher order structures. For example, the collagen fibrils can have an orientation index in the range of 0 to about 1.0, including subranges. For example, the orientation index of the collagen fibrils can be 0, about 0.1, about 0.2, about 0.3, about 0.4, about 0.5, about 0.6, about 0.7, about 0.8, about 0.9, or about 1.0, or within a range having any two of these values as endpoints, inclusive of the endpoints, inclusive of the endpoints. In some embodiments, the orientation index can be in a range of about 0.1 to about 0.9, about 0.2 to about 0.8, about 0.3 to about 0.4, or about 0.5 to about 0.6. An orientation index of 0 describes collagen fibrils that are perpendicular to other fibrils, and an orientation index of 1.0 describes collagen fibrils that are completely aligned.

The present disclosure provides layered materials, and methods of making layered materials, that have a look and feel, as well as mechanical properties, similar to natural leather. The layered materials can have, among other things, haptic properties, aesthetic properties, mechanical/performance properties, manufacturability properties, and/or thermal properties similar to natural leather. Mechanical/performance properties that can be similar to natural leather include, but are not limited to, tensile strength, tear strength, elongation at break, resistance to abrasion, internal cohesion, water resistance, breathability (quantified in some embodiments by a moisture vapor transmission rate measurement), and the ability to retain color when rubbed (color fastness). Haptic properties that can be similar to natural leather include, but are not limited to, softness, rigidity, coefficient of friction, and compression modulus. Aesthetic properties that can be similar to natural leather include, but are not limited to, dyeability, embossability, aging, color, color depth, and color patterns. Manufacturing properties that can be similar to natural leather include, but are not limited to, the ability to be stitched, cut, skived, and split. Thermal properties that can be similar to natural leather include, but are not limited to, heat resistance and resistance to stiffening or softening over a significantly wide temperature range, for example 25° C. to 100° C.

The layered materials described herein comprise one or more collagen-containing layers. The collagen-containing layers can include one more types of collagen and one more polymeric materials. In some embodiments, the collagen can be recombinant collagen. In certain embodiments, the collagen-containing layers can be collagen/polymer matrix layers.

In some embodiments, a collagen/polymer matrix layer can include collagen and one or more polymers that are miscible with the collagen. In embodiments including a plurality of the polymers, the polymers can be miscible with the collagen and with each other. In some embodiments, a collagen/polymer matrix layer can include collagen dissolved within one or more polymer matrix materials such that the collagen and polymer matrix material form a homogenous mixture when blended. A collagen/polymer matrix layer including a homogenous mixture of collagen and polymer matrix material does not include a substantial amount of separate phases of the collagen and the polymer matrix material. In some embodiments, a collagen/polymer matrix layer can include collagen dispersed within one or more polymer matrix materials. In some embodiments, a collagen/polymer matrix layer can include collagen suspended within one or more polymer matrix materials.

Collagen/polymer matrix layers described herein can be formed by blending collagen and one or more polymers in a liquid state and drying the blended solution. In some embodiments, the blended collagen and polymer(s) can be formed into a sheet and can, in certain embodiments, be attached to a substrate layer using a suitable attachment process, such as a lamination process or a thermo-molding process. In certain embodiments, the lamination process can include attaching the sheet to the substrate layer using an adhesive layer. In some embodiments, the blended collagen and polymer solution can be coated or otherwise deposited over a substrate layer to attach the blended collagen and polymer solution to the substrate layer. In some embodiments, attaching the blended collagen and polymer solution to the substrate layer can result in a portion of the blended collagen and polymer solution being integrated into a portion of the substrate layer.

In some embodiments, collagen can be dissolved in a solvent prior to blending with one or more polymers. Suitable solvents include, but are not limited to, water and ethanol. In some embodiments, the collagen concentration in the collagen-solvent mixture can be in a range of about 10 g/L (grams per liter) to about 300 g/L, including subranges. For example, the collagen concentration in the collagen-solvent mixture can be about 10 g/L, about 20 g/L, about 30 g/L, about 40 g/L, about 50 g/L, about 60 g/L, about 70 g/L, about 80 g/L, about 90 g/L, about 100 g/L, about 150 g/L, about 200 g/L, about 250 g/L, about 300 g/L, or within a range having any two of these values as endpoints, inclusive of the endpoints. In some embodiments, the collagen concentration in the collagen-solvent mixture can be in a range of about 20 g/L to about 150 g/L, about 30 g/L to about 100 g/L, or about 40 g/L to about 80 g/L.

Suitable polymers for use in the collagen/polymer matrix layers include natural and synthetic polymers. Suitable natural polymers include, but are not limited to, natural latex polymers. Suitable synthetic polymers include, but are not limited to, polyurethanes, polyurethane-ureas, acrylic acid copolymers, polyacrylamides, polyethylene oxide, polyvinyl alcohols, or a combination thereof. In some embodiments, the polymer can be a water-dispersible polymer. In some embodiments, the polymer in the collagen/polymer matrix layer can be a bio-based polymer. As used herein, a "bio-based polymer" means a polymer where at least a portion of the polymer is made from an agriculturally renewable resource. Renewable resources include, but are not limited to, corn, sugarcane, and microbial/cell-based recombinant production.

Suitable polyurethanes include, but are not limited to, aliphatic polyurethanes, aromatic polyurethanes, bio-based polyurethanes, Eco polyurethanes, or acrylic acid modified polyurethanes. In some embodiments, a polymer for a collagen/polymer matrix layer can be bio-polyurethane. In some embodiments, the polyurethane is a water-dispersible polyurethane. In some embodiments, the polyurethane can be a polyester polyurethane. In some embodiments, the polyurethane can be a bio-based polyester polyurethane. A bio-based polyurethane is a polyurethane where the building blocks of polyols, such as diols and diacids like succinic acid, are derived from corn starch. Exemplary bio-based polyurethanes include, but are not limited to, IMPRANIL® Eco DLS, IMPRANIL® Eco DL 519, and IMPRANIL® Eco DLP-R available from Covestro. In some embodiments, the bio-based polyurethane can be a polyester polyurethane dispersion having a 35% solids content, a viscosity of 50 to 500 cps (centipoise), and a density of about 8.5 lb/gal (pounds per gallon). When dried, the polyester polyurethane dispersion can have the following material properties: an elongation of about 370% and a tensile strength of about 1600 psi. Exemplary Eco polyurethanes include, but are not limited to, EPOTAL® Eco 3702 and EPOTAL® P100 Eco from BASF.

In some embodiments, a polymer, for example, a polyurethane, can include reactive groups that can be cross-linked with collagen. In such embodiments, the reactive groups can be a sulfonate, an aldehyde, a carboxylic acid or ester, a blocked isocyanate, or the like. Also in such embodiments, collagen and polymer within a collagen/polymer matrix layer can be cross-linked to each other. Suitable polymers are commercially available from manufacturers including Lubrizol, Hauthaway, and the like.

FIG. 1 shows a layered collagen material 100 according to some embodiments. Layered collagen material 100 includes a collagen/polymer matrix layer 120 attached to substrate layer 110. Collagen/polymer matrix layer 120 can be directly attached to a surface of substrate layer 110 or attached to a surface of substrate layer 110 via an intermediate layer, for example an adhesive layer. Direct attachment can be achieved using, for example, a thermal bonding process or a stitching. Collagen/polymer matrix layer 120 can be referred to as a "first collagen/polymer matrix layer."

Collagen/polymer matrix layer 120 can include one or more types of collagen and one or more polymers. The collagen of collagen/polymer matrix layer 120 can be natural collagen, recombinant collagen, or a combination thereof. In some embodiments, collagen/polymer matrix layer 120 can include collagen dissolved within a polymer matrix material.

In some embodiments, the collagen/polymer matrix layer can be transparent. The transparency of a collagen/polymer matrix layer is evaluated before dying, tanning, or otherwise coloring a collagen/polymer matrix layer.

As used herein, a "transparent" material means material having an opacity of about 50% or less. Opacity is measured by placing a sample of material over a white background to measure the Y tristimulus value ("Over white Y") in reflectance with a spectrometer using the D65 10 degree illuminant. The same sample is then placed over a black background and the measurement is repeated, yielding "Over black Y". Percent opacity is calculated as "Over black Y" divided by "Over white Y" times 100. 100% opacity is defined as lowest transparency and 0% opacity is defined as the highest transparency.

In some embodiments, a transparent material can have an opacity in a range of 0% to about 50%, including subranges. For example, a transparent material, can have an opacity in a range of 0% to about 40%, 0% to about 30%, 0% to about 20%, 0% to about 10%, or 0% to about 5%.

A transparent collagen/polymer matrix layer 120 can be created by selecting and blending the appropriate combination of collagen and polymer(s). While not all combinations of collagen and polymer will result in a transparent collagen/polymer matrix layer, it is within the skill of the ordinarily skilled artisan to identify whether a given blend results in a transparent collagen/polymer matrix layer in view of this disclosure. In some embodiments, the collagen/polymer matrix layer including collagen blended with a polyurethane is a transparent collagen/polymer matrix layer. A transparent collagen/polymer matrix layer can provide unique characteristics for a layered collagen material. For example, compared to a non-transparent layer, a transparent collagen/polymer matrix layer can provide unique depth of color when dyed. Likewise, a transparent collagen/polymer matrix layer can provide its mechanical properties to a layered collagen material without significantly influencing the aesthetic properties of the material.

Collagen/polymer matrix layer 120 includes a bottom surface 122, a top surface 124, and thickness 126 measured between bottom surface 122 and top surface 124. In some embodiments, thickness 126 can be in a range of about 25 microns to about 400 microns (micrometers, µm), including subranges. For example, thickness 126 can be about 25 microns, about 50 microns, about 100 microns, about 125 microns, about 150 microns, about 175 microns, about 200 microns, about 250 microns, about 300 microns, about 350 microns, or about 400 microns, or within a range having any two of these values as endpoints, inclusive of the endpoints. In some embodiments, thickness 126 can be in a range of about 50 microns to about 350 microns, about 75 microns to about 300 microns, about 100 microns to about 250 microns, about 125 microns to about 200 microns, or about 150 microns to about 175 microns.

Collagen/polymer matrix layer 120 can have a dry weight, measured in grams per square meter (gsm, g/m$^2$), in a range of about 25 g/m$^2$ to about 125 g/m$^2$, including subranges. For example, collagen/polymer matrix layer 120 can have a dry weight of about 25 g/m$^2$, about 50 g/m$^2$, about 75 g/m$^2$, about 100 g/m$^2$, or about 125 g/m$^2$, or within a range having any two of these values as endpoints, inclusive of the endpoints. In some embodiments, collagen/polymer matrix layer 120 can have a dry weight in a range of about 25 g/m$^2$ to about 125 g/m$^2$, about 25 g/m$^2$ to about 100 g/m$^2$, or about 50 g/m$^2$ to about 100 g/m$^2$. Unless specified otherwise, the dry weight of a layer is measured during the process of making a material using the following method. First, before applying the layer in question to the material, a first sample (about 10 centimeters in diameter) of the material is cut, and the weight and dimensions are measured to calculate a first dry weight. If a sacrificial layer is present, it is removed before measuring the weight and dimensions. Second, after applying and drying the layer in question, a second sample of the same size is cut from the material, and the weight and dimensions are measured to calculate a second dry weight. If a sacrificial layer is present, it is removed before measuring the weight and dimensions. Third, the first dry weight is subtracted from the second dry weight to obtain the dry weight of the layer in question. All the weight and dimension measurements are performed at the same humidity level, typically the humidity level of the manufacturing environment in which the material is made. For purposes of calculating a dry weight, three separate dry weight tests are performed, and the average dry weight is reported as the dry weight of the layer.

In some embodiments, collagen/polymer matrix layer 120 can be a non-foamed layer. A "non-foamed" layer means a layer having a density, measured in the percent void space for the layer, of 5% void space or less, for example 0% void space to 5% void space. In some embodiments, collagen/polymer matrix layer 120 can be a foamed layer. In such embodiments, collagen/polymer matrix layer can have a density, measured in the percent void space for layer 120, in a range of about 5% void space to about 70% void space, including subranges. For example, collagen/polymer matrix layer 120 can have about 5% void space, about 10% void space, about 20% void space, about 30% void space, about 35% void space, about 40% void space, about 45% void space, about 50% void space, about 55% void space, about 60% void space, about 65% void space, or about 70% void space, or within a range having any two of these values as endpoints, inclusive of the endpoints. In some embodiments, collagen/polymer matrix layer 120 can have a percent void space in a range of about 10% to about 65%, about 20% to about 60%, about 30% to about 55%, about 35% to about 50%, or about 40% to about 45%.

A percent void space (which can also be referred to as a "percent porosity") can be measured by image analysis of a cross-section of a layer or by measuring the bulk density of sample of a layer using a pycnometer. Unless specified otherwise, a percent void space reported herein is measured by image analysis of a cross-section of a layer. The images are analyzed using ImageJ software (or equivalent software) at 37× magnification. The ImageJ software uses a trainable Weka segmentation classifier to calculate the percent void space in the layer. For purposes of calculating a percent void space, three to five separate images of a cross-section are evaluated, and the average percent void space is reported as the percent void space for the layer. In some embodiments, collagen/polymer matrix layer 120 can include one or more foaming agents and/or foam stabilizers. Suitable foaming agents and foam stabilizers include those discussed herein for layers 130 and 140.

In some embodiments, collagen/polymer matrix layer 120 can include one or more fatliquors. Fatliquor may be incorporated into collagen/polymer matrix layer 120 using a "lubricating" and "fatliquoring" process. Exemplary fatliquors include, but are not limited to, fats, oils, including biological oils such as cod oil, mineral oils, or synthetic oils such as sulfonated oils, polymers, organofunctional siloxanes, or other hydrophobic compounds or agents used for fatliquoring conventional leather, or mixtures thereof. Other fatliquors can include surfactants such as anionic surfactants, cationic surfactants, cationic polymeric surfactants, anionic polymeric surfactants, amphiphilic polymers, fatty acids, modified fatty acids, nonionic hydrophilic polymers, nonionic hydrophobic polymers, poly acrylic acids, poly methacrylic acids, acrylics, natural rubbers, synthetic rubbers, resins, amphiphilic anionic polymers and copolymers, amphiphilic cationic polymer and copolymers and mixtures thereof as well as emulsions or suspensions of these in water, alcohol, ketones, and other solvents. One or more fatliquors can be incorporated in any amount that facilitates movement of collagen fibrils, or that confers leather-like properties such as flexibility, decrease in brittleness, durability, or water resistance. In some embodiments, the fatliquor may be TRUPOSOL® BEN, an acrylic acid based retanning polymer available from Trumpler.

In some embodiments, collagen/polymer matrix layer 120 can be tanned. Tanning can be performed in any number of well-understood ways, including by contacting collagen/polymer matrix layer 120 with a vegetable tanning agent, blocked isocyanate compounds, chromium compound, aldehyde, syntan, natural resin, tanning natural oil, or modified oil. Blocked isocyanate compounds can include X-tan. Vegetable tannins can include pyrogallol- or pyrocatechin-based tannins, such as valonea, mimosa, ten, tara, oak, pinewood, sumach, quebracho, and chestnut tannins. Chromium tanning agents can include chromium salts such as chromium sulfate. Aldehyde tanning agents can include glutaraldehyde and oxazolidine compounds. Syntans can include aromatic polymers, polyacrylates, polymethacrylates, copolymers of maleic anhydride and styrene, condensation products of formaldehyde with melamine or dicyandiamide, lignins, and natural flours.

Substrate layer 110 includes a bottom surface 112, a top surface 114, and a thickness 116 measured between bottom surface 112 and top surface 114. In some embodiments, thickness 116 can be in a range of about 50 microns to about 1000 microns, including subranges. For example, thickness 126 can be about 50 microns, about 100 microns, about 150 microns, about 200 microns, about 250 microns, about 300 microns, about 350 microns, about 400 microns, about 500 microns, about 600 microns, about 700 microns, about 800 microns, about 900 microns, or about 1000 microns, or within a range having any two of these values as endpoints, inclusive of the endpoints. In some embodiments, thickness 116 can be in a range of about 100 microns to about 900 microns, about 150 microns to about 800 microns, about 200 microns to about 700 microns, about 250 microns to about 600 microns, about 300 microns to about 500 microns, or about 350 microns to about 400 microns.

Substrate layer 110 can have a dry weight, measured in grams per square meter ($g/m^2$), in a range of about 50 $g/m^2$ to about 600 $g/m^2$, including subranges. For example, substrate layer 110 can have a dry weight of about 50 $g/m^2$, about 75 $g/m^2$, about 100 $g/m^2$, about 125 $g/m^2$, about 150 $g/m^2$, about 175 $g/m^2$, about 200 $g/m^2$, about 300 $g/m^2$, about 400 $g/m^2$, about 500 $g/m^2$, or about 600 $g/m^2$, or within a range having any two of these values as endpoints. In some embodiments, substrate layer 110 can have a dry weight in a range of about 75 $g/m^2$ to about 500 $g/m^2$, about 100 $g/m^2$ to about 400 $g/m^2$, about 125 $g/m^2$ to about 300 $g/m^2$, about 150 $g/m^2$ to about 200 $g/m^2$, or about 175 $g/m^2$ to about 200 $g/m^2$.

Substrate layer 110 can include one or more textile layers. The textile layer(s) can be, for example, a woven layer, a non-woven layer, a knit layer, a mesh fabric layer, or a leather layer. In some embodiments, substrate layer 110 can be, or can include, a polyester knit layer, a polyester cotton spandex blend knit layer, or a suede layer. In some embodiments, substrate layer 110 can be made from one or more natural fibers, for example fibers made from cotton, linen, silk, wool, kenaf, flax, cashmere, angora, bamboo, bast, hemp, soya, seacell, milk or milk proteins, spider silk, chitosan, mycelium, cellulose including bacterial cellulose, or wood. Mycelium is the vegetative part of a fungus or fungus-like bacterial colony, composed of a mass of branching, thread-like hyphae. Fungi are composed primarily of a cell wall that is constantly being extended at the apex of the hyphae. Unlike the cell wall of a plant, which is composed primarily of cellulose, or the structural component of an animal cell, which relies on collagen, the structural oligosaccharides of the cell wall of fungi rely primarily on chitin and beta glucan. Chitin is a strong, hard substance, also found in the exoskeletons of arthropods.

In some embodiments, substrate layer 110 can be made from one or more synthetic fibers, for example fibers made from polyesters, nylons, aromatic polyamides, polyolefin fibers such as polyethylene, polypropylene, rayon, lyocell, viscose, antimicrobial yarn (A. M. Y.), Sorbtek, nylon, elastomers such as LYCRA®, spandex, or ELASTANE®, polyester-polyurethane copolymers, aramids, carbon including carbon fibers and fullerenes, glass, silicon, minerals, metals or metal alloys including those containing iron, steel, lead, gold, silver, platinum, copper, zinc, and titanium, or mixtures thereof.

In some embodiments, non-woven substrate layer 110 can be a staple non-woven, melt-blown non-woven, spunlaid non-woven, flashspun non-woven, or a combination thereof. In some embodiments, non-woven substrate layer 110 can be made by carding, can be air-laid, or can be wet-laid. In some embodiments, the carded, air-laid, or wet-laid substrates can be bonded by, for example, needle-punch, hydroentanglement, lamination, or thermal bonding. In some embodiments, non-woven substrate layer 110 can include one or more natural fibers, for example fibers made from cotton, linen, silk, wool, kenaf, flax, cashmere, angora, bamboo, bast, hemp, soya, seacell, milk or milk proteins, spider silk, chitosan, mycelium, cellulose including bacterial cellulose, or wood.

In some embodiments, non-woven substrate layer 110 can include polymeric fibers with functional particles in the polymer. Exemplary functional particles include ceramic particles mixed in a polymeric resin during an extrusion process for making the polymeric fibers. Such ceramic particles can provide the polymeric fibers with desirable heat dissipation and flame resistance properties. In some embodiments, non-woven substrate layer 110 can include fibers made of fruit pulp (e.g., grape pulp or apple pulp) or pineapple fibers. In some embodiments, non-woven substrate layer can include fibers made from recycled materials, for example recycled plastics. In some embodiments, non-woven substrate layer 110 can include algae fibers. In some embodiments, a non-woven substrate layer 110 can include cork fibers.

Figure 5:
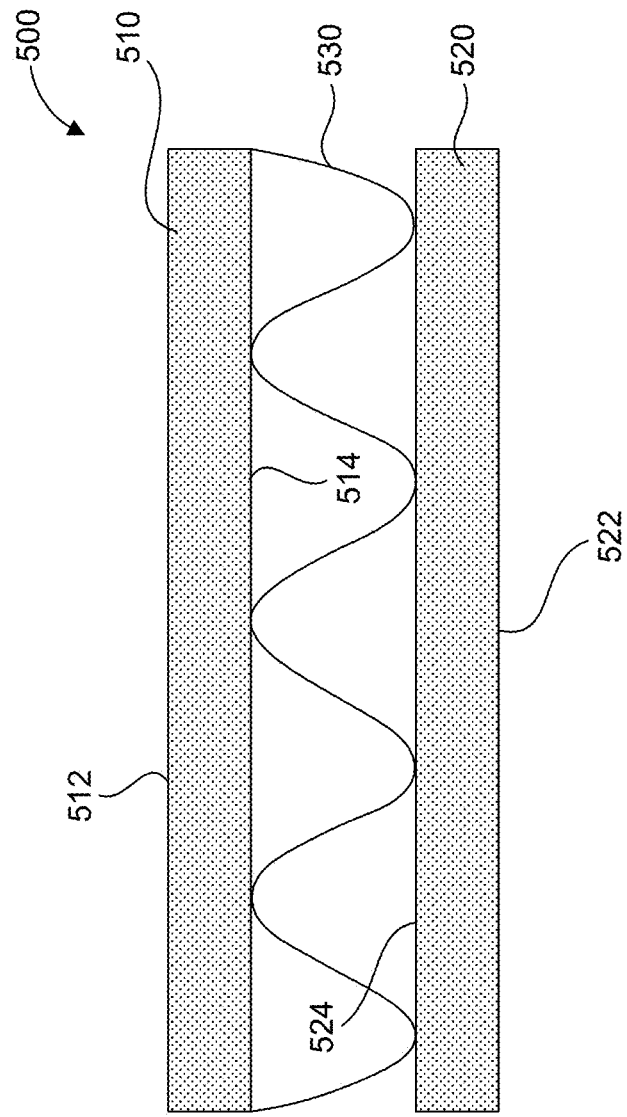
FIG. 5 illustrates a spacer fabric according to some embodiments.

In some embodiments, substrate layer 110 can be, or can include, a spacer fabric, for example spacer fabric 500, shown in FIG. 5. Spacer fabric 500 includes a first fabric layer 510 and a second fabric layer 520 connected by one or more spacer yarns 530. Spacer yarn(s) 530 are disposed between first fabric layer 510 and second fabric layer 520 and define a distance between an interior surface 514 of first fabric layer 510 and an interior surface 524 of second fabric layer 520. Exterior surface 512 of first fabric layer 510 and exterior surface 522 of second fabric layer 520 can define top surface 114 and bottom surface 112 of substrate layer 110, respectively.

First fabric layer 510 and second fabric layer 520 can include one or more layers of fabric material. In some embodiments, first fabric layer 510 and second fabric layer 520 can include one or more textile layers made from staple fibers, filaments, or mixtures thereof. As used herein, "staple fibers" are fibers having a short length, between about 0.2 mm to about 5 centimeters (cm). Staple fibers can be naturally occurring or can be cut filaments. As used herein, "filaments" are long fibers having a length of 5 cm or more. In some embodiments, first fabric layer 510 and second fabric layer 520 can include one or more layers of a woven material or a knitted material. In some embodiments, exterior surface 512 of first fabric layer 510 can be defined by a woven fabric layer or a knitted fabric layer. In some embodiments, exterior surface 522 of second fabric layer 520 can be defined by a woven fabric layer or a knitted fabric layer.

In some embodiments, first fabric layer 510 and second fabric layer 520 can be made from one or more natural fibers, for example fibers made from cotton, linen, silk, wool, kenaf, flax, cashmere, angora, bamboo, bast, hemp, soya, seacell, milk or milk proteins, spider silk, chitosan, mycelium, cellulose including bacterial cellulose, or wood. In some embodiments, first fabric layer 510 and second fabric layer 520 can be made from one or more synthetic fibers, for example fibers made from polyesters, nylons, aromatic polyamides, polyolefin fibers such as polyethylene, polypropylene, rayon, lyocell, viscose, antimicrobial yarn (A. M. Y.), Sorbtek, nylon, elastomers such as LYCRA®, spandex, or ELASTANE®, polyester-polyurethane copolymers, aramids, carbon including carbon fibers and fullerenes, glass, silicon, minerals, metals or metal alloys including those containing iron, steel, lead, gold, silver, platinum, copper, zinc, and titanium, or mixtures thereof. Spacer yarn(s) 530 can include mono-filament yarn(s) composed of any of the natural or synthetic materials listed above for first fabric layer 510 and second fabric layer 520.

In some embodiments, substrate layer 110 can be colored with a coloring agent. In some embodiments the coloring agent can be a dye, for example an acid dye, a fiber reactive dye, a direct dye, a sulfur dye, a basic dye, or a reactive dye. In some embodiments, the coloring agent can be pigment, for example a lake pigment. In some embodiments, a first coloring agent can be incorporated into one or more collagen/polymer matrix layers and a second coloring agent can be incorporated into substrate layer 110, depending on the desired aesthetic of a layered collagen material.

A fiber reactive dye includes one or more chromophores that contain pendant groups capable of forming covalent bonds with nucleophilic sites in fibrous, cellulosic substrates in the presence of an alkaline pH and raised temperature. These dyes can achieve high wash fastness and a wide range of brilliant shades. Exemplary fiber reactive dyes, include but are not limited to, sulphatoethylsulphone (Remazol), vinylsulphone, and acrylamido dyes. These dyes can dye protein fibers such as silk, wool and nylon by reacting with fiber nucleophiles via a Michael addition. Direct dyes are anionic dyes capable of dying cellulosic or protein fibers. In the presence of an electrolyte such as sodium chloride or sodium sulfate, near boiling point, these dyes can have an affinity to cellulose. Exemplary direct dyes include, but are not limited to, azo, stilbene, phthalocyanine, and dioxazine.

In some embodiments, layered collagen material 100 can include a collagen/polymer matrix layer 120 attached to top surface 114 of substrate layer 110. In some embodiments, bottom surface 122 of collagen/polymer matrix layer 120 can be in direct contact with top surface 114 of substrate layer 110. In some embodiments, bottom surface 122 of collagen/polymer matrix layer 120 can be attached to top surface 114 of substrate layer 110 via an adhesive layer (e.g., adhesive layer 150). In some embodiments, layered collagen material 100 can include a collagen/polymer matrix layer 120 attached to bottom surface 112 of substrate layer 110. In some embodiments, top surface 124 of collagen/polymer matrix layer 120 can be in direct contact with bottom surface 112 of substrate layer 110. In some embodiments, top surface 124 of collagen/polymer matrix layer 120 can be attached to bottom surface 112 of substrate layer 110 via an adhesive layer (e.g., adhesive layer 150). In some embodiments, layered collagen material 100 can include a collagen/polymer matrix layer 120 attached to top surface 114 of substrate layer 110 and a collagen/polymer matrix layer 120 attached to bottom surface 112 of substrate layer 110. In such embodiments, layered collagen material 100 includes collagen/polymer matrix layers 120 disposed on opposing surfaces of substrate layer 110.

Figure 2:
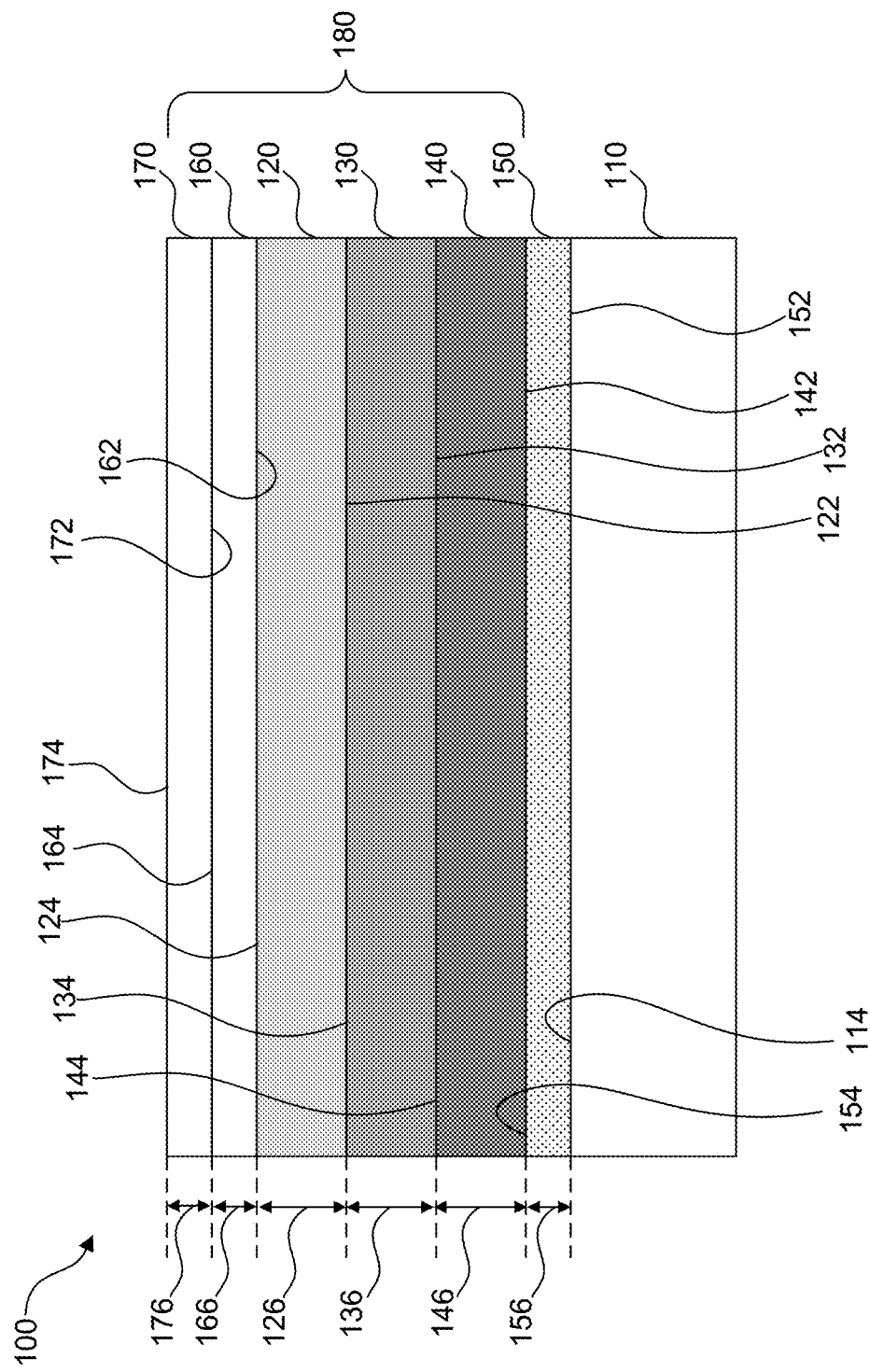
FIG. 2 illustrates a layered collagen material according to some embodiments.

In some embodiments, as shown for example in FIG. 2, layered collagen material 100 can include a second collagen/polymer matrix layer 130 disposed between collagen/polymer matrix layer 120 and substrate layer 110. In such embodiments, second collagen/polymer matrix layer 130 is attached to collagen/polymer matrix layer 120. In some embodiments, bottom surface 122 of collagen/polymer matrix layer 120 can be in direct contact with a top surface 134 of second collagen/polymer matrix layer 130.

Second collagen/polymer matrix layer 130 includes a bottom surface 132, top surface 134, and a thickness 136 measured between bottom surface 132 and top surface 134. In some embodiments, thickness 136 can be in a range of about 25 microns to about 600 microns, including subranges. For example, thickness 136 can be about 25 microns, about 50 microns, about 100 microns, about 125 microns, about 150 microns, about 175 microns, about 200 microns, about 225 microns, about 250 microns, about 275 microns, about 300 microns, about 400 microns, about 500 microns, or about 600 microns, or within a range having any two of these values as endpoints, inclusive of the endpoints. In some embodiments, thickness 136 can be in a range of about 50 microns to about 500 microns, about 75 microns to about 400 microns, about 100 microns to about 300 microns, about 125 microns to about 275 microns, about 150 microns to about 250 microns, about 175 microns to about 225 microns, or about 200 microns to about 225 microns. In some embodiments, thickness 136 can be greater than thickness 126. In some embodiments, thickness 136 can be less than thickness 126. In some embodiments, thickness 136 can be greater than or less than thickness 126 by 5 microns or more.

Second collagen/polymer matrix layer 130 can have a dry weight, measured in grams per square meter ($g/m^2$), in a range of about 30 $g/m^2$ to about 600 $g/m^2$, including subranges. For example, second collagen/polymer matrix layer 130 can have a dry weight of about 30 $g/m^2$, about 40 $g/m^2$, about 60 $g/m^2$, about 80 $g/m^2$, about 100 $g/m^2$, about 120 $g/m^2$, about 140 $g/m^2$, about 150 $g/m^2$, about 200 $g/m^2$, about 300 $g/m^2$, about 400 $g/m^2$, about 500 $g/m^2$, or about 600 $g/m^2$, or within a range having any two of these values as endpoints, inclusive of the endpoints. In some embodiments, second collagen/polymer matrix layer 130 can have a dry weight in a range of about 40 $g/m^2$ to about 500 $g/m^2$, about 60 $g/m^2$ to about 400 $g/m^2$, about 80 $g/m^2$ to about 300 $g/m^2$, about 100 $g/m^2$ to about 200 $g/m^2$, about 120 $g/m^2$ to about 150 $g/m^2$, or about 140 $g/m^2$ to about 150 $g/m^2$. In some embodiments, collagen/polymer matrix layer 120 can have a first weight and second collagen/polymer matrix layer 130 can have a second weight, and the first weight can be less than the second weight. In some embodiments, the first weight can be less than the second weight by 5 g/m² or more.

In some embodiments, second collagen/polymer matrix layer 130 can include a foaming agent. In some embodiments, second collagen/polymer matrix layer 130 can include a foam stabilizer. The foaming agent or foam stabilizer can facilitate the formation of voids in second collagen/polymer matrix layer 130 during blending of second collagen/polymer matrix layer 130. Suitable foam stabilizers include, but are not limited to, HeiQ Chemtex 2216-T (a stabilized blend of nonionic and anionic surfactants), HeiQ Chemtex 2241-A (a modified HEUR (hydrophobically-modified ethylene oxide urethane) thickener), HeiQ Chemtex 2243 (a non-ionic silicone dispersion), or HeiQ Chemtex 2317 (a stabilized blend of nonionic and anionic surfactants) foam stabilizers available from HeiQ Chemtex. When used, a foam stabilizer serves to stabilize mechanically created foam (air voids). The mechanically created foam may be created by, for example, a rotor and/or compressed air. When used, a foaming agent can create foam (air voids) within a layer by a chemical reaction and/or via heat generation with in the layer.

In some embodiments, second collagen/polymer matrix layer 130 can be referred to as a "foamed collagen/polymer matrix layer" because either (i) layer 130 includes one or more foaming agents or foam stabilizers and/or (ii) layer 130 includes a density less than collagen polymer matrix layer 120.

Second collagen/polymer matrix layer 130 can have a density, measured in the percent void space for layer 130, in a range of about 5% void space to about 70% void space, including subranges. For example, second collagen/polymer matrix layer 130 can have about 5% void space, about 10% void space, about 20% void space, about 30% void space, about 35% void space, about 40% void space, about 45% void space, about 50% void space, about 55% void space, about 60% void space, about 65% void space, or about 70% void space, or within a range having any two of these values as endpoints, inclusive of the endpoints. In some embodiments, second collagen/polymer matrix layer 130 can have a percent void space in a range of about 10% to about 65%, about 20% to about 60%, about 30% to about 55%, about 35%, to about 50%, or about 40% to about 45%. In some embodiments, collagen/polymer matrix layer 120 can have a first density and second collagen/polymer matrix layer 130 can have a second density, and the first density can be greater than the second density. In some embodiments, the first density can be greater than the second density by 5% void space or more.

Layering a plurality of collagen/polymer matrix layers having different weights and/or densities can be used to tailor the material properties of the layered collagen material. For example, layers having lighter weights and/or densities can be used to increase the softness and/or flexibility of a layered collagen material. On the other hand, layers having high weights and/or densities can increase the strength of the layered collagen material. Additionally, using one or more layers having relatively lighter weight and/or density can increase the ease in which cutting, stitching, and/or shaping process steps (e.g., skyving) can be performed on a layered collagen material. Layering a plurality of collagen/polymer matrix layers gives lot of freedom in designing of a material.

In some embodiments, second collagen/polymer matrix layer 130 can further include, in addition to any other components that may be present, such as a foaming agent, a foam stabilizer, one or more fatliquors and/or one or more coloring agents. The fatliquor type and content and coloring agent type and content for second collagen/polymer matrix layer 130 can be any of the types and amounts described herein for collagen/polymer matrix layer 120. In some embodiments, second collagen/polymer matrix layer 130 can be free or substantially free of a fatliquor. In some embodiments, second collagen/polymer matrix layer 130 can be free or substantially free of a coloring agent. In some embodiments, second collagen/polymer matrix layer 130 can be free or substantially free of a fatliquor and a coloring agent.

In some embodiments, second collagen/polymer matrix layer 130 can be tanned. Tanning of second collagen/polymer matrix layer 130 can be performed in any of the ways described above for collagen/polymer matrix layer 120.

In some embodiments, as shown for example in FIG. 2, layered collagen material 100 can include a third collagen/polymer matrix layer 140 disposed between second collagen/polymer matrix layer 130 and substrate layer 110. In such embodiments, third collagen/polymer matrix layer 140 is attached to second collagen/polymer matrix layer 130. In some embodiments, bottom surface 132 of second collagen/polymer matrix layer 130 can be in direct contact with a top surface 144 of third collagen/polymer matrix layer 140.

Third collagen/polymer matrix layer 140 includes a bottom surface 142, top surface 144, and a thickness 146 measured between bottom surface 142 and top surface 144. In some embodiments, thickness 146 can be in a range of about 25 microns to about 600 microns, including subranges. For example, thickness 146 can be about 25 microns, about 50 microns, about 100 microns, about 125 microns, about 150 microns, about 175 microns, about 200 microns, about 225 microns, about 250 microns, about 275 microns, about 300 microns, about 400 microns, about 500 microns, or about 600 microns, or within a range having any two of these values as endpoints, inclusive of the endpoints. In some embodiments, thickness 146 can be in a range of about 50 microns to about 500 microns, about 75 microns to about 400 microns, about 100 microns to about 300 microns, about 125 microns to about 275 microns, about 150 microns to about 250 microns, about 175 microns to about 225 microns, or about 175 microns to about 200 microns. In some embodiments, thickness 146 can be greater than thickness 126. In some embodiments, thickness 146 can be less than thickness 126. In some embodiments, thickness 146 can be greater than or less than thickness 126 by 5 microns or more. In some embodiments, thickness 146 can be the same as thickness 136. In some embodiments, thickness 146 can be greater than or less than thickness 136. In some embodiments, thickness 146 can be greater than or less than thickness 136 by 5 microns or more.

Third collagen/polymer matrix layer 140 can have a dry weight, measured in grams per square meter (g/m²), in a range of about 30 g/m² to about 600 g/m², including subranges. For example, third collagen/polymer matrix layer 140 can have a dry weight of about 30 g/m², about 40 g/m², about 60 g/m², about 80 g/m², about 100 g/m², about 120 g/m², about 140 g/m², about 150 g/m², about 200 g/m², about 300 g/m², about 400 g/m², about 500 g/m², or about 600 g/m², or within a range having any two of these values as endpoints, inclusive of the endpoints. In some embodiments, third collagen/polymer matrix layer 140 can have a dry weight in a range of about 40 g/m² to about 500 g/m², about 60 g/m² to about 400 g/m², about 80 g/m² to about 300 g/m², about 100 g/m² to about 200 g/m², about 120 g/m² to about 150 g/m², or about 120 g/m² to about 140 g/m². In some embodiments, collagen/polymer matrix layer 120 can have a first weight and third collagen/polymer matrix layer 140 can have a third weight, and the first weight can be less than the third weight. In some embodiments, collagen/polymer matrix layer 120 can have a first weight, second collagen/polymer matrix layer 130 can have a second weight, and third collagen/polymer matrix layer 140 can have a third weight, and the first weight can be less than the second weight and the third weight. In some embodiments, the first weight can be less than the second weight and/or the third weight by 5 g/m² or more.

In some embodiments, third collagen/polymer matrix layer 140 can include a foaming agent. In some embodiments, third collagen/polymer matrix layer 140 can include a foam stabilizer. The foaming agent and/or foam stabilizer can facilitate the formation of voids in third collagen/polymer matrix layer 140 during blending of third collagen/polymer matrix layer 140. Suitable foaming agents include, but are not limited to, HeiQ Chemtex 2216-T (a stabilized blend of nonionic and anionic surfactants), HeiQ Chemtex 2241-A (a modified HEUR (hydrophobically-modified ethylene oxide urethane) thickener), HeiQ Chemtex 2243 (a non-ionic silicone dispersion), or HeiQ Chemtex 2317 (a stabilized blend of nonionic and anionic surfactants) foam stabilizers available from HeiQ Chemtex.

In some embodiments, third collagen/polymer matrix layer 140 can be referred to as a "foamed collagen/polymer matrix layer" because either (i) layer 140 includes one or more foaming agents or foam stabilizers and/or (ii) layer 140 includes a density less than collagen polymer matrix layer 120.

Third collagen/polymer matrix layer 140 can have a density, measured in the percent void space for layer 140, in a range of about 5% void space to about 70% void space, including subranges. For example, third collagen/polymer matrix layer 140 can have about 5% void space, about 10% void space, about 20% void space, about 30% void space, about 35% void space, about 40% void space, about 45% void space, about 50% void space, about 55% void space, about 60% void space, about 65% void space, or about 70% void space, or within a range having any two of these values as endpoints, inclusive of the endpoints. In some embodiments, third collagen/polymer matrix layer 140 can have a percent void space in a range of about 10% to about 65%, about 20% to about 60%, about 30% to about 55%, about 35% to about 50%, or about 40% to about 45%. In some embodiments, collagen/polymer matrix layer 120 can have a first density and third collagen/polymer matrix layer 140 can have a third density, and the first density can be greater than the third density. In some embodiments, collagen/polymer matrix layer 120 can have a first density, second collagen/polymer matrix layer 130 can have a second density, and third collagen/polymer matrix layer 140 can have a third density, and the first density can be greater than the second density and third density. In some embodiments, the first density can be greater than the second density and/or the third density by 5% void space or more.

In some embodiments, third collagen/polymer matrix layer 140 can further include, in addition to any other components that may be present, such as a foaming agent, a foam stabilizer, one or more fatliquors and/or one or more coloring agents. The fatliquor type and content and coloring agent type and content for third collagen/polymer matrix layer 140 can be any of the types and amounts described herein for collagen/polymer matrix layer 120. In some embodiments, third collagen/polymer matrix layer 140 can be free or substantially free of a fatliquor. In some embodiments, third collagen/polymer matrix layer 140 can be free or substantially free of a coloring agent. In some embodiments, third collagen/polymer matrix layer 140 can be free or substantially free of a fatliquor and a coloring agent.

In some embodiments, third collagen/polymer matrix layer 140 can be tanned. Tanning of third collagen/polymer matrix layer 140 can be performed in any of the ways described above for collagen/polymer matrix layer 120.

In some embodiments, and as shown for example in FIG. 2, layered collagen material 100 can include a basecoat layer 160. Basecoat layer 160 can be disposed over top surface 124 of collagen/polymer matrix layer 120. Basecoat layer 160 can be directly or indirectly attached to collagen/polymer matrix layer 120. In some embodiments, basecoat layer 160 can be disposed on top surface 124 of collagen/polymer matrix layer 120. In some embodiments, a bottom surface 162 of basecoat layer 160 can be in direct contact with top surface 124 of collagen/polymer matrix layer 120.

Basecoat layer 160 includes bottom surface 162, a top surface 164, and a thickness 166 measured between bottom surface 162 and top surface 164. In some embodiments, thickness 166 can be in a range of about 20 microns to about 200 microns, including subranges. For example, thickness 166 can be about 20 microns, about 30 microns, about 40 microns, about 50 microns, about 60 microns, about 70 microns, about 80 microns, about 90 microns, about 100 microns, about 150 microns, or about 200 microns, or within a range having any two of these values as endpoints, inclusive of the endpoints. In some embodiments, thickness 166 can be in a range of about 30 microns to about 150 microns, about 40 microns to about 100 microns, about 50 microns to about 90 microns, about 60 microns to about 80 microns, or about 60 microns to about 70 microns.

In embodiments including basecoat layer 160, basecoat layer 160 can provide one or more of the following properties for layered collagen material 100: (i) abrasion performance, color fastness, or hydrolytic resistance. Basecoat layer 160 may also serve to adhere to a top-coat layer to layered collagen material 100 in embodiments including a top-coat layer. In some embodiments, basecoat layer 160 can include one or more polymeric materials. Suitable materials for basecoat layer 160 include, but are not limited to, polyether polyurethanes, polycarbonate polyurethanes, polyester polyurethanes, acrylic polymers, and cross-linkers such as isocyanate or carbidiimide. In some embodiments, layered collagen material 100 can include a plurality of basecoat layers 160. In some embodiments, base coat layer 160 can be absent from layered collagen material 100.

Basecoat layer 160 can have a dry weight, measured in grams per square meter (g/m²), in a range of about 20 g/m² to about 100 g/m², including subranges. For example, basecoat layer 160 can have a dry weight of about 20 g/m², about 30 g/m², about 40 g/m², about 50 g/m², about 60 g/m², about 70 g/m², about 80 g/m², about 90 g/m², or about 100 g/m², or within a range having any two of these values as endpoints, inclusive of the endpoints. In some embodiments, basecoat layer 160 can have a dry weight in a range of about 30 g/m² to about 90 g/m², about 40 g/m² to about 80 g/m², or about 50 g/m² to about 70 g/m².

In some embodiments, as shown for example in FIG. 2, layered collagen material 100 can include a top-coat layer 170. Top-coat layer 170 can be disposed over top surface 124 of collagen/polymer matrix layer 120. Top-coat layer 170 can be directly or indirectly attached to collagen/polymer matrix layer 120. In some embodiments, a bottom surface 172 of top-coat layer 170 can be in direct contact with top surface 124 of collagen/polymer matrix layer 120. In embodiments including basecoat layer 160, top-coat layer 170 can be disposed over top surface 164 of basecoat layer 160. In some embodiments, top-coat layer 170 can be disposed on top surface 164 of basecoat layer 160. In some embodiments, a bottom surface 172 of top-coat layer 170 can be in direct contact with top surface 164 of basecoat layer 160.

Top-coat layer 170 includes bottom surface 172, a top surface 174, and a thickness 176 measured between bottom surface 172 and top surface 174. In some embodiments, thickness 176 can be in a range of about 10 microns to about 80 microns, including subranges. For example, thickness 176 can be about 10 microns, about 20 microns, about 30 microns, about 40 microns, about 50 microns, about 60 microns, about 70 microns, or about 80 microns, or within a range having any two of these values as endpoints, inclusive of the endpoints. In some embodiments, thickness 176 can be in a range of about 20 microns to about 70 microns, about 30 microns to about 60 microns, or about 30 microns to about 50 microns.

In embodiments including top-coat layer 170, top-coat layer 170 can provide one or more of the following properties for layered collagen material 100: surface feel, stain resistance, flame resistance, gloss level, or color appearance. In some embodiments, top-coat layer 170 can include one or more polymeric materials. Suitable materials for top-coat layer 170 include but are not limited to, polyurethanes, acrylics, silicone-based feel agents, matte agents, and gloss agents. In some embodiments, layered collagen material 100 can include a plurality of top-coat layers 170. In some embodiments, top-coat layer 170 can be absent from layered collagen material 100. In some embodiments, top-coat layer 170 can be transparent or translucent. In some embodiments, top-coat layer 170 can include one or more dyes, one or more pigments and/or one or more reflective agents to affect appearance.

Top-coat layer 170 can have a dry weight, measured in grams per square meter ($g/m^2$), in a range of about 10 $g/m^2$ to about 80 $g/m^2$, including subranges. For example, top-coat layer 170 can have a dry weight of about 10 $g/m^2$, about 20 $g/m^2$, about 30 $g/m^2$, about 40 $g/m^2$, about 50 $g/m^2$, about 60 $g/m^2$, about 70 $g/m^2$, or about 80 $g/m^2$, or within a range having any two of these values as endpoints, inclusive of the endpoints. In some embodiments, top-coat layer 170 can have a dry weight in a range of about 20 $g/m^2$ to about 70 $g/m^2$, about 30 $g/m^2$ to about 60 $g/m^2$, or about 30 $g/m^2$ to about 50 $g/m^2$.

Together, collagen/polymer matrix layer(s) 120, 130, 140, basecoat layer(s) 160, and/or top-coat layer(s) 170 can define a layered assembly 180 of a layered collagen material 100. Layered assembly 180 can include any number of collagen/polymer matrix layers as described herein. For example, layered assembly can include 2, 3, 4, 5, 6, 7, 8, 9, 10, 11, 12, 13, 14, 15, 16, 17, 18, 19, or 20 collagen/polymer matrix layers. In some embodiments, layered collagen material 100 can include a layered assembly 180 attached to bottom surface 112 of substrate layer 110. Layered assembly 180 attached to bottom surface 112 of substrate layer 110 can include any of the layers and materials as described herein for a layered assembly 180 attached to top surface 114 of substrate layer 110. In some embodiments, layered collagen material 100 can include a layered assembly 180 attached to top surface 114 of substrate layer 110 and a layered assembly 180 attached to bottom surface 112 of substrate layer 110. In such embodiments, layered collagen material 100 includes layered assemblies 180 disposed over opposing surfaces 112 and 114 of substrate layer 110.

In some embodiments, a collagen/polymer matrix layer of layered collagen material 100 is attached to a surface of substrate layer 110 with an adhesive layer 150. In such embodiments, adhesive layer 150 includes a bottom surface 152, a top surface 154, and a thickness 156 measured between bottom surface 152 and top surface 154. In some embodiments, thickness 156 can be in a range of about 10 microns to about 50 microns, including subranges. For example, thickness 156 can be about 10 microns, about 20 microns, about 30 microns, about 40 microns, or about 50 microns, or within a range having any two of these values as endpoints, inclusive of the endpoints. In some embodiments, thickness 156 can be in a range of about 20 microns to about 40 microns. Suitable adhesives for adhesive layer 150 include, but are not limited to, polyurethane adhesives, hot melt adhesives, emulsion polymer adhesives, dry web adhesives, dry laminating adhesives, or wet laminating adhesives. Hauthane HD-2001 available from C. L. Hauthaway & Sons Corporation is an exemplary laminating adhesive suitable for adhesive layer 150. Exemplary polyurethane adhesives include, but are not limited to, L-2183, L-2245, L-2255 from Hauthaway and IMPRANIL® DAH, DAA from Covestro. Exemplary dry web adhesives include, but are not limited to, 9D8D20 from Protechnic. In some embodiments, layered collagen material 100 does not include an adhesive layer 150.

Adhesive layer 150 can have a dry weight, measured in grams per square meter ($g/m^2$), in a range of about 10 $g/m^2$ to about 50 $g/m^2$, including subranges. For example, adhesive layer 150 can have a dry weight of about 10 $g/m^2$, about 20 $g/m^2$, about 30 $g/m^2$, about 40 $g/m^2$, or about 50 $g/m^2$, or within a range having any two of these values as endpoints, inclusive of the endpoints. In some embodiments, adhesive layer 170 can have a dry weight in a range of about 20 $g/m^2$ to about 40 $g/m^2$.

Layered collagen material 100 can be made by attaching one or more collagen/polymer matrix layers, and one or more basecoat and/or top-coat layers described herein, to substrate layer 110. In some embodiments, the layer(s) may be subsequently layered over a surface of a substrate layer. Layer(s) can be attached to either top surface 114 and/or bottom surface 112 of substrate layer 110. In some embodiments, the layer(s) can be layered over a sacrificial layer that is removed after layering and before or after attaching the one or more layers to substrate layer 110. Each collagen/polymer matrix layer of a layered collagen material can be deposited using any suitable coating technique, including, but not limited to, knife over roll coating, gravure coating, slot die coating, multi-layer slot die coating, or curtain coating. Multi-layer slot die coating can allow simultaneous coating of multiple adjacent layers.

In some embodiments, a substrate layer 110 can be coated with an adhesive layer 150 and additional layers (e.g., layers 120, 130, 140, 160, and/or 170) can be formed over adhesive layer 150 in any appropriate order. In such embodiments, the layers can be formed over adhesive layer 150 in the same manner as described below for method 300 with the layers being formed over the adhesive layer 150 rather than a sacrificial layer. In some embodiments, a blended mixture as described herein can be applied directly to a surface of a substrate layer 110, using for example, a coating or pouring process. In such embodiments, the blended mixture can penetrate into at least a portion of substrate layer 110. After application, the blended mixture can be dried to form a collagen/polymer matrix layer (e.g., layer 120). In some embodiments, after drying, the collagen/polymer matrix layer and the substrate layer 110 can be heated (e.g., heat pressed) to aid in attaching the layers together. Before or after drying and/or before or after attaching the collagen/polymer matrix layer and substrate layer 110, other layers (e.g., layers 130, 140, 160, and/or 170) can be applied over the collagen/polymer matrix layer in any appropriate order. In such embodiments, the other layers can be formed over the collagen/polymer matrix layer in the same manner as described below for method 300 with the layers being formed over the collagen/polymer matrix rather than a sacrificial layer.

In some embodiments, decorative layers can be applied between layers of a layered collagen material during manufacturing. For example, a logo, an artistic pattern, a drawing, or a symbol can be applied to a first layer prior to disposing another layer over the first layer. Decorative layers can be applied using, for example, screen printing, digital printing, or transfer printing.

Figure 3:
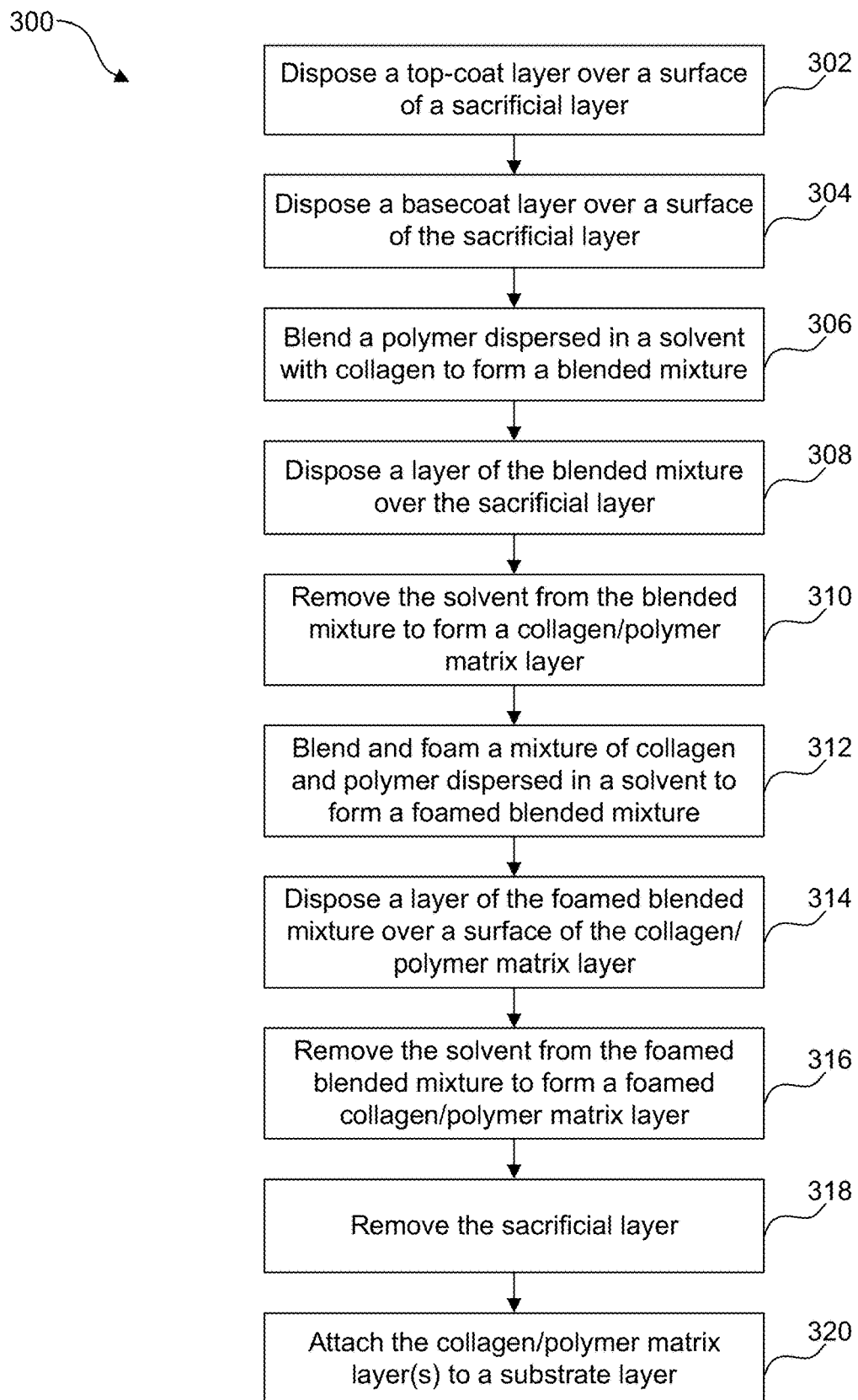
FIG. 3 is a block diagram illustrating a method for making a layered collagen material according to some embodiments.

In some embodiments, the layers of a layered collagen material can be formed over a sacrificial layer and attached to a substrate layer after formation. FIG. 3 illustrates a method 300 for making a layered collagen material 100 according to some embodiments. FIGS. 4A-4F illustrate steps of method 300. Unless stated otherwise, the steps of method 300 need not be performed in the order set forth herein. Additionally, unless specified otherwise, the steps of method 300 need not be performed sequentially. The steps can be performed simultaneously. As one example, method 300 need not include a solvent removal step after the deposition of each individual collagen/polymer matrix layer; rather the solvent from a plurality of collagen/polymer matrix layers can be removed in a single step. Method 300 can be used to attach layers to one or both sides of a substrate layer 110.

Figure 4B:
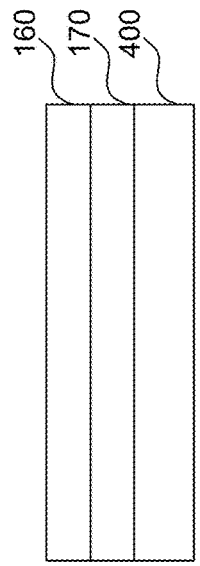
FIGS. 4A-4F illustrate a method of making a layered collagen material according to some embodiments.
Figure 4D:
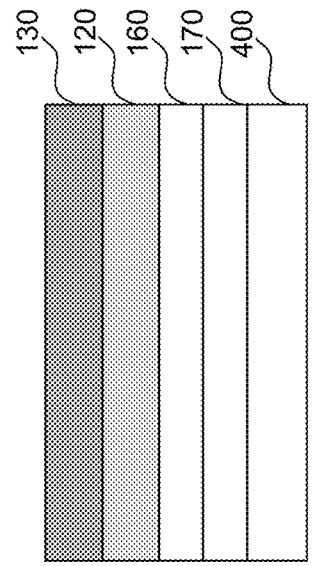
Figure 4F:
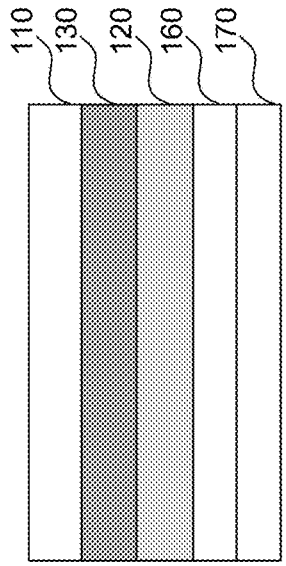
Figure 4A:
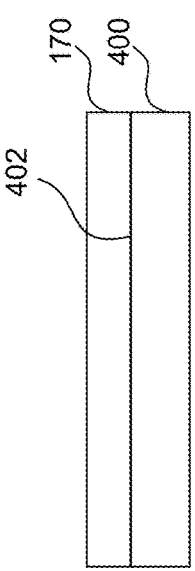

In step 302, a top-coat layer 170 can be disposed over a top surface 402 of a sacrificial layer 400, as illustrated in for example FIG. 4A. Top-coat layer 170 can disposed over sacrificial layer 400 using any suitable coating technique, for example, knife over roll with reverse transfer paper, spraying, or roller coating. Sacrificial layer 400 is a layer of material that does not define a layer of layered collagen material 100. Rather, sacrificial layer 400 is removed during manufacturing of layered collagen material 100. Sacrificial layer 400 can be removed mechanically, such as by peeling away, or chemically, for example, by dissolving sacrificial layer 400. In some embodiments, sacrificial layer 400 can be a release liner. Suitable materials for sacrificial layer include but are not limited to grain texture release papers. Exemplary grain texture release papers include, release papers available from Sappi paper, for example, Matte Freeport 189, Freeport 123, or Expresso 904. In some embodiments, method 300 does not include step 302. That is, step 302 is optional. In some embodiments, top-coat layer 170 can be applied to a layered collagen material 100 after removing sacrificial layer 400 in step 318. In some embodiments, top-coat layer 170 can be applied to a layered collagen material 100 after attaching collagen/polymer matrix layer(s) to a substrate layer 110 in step 320.

In step 304, basecoat layer 160 can be disposed over sacrificial layer 400, as illustrated in for example FIG. 4B. In embodiments including top-coat layer 170, basecoat layer 160 can be disposed over top-coat layer 170. Basecoat layer 160 can disposed over sacrificial layer 400 using any suitable coating technique, for example, knife over roll with reverse transfer paper, spraying, or roller coating. In some embodiments, method 300 does not include step 304. Step 304 is optional. In some embodiments, basecoat layer 160 can be applied to a layered collagen material 100 after removing sacrificial layer 400 in step 318. In some embodiments, basecoat layer 160 can be applied to a layered collagen material 100 after attaching collagen/polymer matrix layer(s) to a substrate layer 110 in step 320.

In step 306, one or more polymers dispersed in a solvent can be blended with collagen to form a blended mixture in the solvent. In some embodiments, the one or more polymers can be dispersed in a solvent before blending with collagen. In some embodiments, the one or more polymers can become dispersed in a solvent during blending with collagen. The collagen and polymer(s) blended in step 306 can be miscible. In such embodiments, the collagen can be dissolved within the polymer(s) during blending. In some embodiments, the polymer(s) disposed in a solvent and the collagen can be blended in a suitable vessel until a homogenous blend is formed. Suitable blending equipment includes, but is not limited to, a blender, a stand mixer, an in-line mixer, or a high shear mixer. Suitable polymers are those discussed herein for collagen/polymer matrix layers.

In some embodiments, collagen can be dispersed in a solvent prior to blending with polymer in step 306. Suitable solvents include, but are not limited to water and ethanol, as discussed elsewhere herein. In some embodiments, the collagen concentration in the solvent can be in a range from about 5 g/L to about 150 g/L, including subranges. For example, the collagen concentration can be about 5 g/L, about 10 g/L, about 20 g/L, about 30 g/L, about 40 g/L, about 50 g/L, about 100 g/L, or about 150 g/L, or within a range having any two of these values as endpoints. In some embodiments, the collagen concentration can be in a range of about 5 g/L to about 100 g/L, about 5 g/L to about 50 g/L, about 5 g/L to about 40 g/L, about 5 g/L to about 30 g/L, about 5 g/L to about 20 g/L, or about 5 g/L to about 10 g/L.

The amount of collagen in a collagen/polymer blend can be in a range of about 5 wt % to about 60%, including subranges. For example, the amount of collagen in a blend can be about 5 wt %, about 10 wt %, about 15 wt %, about 20 wt %, about 25 wt %, about 30 wt %, about 35 wt %, about 40 wt %, about 45 wt %, about 50 wt %, about 55 wt %, or about 60 wt %, or within a range having any two of these values as endpoints. In some embodiments, the amount of collagen in a blend can be about 10 wt % to about 55 wt %, about 15 wt % to about 50 wt %, about 20 wt % to about 45 wt %, about 25 wt % to about 40 wt %, or about 30 wt % to about 35 wt %. In some embodiments, the amount of collagen in the collagen/polymer matrix layer can be in a range of 20 wt % to 40 wt %.

The amount of polymer(s) in a collagen/polymer blend can be in a range of about 10 wt % to about 85 wt %, including subranges. For example, the amount of polymer(s) in blend can be about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, or about 85 wt %, or within a range having any two of these values as endpoints, inclusive of the endpoints. In some embodiments, the amount of the polymer(s) in a blend can be in a range of about 20 wt % to about 75 wt %, about 30 wt % to about 65 wt %, or about 40 wt % to about 55 wt %.

In some embodiments, the blending temperature can be in a range of about room temperature (18° C.) to about 100° C., including subranges. For example, the blend temperature can be about 18° C., about 30° C., about 40° C., about 50° C., about 60° C., about 70° C., about 80° C., about 90° C., or about 100° C., or within a range having any two of these values as endpoints, inclusive of the endpoints. In some embodiments, the blend temperature can be in a range of about 18° C. to about 90° C., about 18° C. to about 80° C., about 18° C. to about 70° C., about 18° C. to about 60° C., about 18° C. to about 50° C., about 18° C. to about 40° C., or about 18° C. to about 30° C.

In some embodiments, the blending time for step 306 can be in a range of about 30 minutes to about 3 hours, including subranges. For example, the blending time can be about 30 minutes, about 1 hour, about 90 minutes, about 2 hours, about 150 minutes, or about 3 hours, or within a range having any two of these values as endpoints, inclusive of the endpoints. In some embodiments, the blending time can be in a range of about 30 minutes to about 150 minutes, about 30 minutes to about 2 hours, about 30 minutes to about 90 minutes, or about 30 minutes to about 1 hour. In some embodiments, the blending speed for step 306 can be in a range from about 150 rpm to about 250 rpm, including subranges. For example, the blending speed can be about 150 rpm, about 175 rpm, about 200 rpm, about 225 rpm, or about 250 rpm. In some embodiments, the blending speed can be in a range of about 150 rpm to about 225 rpm, about 150 rpm to about 200 rpm, or about 150 rpm to about 200 rpm. The blending speed can depend on the size of a blending device (e.g., size of an impeller) and/or the size of the vessel in which the components are blended.

In some embodiments, one or more additives can be added to the blend in step 306. The additive(s) can influence the final properties of a collagen/polymer matrix layer, and therefore the final properties of a layered collagen material 100. For example, the additive(s) added can impact one or more of the following material properties: stiffness, elasticity, cohesive strength, tear strength, fire retardancy, chemical stability, or wet stability. Suitable additives include, but are not limited to, tanning agents, cross-linkers, fillers, dyes, pigments, fatliquors, plasticizers, waxes, rheological modifiers, flame retardants, antimicrobial agents, antifungal agents, mechanical foaming agents, chemical foaming agents, foam stabilizers, and the like. Suitable dyes include, but are not limited to fiber reactive dyes or natural dyes. Suitable tanning agents include, but are not limited to, vegtans, syntans, and alternative tanning chemistries such as isocyanate and epoxy chemistries. Suitable cross-linkers include, but are not limited to, epoxy-based cross-linkers, (for example, poly(ethylene glycol) diglycidyl ether (PEGDE) available from Sigma Aldridge), isocyanate-based cross-linkers (for example, X-TAN® available from Lanxess), and carbodiimide-based cross-linkers. Suitable foaming agents include, HeiQ Chemtex 2216-T (a stabilized blend of nonionic and anionic surfactants), HeiQ Chemtex 2241-A (a modified HEUR (hydrophobically-modified ethylene oxide urethane) thickener), HeiQ Chemtex 2243 (a non-ionic silicone dispersion), or HeiQ Chemtex 2317 (a stabilized blend of nonionic and anionic surfactants) foam stabilizers available from HeiQ Chemtex. Suitable antimicrobial/antifungal agents include Ultra-Fresh DW56, or other antimicrobial/antifungal agents used in the leather industry. Suitable flame retardants include CETAFLAM® DB9 (organophosphorous compounds containing C—PO(OH)$_2$ or C—PO(OR)$_2$ groups with the carbon chain containing polymers), CETAFLAM® PD3300 (organophosphorous compounds containing C—PO(OH)$_2$ or C—PO(OR)$_2$ groups with the carbon chain containing polymers), or other flame retardants used for coated textiles. Suitable fillers include, but are not limited to, thermoplastic microspheres, for example, EXPANCEL® Microspheres. Suitable rheological modifiers include, but are not limited to, alkali swellable rheological modifiers, hydrophobically-modified ethylene oxide-based urethane (HEUR) rheological modifiers, and volume exclusion thickeners. Exemplary alkali swellable rheological modifiers include but are not limited to, ACRYSOL DR-106, ACRYSOL ASE-60 from Dow Chemicals, TEXICRYL® 13-3131, and TEXICRYL® 13-308 from Scott-Bader. Exemplary HEUR modifiers include, but are not limited to, RM-4410 from Stahl and Chemtex 2241-A from HeiQ. Exemplary volume exclusion thickeners include, but are not limited to, WALOCEL' XM 20000 PV from Dow Chemicals and Methyl-Hydroxyethyl Cellulose from Sigma-Aldrich.

In some embodiments, a blend can include a fatliquor content of about 15 wt % or less. For example, a blend can include about 0.1 wt %, about 1 wt %, about 5 wt %, about 10 wt %, or about 15 wt % fatliquor. In some embodiments, a blend can include about 0.1 wt % to about 15 wt %, about 1 wt % to about 10 wt %, about 1 wt % to about 5 wt %, about 0.1 wt % to about 5 wt %, or about 0.1 wt % to about 10 wt % fatliquor. In some embodiments, a blend can be free or substantially free of a fatliquor. In such embodiments, a collagen/polymer matrix layer created from the blend can be free or substantially free of a fatliquor.

In some embodiments, a blend can include one or more coloring agents. In some embodiments, the coloring agent can be a dye, for example a fiber reactive dye, a direct dye, or a natural dye. Exemplary dyes, include but are not limited to, Azo structure acid dyes, metal complex structure acid dyes, anthraquinone structure acid dyes, and azo/diazo direct dyes. In some embodiments, the coloring agent can be pigment, for example a lake pigment. In some embodiments, a blend can include a coloring agent content of about 2 wt % or less. For example, a blend can include about 0.1 wt %, about 0.5 wt %, about 1 wt %, about 1.5 wt %, or about 2 wt % coloring agent. In some embodiments, a blend can include about 0.1 wt % to about 2 wt %, about 0.5 wt % to about 1.5 wt %, or about 0.1 wt % to about 1 wt % coloring agent. In some embodiments, a blend can be free or substantially free of a coloring agent. In such embodiments, a collagen/polymer matrix layer created from the blend can be free or substantially free of a coloring agent.

The term "substantially free" means that a component was not purposefully added to a blend or a layer (e.g., a collagen/polymer matrix layer), but the blend or layer can still comprise the component in trace amounts. A composition that is "substantially free" of a component means that the component is present at an amount less than or equal to 0.1 wt %, for example 0 wt % to 0.1 wt %. A blend or layer that is "free" of a component means that the component is not present in the blend or layer, even in trace amounts.

In step 308, a layer of the blended mixture in the solvent is disposed over top surface 402 of sacrificial layer 400. The blended mixture can be coated over top surface 402 of sacrificial layer 400. In embodiments not including steps 302 and 304, the blended mixture can be coated directly on top surface 402 of sacrificial layer 400. In embodiments including step 304, the blended mixture can be coated directly on a surface of basecoat layer 160. In embodiments including step 302 but not step 304, the blended mixture can be coated directly on a surface of top-coat layer 170. In some embodiments, the blended mixture can be formed into a sheet by coating it on a surface to a desired thickness. Coating can include pouring, extruding, casting, and the like. In some embodiments, the sheet can be spread to a desired thickness using, for example, a blade, a knife, a roller, a knife over roll, curtain coating, and slot die coating.

In some embodiments, the temperature of the blended mixture during coating can be about 40° C. or higher. For example, the temperature of the blended mixture can be in a range of about 40° C. to about 100° C., including subranges. For example, the temperature can be about 40° C., about 50° C., about 60° C., about 70° C., about 80° C., about 90° C., or about 100° C., or within a range having any two of these values as endpoints, inclusive of the endpoints. In some embodiments, the temperature of the blended mixture during coating can be in a range of about 40° C. to about 90° C., about 40° C. to about 80° C., about 40° C. to about 70° C., about 40° C. to about 60° C., or about 40° C. to about 50° C. Coating at a temperature below about 40° C. can result in the blended mixture being too viscous and can make it difficult to form a layer of uniform thickness.

Figure 4C:
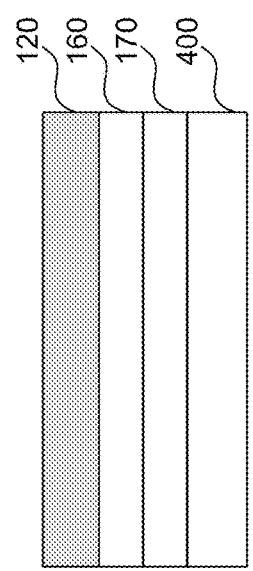

In step 310, solvent can be removed from the coated blended mixture to form collagen/polymer matrix layer 120, as illustrated in for example, FIG. 4C. Suitable solvent removal methods include, but are not limited to tunnel drying, vacuum drying, oven drying with hot air, humidity chamber drying, flotation drying with hot air, and ovens with a combination of medium range IR (infrared) for preheating and then hot air for subsequent drying.

Suitable solvent removal temperatures for step 310 can be in a range from about room temperature (18° C.) to about 100° C., including subranges. For example, solvent may be removed at a temperature of about 23° C., about 35° C., about 50° C., about 60° C., about 70° C., about 80° C., about 90° C., or about 100° C., or within a range having any two of these values as endpoints, inclusive of the endpoints. In some embodiments, solvent may be removed at a temperature in a range of about 23° C. to about 35° C., about 23° C. to about 50° C., about 23° C. to about 60° C., about 23° C. to about 70° C., about 23° C. to about 80° C., about 23° C. to about 90° C., or about 23° C. to about 100° C. Suitable humidity values for solvent removal in step 310 include a humidity in a range from 0% RH (relative humidity) to about 65% RH, including subranges. For example, the humidity can be about 10% RH, about 20% RH, about 40% RH, about 50% RH, or about 65% RH, or within a range having any two of these values as endpoints, inclusive of the endpoints. In some embodiments, the humidity can be 0% RH to about 50% RH, 0% RH to about 40% RH, 0% RH to about 20% RH, or 0% RH to about 10% RH. The solvent removal temperature and/or humidity can affect the final properties of a collagen/polymer matrix layer, and therefore a layered collagen material. The solvent removal temperature and/or humidity in step 310 can impact one or more of the following material properties: stiffness, elasticity, cohesive strength, tear strength, fire retardancy, chemical stability, and wet stability. For example, relatively high humidity and relatively low temperature can result in a material that is softer and more elastic. Conversely, relatively low humidity and relatively high temperature can result in a material that is harder and less elastic.

In some embodiments, steps 306-310 can be repeated a plurality of times to form a plurality of collagen/polymer matrix layers 120 over sacrificial layer 400. In some embodiments, steps 306-310 can be repeated sequentially to form a plurality of collagen/polymer matrix layers 120 over sacrificial layer 400. In some embodiments, steps 306-310 can be repeated after steps 312-316 to form one or more collagen/polymer matrix layers 120 over one or more foamed collagen/polymer matrix layers 130/140. In some embodiments, method 300 may not include steps 306-310.

In step 312, one or more polymers dispersed in a solvent can be blended with collagen and foamed to form a foamed blended mixture in the solvent. In some embodiments, the one or more polymers can be dispersed in a solvent before blending with collagen and foaming. In some embodiments, the one or more polymers can become dispersed in a solvent during blending with collagen and foaming. The collagen and polymer(s) blended and foamed in step 308 can be miscible. In such embodiments, the collagen can be dissolved within the polymers during blending and foaming. In some embodiments, the polymer(s) disposed in a solvent and the collagen can be blended in a suitable vessel until a homogenous blend is formed. Suitable blending equipment includes, but is not limited to, a blender, a stand mixer, an in-line mixer, or a high shear mixer. The blend may be foamed using, for example, a mechanical foaming process or a chemical foaming process. Exemplary mechanical foaming equipment includes a Hansa Mixer or a GEMATA® foamer. Blending and foaming can be performed separately or concurrently.

Suitable polymers for blending and foaming in step 312 are those discussed herein for collagen/polymer matrix layers. In some embodiments, one or more foaming agents and/or foam stabilizers may be added to the blend in step 312. Suitable foaming agents and foam stabilizers include those discussed herein for collagen/polymer matrix layers 130/140.

In some embodiments, a blend can include a foaming agent or a foam stabilizer content of about 10 wt % or less. For example, a blend can include about 0.1 wt %, about 1 wt %, about 2.5 wt %, about 5 wt %, about 7.5 wt %, or about 10 wt % foaming agent or foam stabilizer. In some embodiments, a blend can include about 0.1 wt % to about 10 wt %, about 1 wt % to about 7.5 wt %, about 2.5 wt % to about 5 wt %, about 0.1 wt % to about 5 wt %, or about 0.1 wt % to about 2.5 wt % foaming agent or foam stabilizer. In some embodiments, a blend can be substantially free or free of a foaming agent and/or a foam stabilizer. In such embodiments, a collagen/polymer matrix layer created from the blend can be substantially free or free of a foaming agent and/or a foam stabilizer.

Foaming in step 312 can be used to impart a desired density for a foamed collagen/polymer matrix layer. In some embodiments, a foamed blended mixture can have a liquid density, before solvent is removed in step 316, in a range of about 300 g/L to about 900 g/L, including subranges. For example, a foamed blended mixture formed in step 312 can have a liquid density of about 300 g/L, about 400 g/L, about 500 g/L, about 600 g/L, about 700 g/L, about 800 g/L, or about 900 g/L, or within a range having any two of these values as endpoints. In some embodiments, the foamed blended mixture can have a liquid density in a range of about 300 g/L to about 800 g/L, about 300 g/L to about 700 g/L, about 400 g/L to about 600 g/L, about 300 g/L to about 500 g/L, or about 300 g/L to about 600 g/L. In some embodiments, a blended mixture formed in step 306 can have a liquid density, before the solvent is removed from the blended mixture in step 310, that is greater than the liquid density of the foamed blended mixture formed in step 312 before solvent is removed in step 316.

In some embodiments, collagen can be dispersed in a solvent prior to blending with polymer and foaming in step 312. Suitable solvents include, but are not limited to water and ethanol. The collagen concentration in the solvent can be any value or range discussed above for step 306. The amount of collagen in a collagen/polymer blend for step 312 can be any value or range discussed above for step 306. The blending temperature for step 312 can be any temperature or temperature range discussed above for step 306. The blending time for step 312 can be any time or time range discussed above for step 306. The blending speed for step 312 can be any speed or speed range discussed above for step 306. In some embodiments, one or more additives can be added to the blend in step 312. The additive(s) added in step 312 can be any of the additives discussed above for step 306.

In step 314, a layer of the foamed blended mixture in the solvent is disposed over sacrificial layer 400. In some embodiments, a layer of the foamed blended mixture in the solvent is disposed over a surface of a collagen polymer matrix layer 120. In some embodiments, the blended and foamed mixture can be coated directly on a surface of a collagen polymer matrix layer 120. In some embodiments, the foamed blended mixture can be formed into a sheet by coating it on a surface to a desired thickness. Coating can include pouring, extruding, casting, and the like. In some embodiments, the sheet can be spread to a desired thickness using, for example, a blade, a knife, a roller, a knife over roll, curtain coating, and slot die coating.

In step 316, solvent can be removed from the coated, foamed blended mixture to form a foamed collagen/polymer matrix layer 130, as illustrated in for example, FIG. 4D. Suitable solvent removal methods include, but are not limited to tunnel drying, vacuum drying, oven drying with hot air, humidity chamber drying, flotation drying with hot air, and ovens with a combination of medium range IR for preheating and then hot air for subsequent drying. Suitable solvent removal temperatures for step 316 can any of the temperature or temperature ranges discussed above for step 310. Humidity values for step 316 can be any of the humidity values or humidity ranges discussed above for step 310

In some embodiments, steps 312-316 can be repeated a plurality of times to form a plurality of foamed collagen/polymer matrix layers over sacrificial layer 400, for example, foamed collagen/polymer matrix layers 130 and 140. In such embodiments, the foamed blended mixtures formed in separate steps 312 can have different liquid densities. For example, the liquid density for one foamed blended mixture can be 10 g/L to 300 g/L more or less than the liquid density for another foamed blended mixture. For example, in some embodiments, a first blended mixture can have a liquid density in a range of about 300 g/L to about 500 g/L and a second blended mixture can have a liquid density in a range of about 600 g/L to about 700 g/L. As another example, a first blended mixture can have a liquid density in a range of about 300 g/L to about 400 g/L and a second blended mixture can have a liquid density in a range of about 500 g/L to about 700 g/L.

In some embodiments, steps 312-316 can be repeated sequentially to form a plurality of foamed collagen/polymer matrix layers over sacrificial layer 400. In some embodiments, a foamed and blended mixture formed in step 312 can be used to form multiple foamed collagen/polymer matrix layers in steps 314-316. In some embodiments, steps 312-316 may be performed prior to performing a set of steps 306-310 to form one or more foamed collagen/polymer matrix layers between a collagen/polymer matrix layer 120 and sacrificial layer 400. In some embodiments, method 300 may not include steps 312-316.

Figure 4E:
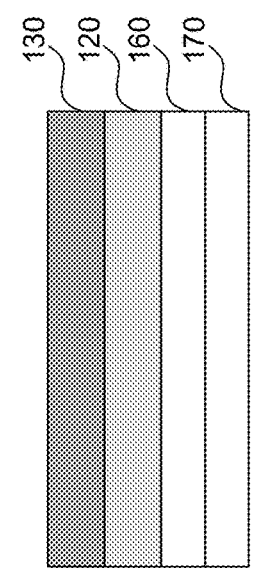

In step 318, sacrificial layer 400 is removed from the layer(s) formed in steps 302-316, as illustrated in for example FIG. 4E. Sacrificial layer 400 can be removed by a mechanical process or a chemical process. For example, sacrificial layer 400 can be removed by peeling sacrificial layer 400 away from the other layers. As another example, sacrificial layer 400 can be removed by dissolving sacrificial layer 400. In some embodiments, sacrificial layer 400 can be removed in step 318 before attaching the layer(s) formed in steps 302-316 to a substrate layer 110 in step 320. In some embodiments, sacrificial layer 400 can be removed after step 320.

In step 320, the layer(s) formed in steps 302-316 are attached to a substrate layer 110, as illustrated in for example FIG. 4F. In step 320, collagen polymer matrix layer 120, and any other collagen/polymer matrix layers formed in steps 306-316 are attached to substrate layer 110. In some embodiments, attaching one or more collagen/polymer matrix layers (e.g., collagen/polymer matrix layer 120) to substrate layer 110 in step 320 includes a heat pressing process. In such embodiments, collagen/polymer matrix layer (e.g., collagen/polymer matrix layer 120) can be in direct contact with substrate layer. Also, in such embodiments, a collagen/polymer matrix layer can partially melt into substrate layer 110, and upon cooling the two layers are firmly attached. In some embodiments, attaching one or more collagen/polymer matrix layers (e.g., collagen/polymer matrix layer 120) to substrate layer 110 in step 320 includes a lamination process. In such embodiments, lamination can be accomplished with an adhesive layer 150. In such embodiments, substrate layer 110 and/or a collagen/polymer matrix layer can be coated with an adhesive by known techniques such as slot die casting, kiss coating, a drawdown technique, or reverse transfer coating. In some embodiments, the lamination process can include passing substrate layer 110 and the other layer(s) through rollers under heat.

In some embodiments, step 320 can be omitted from method 300. In such embodiments, the layer(s) formed in steps 302-316 define a collagen/polymer matrix layer or a layered collagen material without a substrate layer 110.

In some embodiments, layered collagen materials described herein can have a tear strength that is at least about 1% greater than that of a natural leather of the same thickness. For example, the layered collagen material can have a tear strength that is about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 100%, about 150%, or about 200% greater than that of natural leather of the same thickness. In some embodiments, the layered collagen material can have a tear strength in the range of about 20 N to about 300 N, including subranges. For example, the tear strength of the layered collagen material can be about 20 N, about 30 N, about 40 N, about 50 N, about 60 N, about 70 N, about 80 N, about 90 N, about 100 N, about 125 N, about 150 N, about 175 N, about 200 N, about 225 N, about 250 N, about 275 N, or about 300 N, or within a range having any two of these values as endpoints, inclusive of the endpoints. In some embodiments, the tear strength can be in a range of about 30 N to about 275 N, about 40 N to about 250 N, about 50 N to about 225 N, about 60 N to about 200 N, or about 75 N to about 175 N, about 80 N to about 150 N, about 90 N to about 125 N, or about 100 N to about 125 N.

In some embodiments, a collagen/polymer matrix layer described herein can have a tear strength in the range of about 2 N to about 30 N, including subranges. For example, the tear strength of the collagen/polymer matrix layer can be about 2 N, about 4 N, about 5 N, about 10 N, about 15 N, about 20 N, about 25 N, or about 30 N, or within a range having any two of these values as endpoints, inclusive of the endpoints. In some embodiments, the tear strength can be in a range of about 4 N to about 25 N, about 5 N to about 20 N, or about 10 N to about 15 N.

Tear strength, or tear resistance, is a measure of how well a material can withstand the effects of tearing. Tear resistance can be measured by a variety of methods, for example the method provided by ASTM D 412 or the method provided by ISO 3377 (also called the "Bauman tear"). The method provided by ASTM D 624 can also be used to measure the resistance to the formation of a tear and the resistance to the expansion of a tear. Regardless of the method used, first, a cut is made in the material sample tested to induce a tear. Then, the sample is held between two grips and a uniform pulling force is applied until sample tears in two. Tear resistance is then calculated by dividing the force applied by the thickness of the material. Unless specified otherwise, a tear strength value reported herein is measured by ISO 3377.

Tensile strength, or ultimate tensile strength (UTS), is the capacity of a material to withstand loads in tension without failing. Unless specified otherwise, a tensile strength value disclosed herein is measured according the method provided by ASTM D 412. In some embodiments, the layered collagen materials described herein can have a tensile strength in the range of about 1 kPa (kilopascal) to about 100 MPa (megapascals), including subranges. For example, the layered collagen material can have a tensile strength of about 1 kPa, about 50 kPa, about 100 kPa, about 200 kPa, about 300 kPa, about 400 kPa, about 500 kPa, about 600 kPa, about 700 kPa, about 800 kPa, about 900 kPa, about 1 MPa, about 5 MPa, about 10 MPa, about 20 MPa, about 30 MPa, about 40 MPa, about 50 MPa, about 60 MPa, about 70 MPa, about 80 MPa, about 90 MPa, or about 100 MPa, or within a range having any two of these values as endpoints, inclusive of the endpoints. In some embodiments, the tensile strength can be in a range of about 50 kPa to about 90 MPa, about 100 kPa to about 80 MPa, about 200 kPa to about 70 MPa, about 300 kPa to about 60 MPa, about 400 kPa to about 50 MPa, about 500 kPa to about 40 MPa, about 600 kPa to about 30 MPa, about 700 kPa to about 20 MPa, about 800 kPa to about 10 MPa, or about 1 MPa to about 5 MPa.

Softness, also referred to as "hand feel" of a material can be determined by ISO 17235. In some embodiments, an exterior surface of a layered collagen material described herein can have a softness in a range of about 2 mm to about 12 mm, including subranges. For example, an exterior surface of a layered collagen material can have a softness of about 2 mm, about 3 mm, about 4 mm, about 5 mm, about 6 mm, about 7 mm, about 8 mm, about 9 mm, about 10 mm, about 11 mm, or about 12 mm, or within a range having any two of these values as endpoints, inclusive of the endpoints. In some embodiments, the softness can be about 3 mm to about 11 mm, about 4 mm to about 10 mm, about 5 mm to about 9 mm, about 5 mm to about 8 mm, or about 6 mm to about 7 mm. Unless specified otherwise, a softness value disclosed herein is determined by ISO 17235.

Flexibility, or strain, of a material can be determined by measuring its elongation at failure when a tensile force is applied, for example using the equation: $\Delta L/L$, where $\Delta L$ is the change in length of the material after the tensile force is applied, and L is the original length of the material. Flexibility can also be measured according to the method provided by ASTM D 412. In some embodiments, the layered collagen materials described herein can have a flexibility in the range of about 100% to about 400%, including subranges. For example, the layered collagen materials can have a flexibility of about 100%, about 200%, about 300%, or about 400%, or within a range having any two of these values as endpoints, inclusive of the endpoints. In some embodiments, the flexibility can be about 100% to about 200%, about 100% to about 300%, about 200% to about 300%, or about 200% to about 400%. Unless specified otherwise, a flexibility value disclosed herein is measured by ASTM D 412. In some embodiments, a collagen/polymer matrix layer described herein can have flexibility value or range as described above for a layered collagen material.

In some embodiments, a layered collagen material as described herein can have a permanent set in a hysteresis experiment of about 8% or less. In some embodiments, a layered collagen material can have a permanent set of about 1%, about 2%, about 3%, about 4%, about 5%, or about 6%, about 7%, or about 8%, or within a range having any two of these values as endpoints. In some embodiments, a layered collagen material can have a permanent set of about 1% to about 8%, about 2% to about 7%, about 3% to about 6%, or about 4% to about 5%.

Unless specified otherwise, a permanent set value is measured by the following method. A dog-bone-shaped sample of a material is cut and the original length of the sample is measured. The samples are cut to have a dog-bone shape with about 110 mm length and 10 mm width (75-100 mm gauge length). Then, the sample is stretched along its length using an INSTRON® machine to 15% strain and returned to 0% strain, both at a constant rate of three millimeters per second. This is repeated five times. Then, the distance between the original sample length and the length of the sample at which the load goes to zero on the last return cycle is measured. The percent difference between the length measured after repeatedly straining the material and the original length is the permanent set %. For purposes of calculating a permanent set value, three separate samples of a material are evaluated, and the average permanent set value is reported as the permanent set value for the material.

In some embodiments, layered collagen materials described herein can have a moisture vapor transmission rate (MVTR) of about 75 $g/m^2/hr$ or more. In some embodiments, layered collagen materials described herein can have a MVTR in a range of about 75 $g/m^2/hr$ to about 200 $g/m^2/hr$, including subranges. For example, the layered collagen material can have a MVTR of about 80 $g/m^2/hr$ to about 190 $g/m^2/hr$, about 90 $g/m^2/hr$ to about 180 $g/m^2/hr$, about 100 $g/m^2/hr$ to about 170 $g/m^2/hr$, about 110 $g/m^2/hr$ to about 160 $g/m^2/hr$, about 120 $g/m^2/hr$ to about 150 $g/m^2/hr$, or about 130 $g/m^2/hr$ to about 140 $g/m^2/hr$. Unless specified otherwise, a MVTR value disclosed herein is measured using ASTM E96 ("Standard Test Methods for Water Vapor Transmission of Materials")—Procedure B, Water Method, at about 74.3° F., at about 50% relative humidity, and with a ¾ inch air gap.

Layered collagen materials having a moisture vapor transmission rate as reported herein can be suitable for use in a variety of applications where breathability of the material is a desirable property. Exemplary applications where breathability can be desirable include, but are not limited to, footwear, apparel, and upholstery. Layered collagen materials as described herein can have a significantly higher water vapor transmission rate compared to a layered polymeric material having the same number of layers with the same thicknesses and made of the same polymeric material(s), but without collagen blended in the polymeric material(s).

In some embodiments, layered collagen materials described herein can have a color fastness of class 4 or higher when measured according to ISO 11640 ("Leather—Tests for color fastness—fastness to cycles of to-and-fro rubbing") wet-rub fastness test. In some embodiments, layered collagen materials described herein can have a color fastness of class 4, class 4.5, or class 5 when measured according to ISO 11640's wet-rub fastness test. A color fastness of class 4 or higher can provide layered collagen materials described herein with desirable wear resistance for a variety of applications.

Layered collagen materials described herein can achieve a color fastness of class 4 or higher without the inclusion of a pigment in the materials. This is a unique characteristic compared to a layered polymeric material made of the same polymeric material(s) without collagen blended in the polymeric material(s). Collagen within layered collagen materials described herein can adhere well to a dye used to color the material. To achieve a high color fastness, polymeric materials are usually colored using a pigment because dyes do not generally adhere to a polymeric material well. Poor adherence between a dye and a polymeric material leads to a relatively low color fastness. Dyed layered collagen materials described herein can have improved depth of color and other aesthetic features not achievable with a polymeric material colored using a pigment.

In some embodiments, a layered collagen material described herein, or an individual layer of a layered collagen material described herein, can be subjected to the same, or similar finishing treatments as those used to treat natural leather. The treatment process for natural leather typically has three steps: preparation of the hide, tanning, and retanning. The treatment process for embodiments discussed herein would include preparation of a collagen/polymer matrix layer and/or a layered collagen material rather than a hide. Tanning can be performed in any number of well-understood ways, including by contacting layered collagen materials with a vegetable tanning agent, blocked isocyanate compounds, chromium compound, aldehyde, syntan, natural resin, tanning natural oil, or modified oil. Blocked isocyanate compounds can include X-tan. Vegetable tannins can include pyrogallol- or pyrocatechin-based tannins, such as valonea, mimosa, ten, tara, oak, pinewood, sumach, quebracho, and chestnut tannins. Chromium tanning agents can include chromium salts such as chromium sulfate. Aldehyde tanning agents can include glutaraldehyde and oxazolidine compounds. Syntans can include aromatic polymers, polyacrylates, polymethacrylates, copolymers of maleic anhydride and styrene, condensation products of formaldehyde with melamine or dicyandiamide, lignins, and natural flours. In some embodiments, a layered collagen material described herein can be tumbled or staked to tailor properties of the material, such as the feel of the material. In such embodiments, traditional textile tumbling and staking methods can be used.

In some embodiments, after tanning, a layered collagen material, or an individual layer of a layered collagen material, can be retanned. Retanning refers to post-tanning treatments. Such treatments can include tanning a second time, wetting, sammying, dehydrating, neutralization, adding a coloring agent such as a dye, fat liquoring, fixation of unbound chemicals, setting, conditioning, softening, and/or buffing.

In some embodiments, a layered collagen material, or an individual layer of a layered collagen material, can have a rough exterior surface. For example, top surface 124 of collagen/polymer matrix layer 120 can have a rough surface, top surface 174 of top-coat layer 170 can have a rough surface, top surface 164 of basecoat layer 160 can have a rough surface, top surface 134 of collagen/polymer matrix layer 130 can have a rough surface, or top surface 144 of collagen/polymer matrix layer 140 can have a rough surface. A rough exterior surface can create a surface texture similar in appearance and feel to the that of a natural leather (e.g., the grain of pebbled natural leather). In some embodiments, top surface 402 of sacrificial layer 400 can have a rough surface which is transferred onto the surface of a layer disposed directly on top surface 402 during method 300.

A rough surface has a surface area per square inch of at least about 1% greater than 1 $in^2$. In other words, in some embodiments, a one square inch sample of layered collagen material 100, including a layer having rough exterior surface, can have a surface area that is at least about 1% greater than a one square inch sample of a material having a perfectly smooth surface. In some embodiments, a rough exterior surface can have a surface area per square inch of at least about 1% greater than 1 $in^2$, about 10% greater than 1 $in^2$, about 20% greater than 1 $in^2$, about 30% greater than 1 $in^2$, about 40% greater than 1 $in^2$, about 50% greater than 1 $in^2$, about 60% greater than 1 $in^2$, about 70% greater than 1 $in^2$, about 80% greater than 1 $in^2$, about 90% greater than 1 $in^2$, about 100% greater than 1 $in^2$, about 150% greater than 1 $in^2$, about 200% greater than 1 $in^2$, about 250% greater than 1 $in^2$, about 300% greater than 1 $in^2$, about 350% greater than 1 $in^2$, about 400% greater than 1 $in^2$, about 450% greater than 1 $in^2$, or about 500% greater than 1 $in^2$, or within a range having any two of these values as endpoints, inclusive of the endpoints. In some embodiments, a rough surface can have a surface area per square inch of about 1% greater than 1 $in^2$ to about 500% greater than 1 $in^2$, about 10% greater than 1 $in^2$ to about 450% greater than 1 $in^2$, about 20% greater than 1 $in^2$ to about 400% greater than 1 $in^2$, about 30% greater than 1 $in^2$ to about 350% greater than 1 $in^2$, about 40% greater than 1 $in^2$ to about 300% greater than 1 $in^2$, about 50% greater than 1 $in^2$ to about 250% greater than 1 $in^2$, about 60% greater than 1 $in^2$ to about 200% greater than 1 $in^2$, about 70% greater than 1 $in^2$ to about 150% greater than 1 $in^2$, or about 80% greater than 1 $in^2$ to about 100% greater than 1 $in^2$. Unless specified otherwise, a surface area of material disclosed herein is measured using profilometry. For non-transparent materials, optical profilometry is used. In some embodiments, a layered collagen material, or an individual layer of a layered collagen material, can have a smooth exterior surface. A smooth surface has a surface area per square inch of less than 1% greater than 1 $in^2$. For example, a smooth surface can have a surface area per square inch of 1 $in^2$ to less than 1.01 $in^2$. In some embodiments, top surface 402 of sacrificial layer 400 can have a smooth surface which is transferred onto the surface of a layer disposed directly on top surface 402 during method 300.

In some embodiments, a layered collagen material, or an individual layer of a layered collagen material, can have a textured exterior surface. In some embodiments, top surface 402 of sacrificial layer 400 can have a textured surface which is transferred onto the surface of a layer disposed directly on top surface 402 during method 300. In some embodiments, a textured exterior surface can a surface area per square inch, or surface area per square inch range, as discussed above for a rough surface.

In some embodiments, the texture can be a macro-scale texture, for example, any of the many textures used on Sappi/Warren Release Papers that are commercially available under the trademark ULTRACAST® or tradename Classic, manufactured by S.D. Warren Company d/b/a Sappi North America. An example of a macro-scale texture is a replicate of a natural leather grain with feature depths of about 50 to about 300 microns. Any other desired macro-scale texture may also be used. In some embodiments, a macro-scale texture can be a "leather grain texture." As used herein, the term "leather grain texture" is a texture that mimics the look and feel of natural leather. Exemplary "leather grain textures" include but are not limited to, Sappi Matte Freeport 189, Sappi Freeport 123, or Sappi Expresso 904.

In some embodiments, the texture can be a micro-scale texture. In some embodiments, the texture can be a micro-scale texture with surface features having a feature size of less than 50 microns, for example 1000 nanometers to less than 50 microns. An example of a micro-scale texture is referred to in the art as "Sharklet." Sharklet textures can be applied to provide the products with a surface that is structured to impede bacterial growth. The micro-scale texture of the surface replicates sharkskin denticles, which are arranged in a diamond pattern with millions of tiny ribs. Sharklet materials are discussed, for example, in U.S. Pat. Nos. 7,650,848 and 8,997,672, the disclosures of which are incorporated herein by reference.

In some embodiments, the texture can be a nanoscale texture with surface features having a feature size of less than 1000 nanometers, for example 10 nanometers to less than 1000 nanometers. One example of a nanoscale texture is a diffraction grating that has a series of raised ridges about 400 nanometers wide, spaced approximately 800 nanometers apart, with a depth of approximately 100 nanometers.

The embodiments discussed herein will be further clarified in the following examples. It should be understood that these examples are not limiting to the embodiments described above.

Example 1

Type I bovine collagen (10 g) was dissolved in 1 L of distilled water (pH 4.5) and stirred at 50° C. for 3 hours to generate a collagen solution. The pH of the collagen solution was adjusted to 7 by adding 1 part 10x phosphate buffered saline to 19 parts collagen solution by weight and the solution was stirred for 15 minutes. The pH of the solution was confirmed using a pH meter and 1 N NaOH was used to adjust the pH to exactly 7. Colored pigments (5 parts per hundred of collagen by weight) were added to the solution and mixed for 45 minutes. The temperature of the solution was cooled down to 35° C. Stahl's F-90 Cross-linker (10 parts per hundred of collagen by weight) was added to the collagen solution and the pH was increased to 8.5 with 1 N NaOH to initiate a crosslinking reaction. The solution was stirred for an hour to extend the crosslinking reaction. As the pH of the solution turned slightly acidic during the cross-linking reaction, the solution was then brought back to neutral pH by using 1 N NaOH. A flexible polyester polyurethane polymer aqueous dispersion (200 parts per hundred of collagen by weight) was mixed with the collagen solution for 10 minutes to generate a blended solution. The flexible polyester polyurethane polymer aqueous dispersion was SANCURE® 20025F from Lubrizol. The blended solution was then placed into a silicone mold and dried at 65° C. overnight for further crosslinking and structure formation to generate a collagen/polymer matrix layer. The collagen/polymer matrix layer was peeled off the silicon mold the next morning. The collagen/polymer matrix layer was then laminated onto a fabric layer using a polyurethane adhesive (RU-43-989) with an isocyanate cross-linker (XR-13-820) designed to interact well with the collagen/polymer matrix layer and the fabric to generate a layered collagen material. For lamination, the adhesive was dried at 65° C. overnight.

Example 2

Type I bovine collagen (5 g) was dissolved in 1 L of distilled water (pH 4.5) and stirred at 50° C. for 3 hours to generate a collagen solution. The pH of the collagen solution was adjusted to 7 using 1 N NaOH. Colored pigments (5 parts per hundred of collagen by weight) were added to the collagen solution and mixed for 45 minutes. After the pigment addition, the collagen solution was cooled down to 35° C. Stahl's F-90 Cross-linker (10 parts per hundred of collagen by weight) was added to the collagen solution and the pH was increased to 8.5 with 1 N NaOH to initiate a crosslinking reaction. The solution was stirred for an hour to extend the crosslinking reaction. As the pH of the solution turned slightly acidic during the cross-linking reaction, the solution was then brought back to neutral pH by using 1 N NaOH. A flexible polyester polyurethane polymer aqueous dispersion (140 parts per hundred of collagen by weight) was mixed with the collagen solution for 10 minutes to generate a blended solution. The flexible polyester polyurethane polymer aqueous dispersion was SANCURE® 20025F from Lubrizol. The blended solution was then placed into a silicone mold and dried at 65° C. overnight for further crosslinking and structure formation to generate a collagen/polymer matrix layer. The collagen/polymer matrix layer was peeled off the silicon mold the next morning. The collagen/polymer matrix layer was then laminated onto a fabric layer using a polyurethane adhesive (RU-43-989) with an isocyanate cross-linker (XR-13-820) designed to interact well with the collagen/polymer matrix layer and the fabric to generate a layered collagen material. For lamination, the adhesive was dried at 65° C. overnight.

Example 3

Type I bovine collagen (50 g) was dissolved in 1 L of distilled water (pH 4.5) and stirred at 50° C. for 3 hours to generate a collagen solution. The pH of the collagen solution was adjusted to 7 using 1 N NaOH. Colored pigments (5 parts per hundred of collagen by weight) were added to the collagen solution and mixed for 45 minutes. After the pigment addition, the collagen solution was cooled down to 35° C. Stahl's F-90 Cross-linker (10 parts per hundred of collagen by weight) was added to the collagen solution and the pH was increased to 8.5 with 1 N NaOH to initiate a crosslinking reaction. The solution was stirred for an hour to extend the crosslinking reaction. As the pH of the solution turned slightly acidic during the cross-linking reaction, the solution was then brought back to neutral pH by using 1 N NaOH. A flexible polyester polyurethane polymer aqueous dispersion (140 parts per hundred of collagen by weight) was stirred with the collagen solution to generate a blended solution. The flexible polyester polyurethane polymer aqueous dispersion was SANCURE® 20025F from Lubrizol. The blended solution was continuously stirred till it cooled down to room temperature. As the blended solution cooled down, the viscosity started to raise. Once the blended solution reached room temperature, the stirring was stopped for 10 minutes until the solution reached a viscosity of about 5000 centipoises. The blended solution was then applied to a Teflon coated surface of a drawdown device to generate a continuous casted sheet material. The sheet material was dried at 65° C. overnight to form a collagen/polymer matrix layer. The sheet of collagen/polymer matrix layer was then peeled from the Teflon coated surface. The collagen/polymer matrix layer was then laminated onto a fabric layer using a polyurethane adhesive (RU-43-989) with an isocyanate cross-linker (XR-13-820) designed to interact well with the collagen/polymer matrix layer and the fabric to generate a layered collagen material. For lamination, the adhesive was dried at 65° C. overnight.

Example 4

Type I bovine collagen (50 g) was dissolved in 1 L of water (pH 4.5) and stirred at 50° C. for 3 hours to generate a collagen solution. The pH of the collagen solution was adjusted to 7 using 1 N NaOH. CAMOTEX® PP-39-132 aqueous pigment dispersion from Stahl (5 parts per hundred of collagen by weight) was added to the collagen solution and mixed for 45 minutes. After the pigment addition, the collagen solution was cool down to 35° C. Stahl's F-90 Cross-linker (10 parts per hundred of collagen by weight) was added to the collagen solution and the pH was increased to 8.5 with 1 N NaOH to initiate a crosslinking reaction. The solution was stirred for an hour to extend the crosslinking reaction. As the pH of the solution turned slightly acidic during the crosslinking reaction, the solution was then brought back to neutral pH by using 1 N NaOH. A flexible polyester polyurethane polymer aqueous dispersion (140 parts per hundred of collagen by weight) was stirred with the collagen solution to generate a blended solution. The flexible polyester polyurethane polymer aqueous dispersion was Hauthane HD-2001 from Hauthaway. The blended solution was continuously stirred until it cooled down to room temperature. As the mixed solution cooled down, the viscosity started to raise. Once the mixed solution reached room temperature, the stirring was stopped for 10 minutes until the solution reached a viscosity of about 5000 centipoises.

Then, a 5 inch×5 inch piece of woven fabric was surface treated with a plasma treatment. The plasma treatment removed foreign contaminants from the fabric surface and increased wettability of the fibers in the fabric, which allows for better absorption of solutions and bonding with the fabric. After the plasma treatment, the fabric was placed on a surface of a drawdown device, a layer of the blended solution was disposed onto the treated fabric, and the fabric and solution were dried overnight at 65° C. to generate a layered collagen material. This material was not laminated onto a fabric layer using a polyurethane adhesive with an isocyanate cross-linker designed to interact well with the collagen/polymer matrix layer and the fabric to generate a layered collagen material as in Examples 1-3. Therefore, it can be a more flexible material compared to Examples 1-3.

Example 5

Type I bovine collagen (150 g) was dissolved in 850 mL of water (pH 4.5) and stirred at 50° C. for 3 hours to generate a collagen solution. The pH of the collagen solution was adjusted to 7 using 1 N NaOH. CAMOTEX® PP-39-132 aqueous pigment dispersion from Stahl (3 parts per hundred of collagen by weight) was added to the collagen solution and mixed for 45 minutes. After the pigment addition, the collagen solution was cool down to 40° C. Diglycidyl ether cross-linker (10 parts per hundred of collagen by weight) was added to the collagen solution and the pH was maintained at 7 to initiate a crosslinking reaction. The solution was stirred for an hour to extend the crosslinking reaction. A flexible polyester polyurethane polymer aqueous dispersion (140 parts per hundred of collagen by weight) was stirred with the collagen solution to generate a blended solution. The flexible polyester polyurethane polymer aqueous dispersion was Hauthane HD-2001 from Hauthaway. RM-4410 alkali swellable rheological modifiers from Stahl (10 part per hundred of collagen by weight) are added to increase the viscosity of the blended solution while maintaining a temperature of 40° C.

A 5 inch×5 inch piece of woven fabric was surface treated with a plasma treatment. The plasma treatment removed foreign contaminants from the fabric surface and increased the wettability of the fibers in the fabric, which allows for better absorption of solutions and bonding with the fabric. The treated fabric was then placed on a surface of a drawdown device, a layer of the blended solution was disposed onto the treated fabric, and fabric and blended solution were dried overnight at 65° C. and 60% RH to generate a layered collagen material. This material then went through traditional finishing processes for leather making. This material can have a much softer feel compared to the material of Example 4 due to the drying conditions used.

Example 6

Type I bovine collagen (300 g) was dissolved in 1000 mL of water (pH 4.5) to achieve a target concentration of 230 g/L and stirred at 50° C. for 2 hours to generate a collagen solution. The pH of the collagen solution was adjusted to 7.5 using 1 N NaOH. Fiber reactive dyes of select colors (10 parts per hundred of collagen by weight) were added to the collagen solution and mixed for 1 hour at pH 7.5. The dye was reacted for 1 hour at 50° C. EXPANCEL® Microspheres with a final weight percentage target of 2% were added to give an extra soft appeal to the final material. The solution was stirred for 30 minutes. A flexible polyester polyurethane polymer aqueous dispersion (200 parts per hundred of collagen by weight) was added to the collagen solution to generate a blended solution. The flexible polyester polyurethane polymer aqueous dispersion was Hauthane HD-2001 from Hauthaway. The blended solution was stirred at 50° C. for 15 minutes.

Then, the blended solution was disposed on an 8 inch×8 inch piece of release paper coated with a leather finish using a drawdown device at a target wet thickness of 1.2 mm to generate a wet layer on the release paper. An 8 inch×8 inch piece of knit fabric coated with an aqueous polyurethane adhesive layer (polyurethane dispersion RU-43-989 with cross linker XR-13-820) was laid down carefully on the wet layer. The wet layer and the adhesive layer were placed in contact and dried at 65° C. at 60% RH for 4 hours to generate a layered collagen material.

Example 7

Type I bovine collagen (300 g) was dissolved in 1000 mL of water (pH 4.5) to achieve a target concentration of 230 g/L and stirred at 50° C. for 2 hours to generate a collagen solution. The pH of the collagen solution was adjusted to 7.5 using 1 N NaOH. After the pH adjustment, PEGDE (polyethylene glycol diglycidyl ether) was added at 10 parts per hundred parts of collagen by weight. The solution was mixed for 1 hour at 50° C. to progress a crosslinking reaction. After one hour, WF 5227, a silicone-based hand modifier available from Stahl was added at 2 parts per hundred parts of collagen. The solution was mixed for 30 minutes at 50° C. Various fiber reactive dyes were added to the collagen solution at 10 parts per hundred parts of collagen and mixed for 1 hour at pH 7.5 and 50° C. The dyes used were purchased from Aljodye. The different dyes used were #1684 black, #14 golden brown, #15 nut brown, #16 dark brown, #11 golden yellow, #30 royal blue, #12 ultra blue, #7339 olive, #6986 navy, and #23 deep grey. EXPANCEL® Microspheres with a final weight percentage target of 2% were added to the formulation to give an extra soft appeal to the final material. The solution was stirred for 30 minutes. A flexible bio-based polyester polyurethane polymer aqueous dispersion (200 parts per hundred of collagen by weight) was added to the solution. The flexible polyester polyurethane polymer aqueous dispersion having a 35% solids content, a viscosity of 50 to 500 cps (centipoise), and a density of about 8.5 lb/gal (pounds per gallon). The blended solution was mixed at 50° C. for 15 more minutes to form a blended solution.

The blended solution was laid down on an 8 inch×8 inch piece of release paper coated with a leather finish using a drawdown device at a target wet thickness of 1.2 mm to generate a wet layer on the release paper. An 8 inch×8 inch piece of knit fabric coated with an aqueous polyurethane adhesive layer was laid down carefully on the wet layer. IMPRANIL® DLS from Covestro was used as the adhesive layer. The wet layer and the adhesive layer were placed in contact and dried at 65° C. at 60% RH for 4 hours to generate a layered collagen material.

Example 8

Type I bovine collagen (300 g) was dissolved in 1000 mL of water (pH 4.5) to achieve a target concentration of 230 g/L and stirred at 50° C. for 2 hours to generate a collagen solution. The pH of the collagen solution was adjusted to 7.5 using 1 N NaOH. After the pH adjustment, PEGDE (polyethylene glycol diglycidyl ether) was added at 10 parts per hundred parts of collagen by weight. The solution was mixed for 1 hour at 50° C. to progress a crosslinking reaction. After one hour, WF 5227, a silicone-based hand modifier available from Stahl was added at 2 parts per hundred parts of collagen. The solution was mixed for 30 minutes at 50° C. Various fiber reactive dyes were added to the collagen solution at 10 parts per hundred parts of collagen and mixed for 1 hour at pH 7.5 and 50° C. The dyes used were purchased from Aljodye. The different dyes used were #1684 black, #14 golden brown, #15 nut brown, #16 dark brown, #11 golden yellow, #30 royal blue, #12 ultra blue, #7339 olive, #6986 navy, and #23 deep grey. EXPANCEL® Microspheres with a final weight percentage target of 2% were added to the formulation to give extra soft appeal to the final material. The solution was stirred for 30 minutes. A flexible bio-based polyester polyurethane polymer aqueous dispersion (200 parts per hundred of collagen by weight) was added to the solution. The flexible polyester polyurethane polymer aqueous dispersion having a 35% solids content, a viscosity of 50 to 500 cps (centipoise), and a density of about 8.5 lb/gal (pounds per gallon). The solution was mixed at 50° C. for 15 more minutes to form a blended solution.

Then, a top-coat used in finishing traditional leather was laid down on an 8 inch×8 inch piece of release paper using a drawdown device at a target wet coat thickness of 0.15 mm and dried for 5 minutes in a tunnel dryer at 65° C. and 40% RH. The topcoat included a mixture of WT-42-511 (a polyurethane based resin), FI-17-701 (a wax used as filler), XR-13-820 (a polyisocyanate based cross-linker), and WF 5227 (a silicone-based hand modifier). Each of these components were acquired from Stahl. After the topcoat was dried, a basecoat used in finishing traditional leather was laid down on top of the topcoat using a drawdown device at a target wet coat thickness of 0.2 mm and dried for 5 more minutes in a tunnel dryer at 65° C. and 40% RH. The base coat included a mixture of RC-43-023 (a compact resin), RU-3901 (a aliphatic polyurethane resin), FI-1208 (a wax used as filler), RA-30 (an acrylic resin), XR-13-820 (a polyisocyanate based cross-linker), RA-22-063 (an acrylic resin), and RM-4410 (a rheological modifier). Each of these components were acquired from Stahl.

The blended solution was then deposited on top of the basecoat using a drawdown device at a target wet thickness of 0.4 mm and dried for 30 minutes in a tunnel dryer at 65° C. and 40% RH to form a collagen/polymer matrix layer. After the first layer of the blend solution was dried, a second layer of the blended solution was deposited on top of the first layer at the target wet thickness of 0.4 mm and dried for 30 minutes in a tunnel dryer at 65° C. and 40% RH to form a second collagen/polymer matrix layer. After the second layer of blended solution was dried, a third layer of the blended solution was laid down on top of the second layer at the target wet thickness of 0.4 mm and dried for 30 minutes in a tunnel dryer at 65° C. and 40% RH to form a third collagen/polymer matrix layer. Once the third layer was dried, an 8 inch×8 inch piece of knit fabric coated with an adhesive layer was laminated to the third layer. The third layer and the adhesive layer were placed in contact and dried at 65° C. at 40% RH for 30 minutes to generate a layered collagen material. Surprisingly, and compared to Examples 1-7, manufacturing the material this way is more scalable due to significant reduction in drying times. Also, it can result in softer materials due to a uniform drying gradient.

Example 9

Type I bovine collagen (150 g) was dissolved in 850 mL of water (pH 4.5) and stirred at 50° C. for 3 hours to generate a collagen solution. The pH of the collagen solution was adjusted to 7 using 1 N NaOH. A flexible polyester polyurethane polymer aqueous dispersion (200 parts per hundred of collagen by weight) was stirred with the collagen solution to generate a blended solution. The flexible polyester polyurethane polymer aqueous dispersion was Hauthane HD-2001 from Hauthaway. RM-4410 alkali swellable rheological modifiers from Stahl (10 part per hundred of collagen by weight) were added to increase the viscosity of the blended solution while maintaining a temperature of 50° C.

Then, a 5 inch×5 inch piece of knit fabric was cut, and a 20 micron thick layer of polyurethane adhesive coating was applied to the fabric. Hauthane HD-2001 from Hauthaway was used as the adhesive layer. The blended solution was deposited on the adhesive coated knit fabric using drawdown device at a specific target wet thickness of 1.7 mm. The adhesive and the blended solution were placed in contact and dried at 65° C. and 40% RH overnight to generate a layered collagen material.

After the material was made, it was dyed in tanning drums. The tanning drums were preheated to 30° C. and a float was prepared in the drums. The float included 2 wt % dye of a desired color and water. The material tumbled in tanning drums for 60 minutes to uptake the dye. After the dyeing process, the material was washed 2 times with water for 5 minutes to wash off excessive dye. After washing, the material was again dried for 2 hours at 65° C. and 40% RH. Finally, the material was post-dyed with desired colors.

Example 10

Type I bovine collagen (150 g) was dissolved in 850 mL of water (pH 4.5) and stirred at 50° C. for 2 hours to generate a collagen solution. The pH of the collagen solution was adjusted to 7.5 using 1 N NaOH. After the pH adjustment, PEGDE (polyethylene glycol diglycidyl ether) was added at 5 parts per hundred parts of collagen by weight. The solution was mixed for 1 hour at 50° C. to progress a crosslinking reaction. After one hour, WF 5227, a silicone-based hand modifier available from Stahl was added at 2 parts per hundred parts of collagen. The solution was mixed for 30 minutes at 50° C. Various fiber reactive dyes were added to the collagen solution at 10 parts per hundred parts of collagen and mixed for 1 hour at pH 7.5 and 50° C. The dyes used were purchased from Aljodye. The different dyes used were #1684 black, #14 golden brown, #15 nut brown, #16 dark brown, #11 golden yellow, #30 royal blue, #12 ultra blue, #7339 olive, #6986 navy, and #23 deep grey. EXPANCEL® Microspheres with a final weight percentage target of 2% were added to the formulation to give extra soft appeal to the final material. The solution was stirred for 30 minutes. A flexible bio-based polyester polyurethane polymer aqueous dispersion (200 parts per hundred of collagen by weight) was added to the solution. The flexible polyester polyurethane polymer aqueous dispersion having a 35% solids content, a viscosity of 50 to 500 cps (centipoise), and a density of about 8.5 lb/gal (pounds per gallon). The solution was mixed at 50° C. for 15 more minutes to form a blended solution.

The blended solution was deposited on an 8 inch×8 inch piece of release paper coated with a leather finish using a drawdown device at a target wet thickness of 0.4 mm and dried for 30 minutes in a tunnel dryer at 65° C. and 40% RH to form a collagen/polymer matrix layer. After the first layer was dried, a second layer of the blended solution was deposited on top of the first layer at the target wet thickness of 0.4 mm and dried for 30 minutes in a tunnel dryer at of 65° C. and 40% RH to form a second collagen/polymer matrix layer. After the second layer was dried, the blended solution was foamed using a mechanical foaming machine at 500 g/L foaming density. Then the foamed blended solution was laid down on top of the second layer at the target wet thickness of 0.8 mm and dried for 30 minutes in a tunnel dryer at 65° C. and 40% RH for form a foamed collagen/polymer matrix layer. In order to achieve foaming stability, 5.5% of HeiQ Chemtex 2216-T, 2.2% of HeiQ Chemtex 2317 stabilized blends of nonionic and anionic surfactants, 1.5% HeiQ Chemtex 2241-A modified HEUR thickener, 0.1% of HeiQ Chemtex 2243 nonionic silicone dispersion) were used. Once the third layer was dried, a polyester polyol based polyurethane adhesive layer at the target wet thickness of 0.15 mm was coated on the third layer. The adhesive layer was placed in contact with a 11 inch by 17 inch fabric and pressed in a textile press for 30 seconds to 3 minutes and dried at 75° C. at 40% RH for 30 to 40 minutes to generate a layered collagen material. Surprisingly, and compared to Examples 1-7, manufacturing the material this way is more scalable due to significant reduction in drying times. Also, it can result in softer materials due to a uniform drying gradient.

Example 11

Top-coat and basecoat formulations were prepared to create the pre-skin of a composite material. A top-coat blend was created by blending 9.74 parts of Stahl Melio WF-5227.A LIQ, 100 parts of Stahl WT-42-511, 30 parts of Stahl DI-17-701, 30 parts of Stahl XR-13-820, and 25 parts of water. A basecoat blend was created by blending 450 parts of Stahl RC-43-023, 50 parts of Stahl RU-3901, 150 parts of Stahl RA-30, 50 parts of Stahl FI-1208, 30 parts of Stahl XR-13-820, and 100 parts of Stahl RA-22-063.

Type III recombinant bovine collagen (150 g) was dissolved in 850 mL of water (pH 4.5) and stirred at 50° C. for 2 hours to generate a collagen solution. The pH of the collagen solution was adjusted to 6.8 using 1 N NaOH. After the pH adjustment, antimicrobial Ultra-fresh DW-56 was added at 1.2 parts per hundred parts of collagen solution by weight. The solution was mixed for 10 minutes at 50° C. to assure good dispersion. After 10 minutes, Antifoam 204 (a mixture of organic polyether dispersions from Sigma Aldrich) was added at 0.5 parts per hundred parts of the estimated final solution weight. The solution was mixed for 10 minutes at 50° C. to assure good dispersion. After 10 minutes, flame retardant CETAFLAM® DB9 was added at 10 parts per hundred parts of the estimated final solution solid content. The solution was mixed for 10 minutes at 50° C. to assure good dispersion. Navy Black #1684 fiber reactive dye was added to the collagen solution at 4.05 parts per hundred parts of collagen and mixed for 15 minutes at 45° C. A flexible bio-based polyester polyurethane polymer aqueous dispersion having a 35% solids content, a viscosity of 50 to 500 cps, and a density of about 8.5 lb/gal (at 200 parts per hundred of collagen by weight) was added to the solution. The solution was mixed until temperature of 43° C. to 45° C. was reached.

The blended top-coat solution was deposited on a 8 inch×8 inch piece of release paper and coated using a drawdown device at a target wet thickness of 80 gsm (g/m²) and dried for 7 minutes in a Mathis LTE-S Labcoater at 65° C., 700 rpm air speed, and 70% of air blowing from underneath the paper to form part of a pre-skin. Then, the blended basecoat solution was deposited the top-coat layer and coated using a drawdown device at a target wet thickness of 80 gsm and dried for 7 minutes in a Mathis LTE-S Labcoater at 65° C., 700 rpm air speed, and 70% of air blowing from underneath the paper to form rest of the pre-skin.

Then, the blended solution of collagen was deposited on the dried pre-skin using a drawdown device at a target wet thickness of 200 gsm and dried for 15 minutes in a Mathis LTE-S Labcoater at 75° C., 2000 rpm air speed, and 70% of the air blowing from underneath the paper to form a collagen/polymer matrix layer. After this first layer was dried, a second layer of the blended solution was deposited on top of the first layer at the target wet thickness of 200 gsm and dried for 15 minutes in a Mathis LTE-S Labcoater at 75° C., 2000 rpm air speed, and 70% of the air blowing from underneath the paper to form a second collagen/polymer matrix layer. After this second layer was dried, a third layer of the blended solution was deposited on top of the second layer at the target wet thickness of 150 gsm and dried for 15 minutes in Mathis LTE-S Labcoater at 75° C., 2000 rpm air speed, and 70% of the air blowing from underneath the paper to form a third collagen/polymer matrix layer.

Once the third layer was dried, an 8 inch×8 inch piece of knit fabric coated with an adhesive layer was laminated on to the last layer with a wet gap width of 150 gms. The adhesive used for the adhesive layer was HD-2001 (a polyurethane waterborne dispersion) from Hauthaway mixed with RM-4410 rheological modifier from Stahl at 6 parts per hundreds parts of total polyurethane waterborne dispersion weight. Then the third layer and the adhesive layer were placed in contact and dried for 25 minutes in a Mathis LTE-S Labcoater at 85° C., 2000 rpm air speed, and 70% of the air blowing from the underneath paper to generate the final composite material.

Example 12

Top-coat and base coat formulations were prepared to create the pre-skin of a composite material. A top-coat blend was created by blending 15 parts of water, 1.5 parts of Stahl XR-13-820, 22.5 parts of Stahl Melio WT-43-985, and 2 parts of Stahl HM-1179. A basecoat blend was created by blending 22.5 parts of Stahl Melio Promul C-83 LIQ., 7.5 parts of Stahl Melio Promul 95.A LIQ., 7.5 parts of Stahl RA-30, 2.5 parts of Stahl Melio Fille D LIQ, 11 parts of water, and 1.5 parts of Stahl XR-13-820.

Type III recombinant bovine collagen (150 g) was dissolved in 850 mL of water (pH 4.5) and stirred at 50° C. for 2 hours to generate a collagen solution. The pH of the collagen solution was adjusted to 6.8 using 1 N NaOH. After the pH adjustment, antimicrobial Ultra-fresh DW-56 was added at 1.2 parts per hundred parts of collagen solution by weight. The solution was mixed for 10 minutes at 50° C. to assure good dispersion. After 10 minutes, Antifoam 204 (a mixture of organic polyether dispersions from Sigma Aldrich) was added at 0.5 parts per hundred parts of the estimated final solution weight. The solution was mixed for 10 minutes at 50° C. to assure good dispersion. After 10 minutes, flame retardant CETAFLAM® DB9 was added at 10 parts per hundred parts of the estimated final solution solid content. The solution was mixed for 10 minutes at 50° C. to assure good dispersion. Navy Black #1684 fiber reactive dye was added to the collagen solution at 4.05 parts per hundred parts of collagen and mixed for 15 minutes at 45° C. A flexible bio-based polyester polyurethane polymer aqueous dispersion having a 35% solids content, a viscosity of 50 to 500 cps, and a density of about 8.5 lb/gal (at 200 parts per hundred of collagen by weight) was added to the solution. The solution was mixed until temperature of 43° C. to 45° C. is reached.

Then, a second round of Type III recombinant bovine collagen (300 g) was dissolved in 1700 mL of water (pH 4.5) and stirred at 50° C. for 2 hours to generate a collagen solution. After the pH adjustment, antimicrobial Ultra-fresh DW-56 was added at 1.2 parts per hundred parts of collagen solution by weight. The solution was mixed for 10 minutes at 50° C. to assure good dispersion. After 10 minutes, flame retardant CETAFLAM® DB9 was added at 10 parts per hundred parts of the estimated final solution solid content. The solution was mixed for 10 minutes at 50° C. to assure good dispersion. Navy Black #1684 fiber reactive dye was added to the collagen solution at 4.05 parts per hundred parts of collagen and mixed for 15 minutes at 45° C. A flexible bio-based polyester polyurethane polymer aqueous dispersion having a 35% solids content, a viscosity of 50 to 500 cps, and a density of about 8.5 lb/gal (at 200 parts per hundred of collagen by weight) was added to the solution. The blended solution was mixed until its temperature reached 50° C. again. After target temperature was reached, HeiQ Chemtex 2216-T at 5.5 parts per hundreds parts and HeiQ Chemtex 2317 at 2.2 parts per hundreds parts of blended solution weight were added along with 1.5 parts per hundreds parts of HeiQ 2241-A modified HEUR thickener and 0.1 parts per hundreds parts of HeiQ Chemtex 2243 nonionic silicone dispersion. The solution was then mechanically frothed cold until wet densities between 650 g/L to 850 g/L at a temperature of 43° C. to 45° C. were reached, thereby forming a foamed blended mixture.

The blended top-coat solution was deposited on a 8 inch×8 inch piece of release paper and coated using a drawdown device at a target wet thickness of 80 gsm and dried for 7 minutes in a Mathis LTE-S Labcoater at 65° C., 700 rpm air speed, and 70% of air blowing from underneath the paper to form part of pre-skin. Then, the blended basecoat solution was deposited the top-coat layer and coated using a drawdown device at a target wet thickness of 80 gsm and dried for 7 minutes in a Mathis LTE-S Labcoater at 65° C., 700 rpm air speed, and 70% of air blowing from underneath the paper to form rest of pre-skin.

Then, the blended non-foamed solution was deposited on the dried pre-skin using a drawdown device at a target wet thickness of 200 gsm and dried for 15 minutes in a Mathis LTE-S Labcoater at 75° C., 2000 rpm air speed, and 70% of the air blowing from underneath the paper to form a collagen/polymer matrix layer. After this first layer was dried, a second layer of the blended foamed solution was deposited on top of the first layer at the target wet thickness of 350 gsm and dried for 15 minutes in a Mathis LTE-S Labcoater with a ramp-like drying procedure starting at 75° C. for 5 minutes, then 100° C. for 5 minutes and lastly, 120° C. for 5 minutes at 700 rpm air speed, and 70% of the air blowing from underneath the paper to form a first foamed collagen/polymer matrix layer. After the foam layer was dried, a third layer of the blended foamed solution was deposited on top of the first foamed layer at the target wet thickness of 350 gsm and dried for 15 minutes in a Mathis LTE-S Labcoater with a ramp-like drying procedure starting at 75° C. for 5 minutes, then 100° C. for 5 minutes and lastly, 120° C., 700 rpm air speed, and 70% of the air blowing from underneath the paper to form a second foamed collagen/polymer matrix layer.

Once the third layer was dried, an 8 inch×8 inch piece of knit fabric coated with an adhesive layer was laminated on to the last foam layer with a wet gap width of 150 gsm. The adhesive used for the adhesive layer was HD-2001 (a polyurethane waterborne dispersion) from Hauthaway mixed with RM-4410 rheological modifier from Stahl at 6 parts per hundreds parts of total polyurethane waterborne dispersion weight. Then the third layer and the adhesive layer were placed in contact and dried for 15 minutes with a ramp-like drying procedure starting at 75° C. for 5 minutes, then 100° C. for 5 minutes and lastly, 120° C., 700 rpm air speed, and 70% of the air blowing from underneath the paper to generate the final composite material.

Example 13

Top-coat and basecoat formulations are prepared to create a pre-skin of a composite material. A top-coat blend was created by blending 9.74 parts of Stahl Melio WF-5227.A LIQ, 100 parts of Stahl WT-42-511, 30 parts of Stahl DI-17-701, 30 parts of Stahl XR-13-820, and 25 parts of water. A basecoat blend was created by blending 450 parts of Stahl RC-43-023, 50 parts of Stahl RU-3901, 150 parts of Stahl RA-30, 50 parts of Stahl FI-1208, 30 parts of Stahl XR-13-820, and 100 parts of Stahl RA-22-063.

Type III recombinant bovine collagen (150 g) was dissolved in 850 mL of water (pH 4.5) and stirred at 50° C. for 2 hours to generate a collagen solution. The pH of the collagen solution was adjusted to 6.8 using 1 N NaOH. After the pH adjustment, antimicrobial Ultra-fresh DW-56 was added at 1.2 parts per hundred parts of collagen solution by weight. The solution was mixed for 10 minutes at 50° C. to assure good dispersion. Steel grey fiber reactive dye was added to the collagen solution at 2.82 parts per hundred parts of collagen and mixed for 15 minutes at 45° C. A flexible bio-based polyester polyurethane polymer aqueous dispersion having a 35% solids content, a viscosity of 50 to 500 cps, and a density of about 8.5 lb/gal (at 200 parts per hundred of collagen by weight) was added to the solution. The solution was mixed until temperature reached 50° C. again. After target temperature was reached, HeiQ Chemtex 2216-T at 5.5 parts per hundreds parts and HeiQ Chemtex 2317 at 2.2 parts per hundreds parts of blended solution weight were added along with 1.5 parts per hundreds parts of HeiQ 2241-A modified HEUR thickener and 0.1 parts per hundreds parts of HeiQ Chemtex 2243 nonionic silicone dispersion. The solution was then mechanically frothed cold until wet densities between 650 g/L to 850 g/L at a temperature of 43° C. to 45° C. were reached.

The blended top-coat solution was deposited on an 8 inch×8 inch piece of release paper and coated using a drawdown device at a target wet thickness of 80 gsm and dried for 7 minutes in a Mathis LTE-S Labcoater at 65° C., 700 rpm air speed, and 70% of air blowing from underneath the paper to form part of a pre-skin. Then, the blended basecoat solution was deposited the top coat layer and coated using a drawdown device at a target wet thickness of 80 gsm and dried for 7 minutes in a Mathis LTE-S Labcoater at 65° C., 700 rpm air speed, and 70% of air blowing from underneath the paper to form rest of the pre-skin.

Then, the blended foamed solution was deposited on the pre-skin layer using a drawdown device at a target wet thickness of 200 gsm and dried for 15 minutes in a Mathis LTE-S Labcoater at 75° C., 700 rpm air speed, and 70% of the air blowing from underneath the paper to form a foamed collagen/polymer matrix layer. After this first layer was dried, a second layer of the blended foamed solution was deposited on top of the first layer at the target wet thickness of 300 gsm and dried for 15 minutes in a Mathis LTE-S Labcoater at 75° C., 700 rpm air speed, and 70% of the air blowing from underneath the paper to form a second foamed collagen/polymer matrix layer. After this second layer was dried, a third layer of the blended foamed solution was deposited on top of the second layer at the target wet thickness of 250 gsm and dried for 15 minutes in a Mathis LTE-S Labcoater at 75° C., 700 rpm air speed, and 70% of the air blowing from underneath the paper to form a third foamed collagen/polymer matrix layer.

Once this third layer was dried, an 8 inch×8 inch piece of knit fabric coated with an adhesive layer was laminated on to the last foam layer with a wet gap width of 150 gsm. The adhesive used for the adhesive layer was HD-2001 (a polyurethane waterborne dispersion) from Hauthaway mixed with RM-4410 rheological modifier from Stahl at 6 parts per hundreds parts of total polyurethane waterborne dispersion weight. Then the third layer and the adhesive layer were placed in contact and dried for 15 minutes with a ramp-like drying procedure starting at 75° C. for 5 minutes, then 100° C. for 5 minutes and lastly, 120° C., 700 rpm air speed, and 70% of the air blowing from underneath the paper to generate the final composite material.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

```
SEQUENCES
SEQ ID NO: 1: Col3 alpha chain
MFSPILSLEIILALATLQSVFAQQEAVDGGCSHLGQSYADRDVWKPEPCQ

ICVCDSGSVLCDDIICDDQELDCPNPEIPFGECCAVCPQPPTAPTRPPNG

QGPQGPKGDPGPPGIPGRNGDPGPPGSPGSPGSPGPPGICESCPTGGQNY

SPQYEAYDVKSGVAGGGIAGYPGPAGPPGPPGPPGTSGHPGAPGAPGYQG

PPGEPGQAGPAGPPGPPGAIGPSGPAGKDGESGRPGRPGERGFPGPPGMK

GPAGMPGFPGMKGHRGFDGRNGEKGETGAPGLKGENGVPGENGAPGPMGP

RGAPGERGRPGLPGAAGARGNDGARGSDGQPGPPGPPGTAGFPGSPGAKG

EVGPAGSPGSSGAPGQRGEPGPQGHAGAPGPPGPPGSNGSPGGKGEMGPA

GIPGAPGLIGARGPPGPPGTNGVPGQRGAAGEPGKNGAKGDPGPRGERGE

AGSPGIAGPKGEDGKDGSPGEPGANGLPGAAGERGVPGFRGPAGANGLPG

EKGPPGDRGGPGPAGPRGVAGEPGRDGLPGGPGLRGIPGSPGGPGSDGKP

GPPGSQGETGRPGPPGSPGPRGQPGVMGFPGPKGNDGAPGKNGERGGPGG

PGPQGPAGKNGETGPQGPPGPTGPSGDKGDTGPPGPQGLQGLPGTSGPPG

ENGKPGEPGPKGEAGAPGIPGGKGDSGAPGERGPPGAGGPPGPRGGAGPP

GPEGGKGAAGPPGPPGSAGTPGLQGMPGERGGPGGPGPKGDKGEPGSSGV

DGAPGKDGPRGPTGPIGPPGPAGQPGDKGESGAPGVPGIAGPRGGPGERG

EQGPPGPAGFPGAPGQNGEPGAKGERGAPGEKGEGGPPGAAGPAGGSGPA

GPPGPQGVKGERGSPGGPGAAGFPGGRGPPGPPGSNGNPGPPGSSGAPGK

DGPPGPPGSNGAPGSPGISGPKGDSGPPGERGAPGPQGPPGAPGPLGIAG

LTGARGLAGPPGMPGARGSPGPQGIKGENGKPGPSGQNGERGPPGPQGLP

GLAGTAGEPGRDGNPGSDGLPGRDGAPGAKGDRGENGSPGAPGAPGHPGP
```

-continued

PGPVGPAGKSGDRGETGPAGPSGAPGPAGSRGPPGPQGPRGDKGETGERG

AMGIKGHRGFPGNPGAPGSPGPAGHQGAVGSPGPAGPRGPVGPSGPPGKD

-continued

GASGHPGPIGPPGPRGNRGERGSEGSPGHPGQPGPPGPPGAPGPCCGAGG

VAAIAGVGAEKAGGFAPYYGDGYIPEAPRDGQAYVRKDGEWVLLSTFL

---

What is claimed is:

1. A layered collagen material, comprising:
   a substrate layer; and
   a collagen/polymer matrix layer attached to a surface of the substrate layer, the collagen/polymer matrix layer comprising collagen dissolved within a polymeric matrix material.

2. The layered collagen material of claim 1, wherein the collagen/polymer matrix layer is transparent.

3. The layered collagen material of claim 1, wherein the collagen is natural collagen, recombinant collagen, or a combination thereof.

4. The layered collagen material of claim 1, further comprising a second collagen/polymer matrix layer disposed between the collagen/polymer matrix layer and the substrate layer.

5. The layered collagen material of claim 4, wherein the collagen/polymer matrix layer has a first density and the second collagen/polymer matrix layer has a second density, and wherein the first density is greater than the second density.

6. The layered collagen material of claim 4, wherein the collagen/polymer matrix layer has a first dry weight and the second collagen/polymer matrix layer has a second dry weight, and wherein the first dry weight is less than the second dry weight.

7. The layered collagen material of claim 4, wherein the second collagen/polymer matrix layer comprises a foam stabilizer.

8. The layered collagen material of claim 4, further comprising a third collagen/polymer matrix layer disposed between the second collagen/polymer matrix layer and the substrate layer.

9. The layered collagen material of claim 8, wherein the collagen/polymer matrix layer has a first density, the second collagen/polymer matrix layer has a second density, and the third collagen/polymer matrix layer has a third density, and wherein the first density is greater than the second density and the third density.

10. The layered collagen material of claim 8, wherein the collagen/polymer matrix layer has a first dry weight, the second collagen/polymer matrix layer has a second dry weight, and the third collagen/polymer matrix layer has a third dry weight, and wherein the first dry weight is less than the second dry weight and the third dry weight.

11. The layered collagen material of claim 8, wherein the third collagen/polymer matrix layer comprises a foam stabilizer.

12. The layered collagen material of claim 1, wherein the polymeric matrix material comprises a polyurethane, a polyacrylate, an acrylic acid copolymer, a polyacrylamide, a polyethylene oxide, a polyvinyl alcohol, or a combination thereof.

13. The layered collagen material of claim 1, wherein the polymeric matrix material comprises a polyurethane.

14. The layered collagen material of claim 13, wherein the polyurethane is bio-polyurethane.

15. The layered collagen material of claim 13, wherein the polyurethane is a water-soluble polyurethane.

16. The layered collagen material of claim 1, wherein the collagen/polymer matrix layer comprises a fatliquor.

17. The layered collagen material of claim 1, wherein the collagen/polymer matrix layer comprises a coloring agent.

18. The layered collagen material of claim 17, wherein the coloring agent is a dye.

19. The layered collagen material of claim 1, wherein the collagen/polymer matrix layer is tanned.

20. The layered collagen material of claim 1, wherein the substrate layer comprises a textile layer.

21. The layered collagen material of claim 20, wherein the textile layer comprises at least one of: a woven textile layer, non-woven textile layer, or a knit textile layer.

22. The layered collagen material of claim 1, further comprising a basecoat layer disposed over a surface of the collagen/polymer matrix layer opposite the substrate layer.

23. The layered collagen material of claim 22, further comprising a top-coat layer disposed over a surface of the basecoat layer opposite the collagen/polymer matrix layer.

24. The layered collagen material of claim 1, wherein the collagen is at least about 60% identical to SEQ ID NO: 1.

25. A method of making a layered collagen material, the method comprising:
   blending a polymer dispersed in a solvent with collagen to form a blended mixture in the solvent;
   disposing a layer of the blended mixture in the solvent over a surface of a sacrificial layer;
   removing the solvent from the blended mixture to form a collagen/polymer matrix layer, the collagen/polymer matrix layer comprising the collagen dissolved within the polymer; and
   attaching the collagen/polymer matrix layer to a substrate layer.

26. A method of making a layered collagen material, the method comprising:

blending a polymer dispersed in a solvent with collagen to form a blended mixture in the solvent;

disposing a layer of the blended mixture in the solvent over a substrate layer; and removing the solvent from the blended mixture to form a collagen/polymer matrix layer, the collagen/polymer matrix layer comprising the collagen dissolved within the polymer.

* * * * *